US012540327B2

(12) United States Patent
Thompson

(10) Patent No.: US 12,540,327 B2
(45) Date of Patent: Feb. 3, 2026

(54) COMPOSITION FOR REGULATING PRODUCTION OF INTERFERING RIBONUCLEIC ACID

(71) Applicant: Wyvern Pharmaceuticals Inc., Calgary (CA)

(72) Inventor: Bradley G. Thompson, Calgary (CA)

(73) Assignee: Wyvern Pharmaceuticals Inc., Calgary (CA)

(*) Notice: Subject to any disclaimer, the term of this patent is extended or adjusted under 35 U.S.C. 154(b) by 0 days.

(21) Appl. No.: 18/932,368

(22) Filed: Oct. 30, 2024

(65) Prior Publication Data

US 2025/0163429 A1 May 22, 2025

Related U.S. Application Data

(62) Division of application No. 18/518,069, filed on Nov. 22, 2023.

(51) Int. Cl.
*C12N 15/113* (2010.01)
*C12N 15/86* (2006.01)

(52) U.S. Cl.
CPC .......... *C12N 15/1137* (2013.01); *C12N 15/86* (2013.01); *C12N 2310/141* (2013.01); *C12N 2750/14143* (2013.01); *C12Y 207/01* (2013.01)

(58) Field of Classification Search
CPC .............. C12N 15/86; C12N 2310/141; C12N 15/1137
See application file for complete search history.

(56) References Cited

U.S. PATENT DOCUMENTS

| | | | |
|---|---|---|---|
| 11,085,055 B2 | 8/2021 | Mallol et al. | |
| 11,162,102 B2 * | 11/2021 | Minshull | C12N 15/111 |
| 11,530,423 B1 | 12/2022 | Thompson | |
| 11,873,505 B2 | 1/2024 | Thompson | |
| 12,018,274 B2 | 6/2024 | Thompson | |
| 12,134,770 B1 | 11/2024 | Thompson | |

FOREIGN PATENT DOCUMENTS

CA 2721333 A1 10/2009

OTHER PUBLICATIONS

Fiona T van den Berg, et al., Molecular Therapy—Nucleic Acids, vol. 5, 2016 (Year: 2016).*
Denzler R et al., Mol Cell. Nov. 3, 2016;64(3):565-579 (Year: 2016).*
O'Brien, et al., Aug. 3, 2018, Front Endocrinol (Lausanne), 9:402, p. 1-12; Fig. 1; p. 2, "Biogenesis of miRNAs" (Year: 2018).*
Gorski, S., Vogel, J. & Doudna, J., Nat Rev Mol Cell Biol 18, 215-228 (2017) (Year: 2017).*
Nature (2010. Gene Expression. Scitable. Available online at Nature. com. Accessed Dec. 16, 2024) (Year: 2010).*
NCBI Nucleotide Sequence for PARP. Search performed Dec. 26, 2024 (Year: 2024).*
Tritschler (et al. 2019. Concepts and limitations for learning developmental trajectories from single cell genomics. Development 146: dev170506) (Year: 2019).*
Bottoni et al. "Targeting BTK through microRNA in chronic lymphocytic leukemia." Blood, The Journal of the American Society of Hematology 128.26 (2016): 3101-3112.
Brutons Tyrosine Kinase Genbank Sequence (Year: 2023).
Christensen et al. "Recombinant adeno-associated virus-mediated microRNA delivery into the postnatal mouse brain reveals a role for miR-134 in dendritogenesis in vivo." Frontiers in neural circuits 3 (2010): 848.
Bofill-De Ros et al. "Guidelines for the optimal design of miRNA-based shRNAs." Methods 103 (2016): 157-166.
NCBI Nucleotide Sequence ALK Lingand, search performed Dec. 26, 2024 (2023).
Ahmadzadeh et al. "BRAF mutation in hairy cell leukemia." Oncology reviews 8.2 (2014): 253.
Patton et al. "Biogenesis, delivery, and function of extracellular RNA." Journal of extracellular vesicles 4.1 (2015): 27494.
Clark et al. "Detection of BRAF splicing variants in plasma-derived cell-free nucleic acids and extracellular vesicles of melanoma patients failing targeted therapy therapies." Oncotarget 11.44 (2020): 4016.
NCBI Search results for SEQ ID No. 5 2024.
GenBank EGFR Sequence (2023).
Genbank FLT3 Sequence (2024).
Lam (et al. 2015. siRNA Versus miRNA as Therapeutics for Gene Silencing. Molec. Ther. Nuc. Ac. 4:e252) (Year: 2015).
Ying (et al. 2008. The MicroRNA (miRNA): Overview of the RNA Genes that Modulate Gene Function. Mol. Biotechnol. 38:257-268) (Year: 2008).
*Homo sapiens* VEGF, mRNA, NCBI Reference Sequence, version Oct. 2023, 9 pages, retrieved from the internet Jul. 2, 2025 (Year: 2023).
Pagliuca (et al. 2013. Analysis of the combined action of miR-143 and miR-145 on oncogenic pathways in colorectal cancer cells reveals a coordinate program of gene repression. Oncogene 32:4806-4813) (Year: 2013).
Fattore (et al. 2016. miR-579-3p controls melanoma progression and resistance to target therapy. PNAS 113 [34]:E5005-E5013) ( Year: 2016).
Origene (2024. Product datasheet for SC207797 B Raf [BRAF] [NM_004333] Human 3' UTR Clone. Rockville, MD: Origene) (Year: 2024).

(Continued)

*Primary Examiner* — Ram R Shukla
*Assistant Examiner* — Shabana S Meyering
(74) *Attorney, Agent, or Firm* — Gowling WLG (Canada) LLP

(57) ABSTRACT

The embodiments of the present disclosure relate to decreasing the bioavailability of one or more target biomolecules by providing a composition that comprises a recombinant plasmid with one or more sequences of micro interfering ribonucleic acid (miRNA). When the recombinant plasmid interacts with a target cell, it causes the target cell to upregulate production of the miRNA, which then decreases the bioavailability of the target biomolecule. In some embodiments of the present disclosure, the target biomolecule is a kinase.

4 Claims, No Drawings

Specification includes a Sequence Listing.

(56) References Cited

OTHER PUBLICATIONS

NCBI (*Homo sapiens* B-Raf proto-oncogene, serine/threonine kinase [BRAF], transcript variants 1-2, 4-14, mRNA: [see reference for NM number]. Available online at NCBI.nlm.nih.gov. Accessed on May 16, 2025 (Year: 2025).

MiRbase (2025. "miR-143" and "miR-145", and "miR-579-3p". Available online at miRbase.org. Accessed on May 16, 2025) (Year: 2025).

Kondratov et al. "Direct head-to-head evaluation of recombinant adeno-associated viral vectors manufactured in human versus insect cells." Molecular Therapy 25.12 (2017): 2661-2675.

Wang et al. "Adeno-associated virus vector as a platform for gene therapy delivery". Nat Rev Drug Discov. May 2019; 18(5):358-378. (Year: 2019).

NCBI Nucleotide Sequence ALK Receptor, search performed Dec. 26, 2024 (2023).

Gen Bank EGF Sequence (2023).

* cited by examiner

SEQUENCE LISTING

```
Sequence total quantity: 17
SEQ ID NO: 1            moltype = DNA  length = 5883
FEATURE                 Location/Qualifiers
source                  1..5883
                        mol_type = other DNA
                        organism = synthetic construct
SEQUENCE: 1
aatcaacctc tggattacaa aatttgtgaa agattgactg gtattcttaa ctatgttgct    60
ccttttacgc tatgtggata cgctgcttta atgcctttgt atcatgctat tgcttcccgt   120
atggctttca ttttctcctc cttgtataaa tcctggttgc tgtctcttta tgaggagttg   180
tggcccgttg tcaggcaacg tggcgtggtg tgcactgtgt ttgctgacgc aaccccccact  240
ggttggggca ttgccaccac ctgtcagctc ctttccggga ctttcgcttt cccctcct     300
attgccacgg cggaactcat cgccgcctgc cttgcccgct gctggacagg ggctcggctg   360
ttgggcactg acaattccgt ggtgttgtcg gggaaatcat cgtcctttcc ttggctgtc    420
gcctgtgttg ccacctggat tctgcgcggg acgtccttct gctacgtccc ttcggccctc   480
aatccagcgg accttccttc ccgcggcctg ctgccggctc tgcggcctct tccgcgtctt   540
cgccttcgcc ctcagacgag tcggatctcc ctttgggcg cctccccgcc taagcttaat    600
gataccgtcg agatctaact tgtttattgc agcttataat ggttacaaat aaagcaatag   660
catcacaaat ttcacaaata aagcattttt ttcactgcat tctagttgtg gtttgtccaa   720
actcatcaat gtatcttatc atgtctggat ctcgacctcg actagagcat ggctacgtag   780
ataagtagca tggcgggtta atcattaact acaaggaacc cctagtgatg gagttggcca   840
ctccctctct gcgcgctcgc tcgctcactg aggccgggcg accaaaggtc gcccgacgcc   900
cgggctttgc ccgggcggcc tcagtgagcg agcgagcgcg cagctggcgt aatagcgaag   960
aggcccgcac cgatcgccct tcccaacagt tgcgcagcct gaatggcgaa tggcgattcc  1020
gttgcaatgg ctggcggtaa tattgttctg gatattacca gcaaggccga tagtttgagt  1080
tcttctactc aggcaagtga tgttattact aatcaaagaa gtattgcgac aacggttaat  1140
ttgcgtgatg gacagactct tttactcggt ggcctcactg attataaaaa cacttctcag  1200
gattctggcg taccgttcct gtctaaaatc cctttaatcg gcctcctgtt tagctcccgc  1260
tctgattcta acgaggaaag cacgttatac gtgctcgtca aagcaaccat agtacgcgcc  1320
ctgtagcggc gcattaagcg cggcgggtgt ggtggttacg cgcagcgtga ccgctacact  1380
tgccagcgcc ctagcgcccg ctcctttcgc tttcttccct tcctttctcg ccacgttcgc  1440
cggctttccc cgtcaagctc taaatcgggg ctccctttta gggttccgat ttagtgcttt  1500
acggcacctc gaccccaaaa aacttgatta gggtgatggt tcacgtagtg ggccatcgcc  1560
ctgatagacg gttttcgcc ctttgacgtt ggagtccacg ttctttaata gtggactctt  1620
gttccaaact ggaacaacac tcaacctat ctcggtctat tcttttgatt tataagggat  1680
tttgccgatt tcggcctatt ggttaaaaaa tgagctgatt taacaaaaat ttaacgcgaa  1740
ttttaacaaa atattaacgt ttacaattta aatatttgct tatacaatct tcctgttttt  1800
ggggcttttc tgattatcaa ccggggtaca tatgattgac atgctagttt tacgattacc  1860
gttcatcgat tctcttgttt gctccagact ctcaggcaat gacctgatag cctttgtaga  1920
gacctctcaa aaatagctac cctctccggc atgaatttat cagctagaac ggttgaatat  1980
catattgatg gtgatttgac tgtctccggc ctttctcacc cgtttgaatc tttacctaca  2040
cattactcag gcattgcatt taaaatatat gagggttcta aaaattttta tccttgcgtt  2100
gaaataaagg cttctcccgc aaaagtatta cagggtcata atgtttttgg tacaaccgat  2160
ttagctttat gctctgaggc tttattgctt aattttgcta attctttgcc ttgcctgtat  2220
gatttattgg atgttggaat tcctgatgcg gtattttctc cttacgcatc tgtgcggtat  2280
ttcacaccgc atatggtgca ctctcagtac aatctgtct gatgccgcat agttaagcca  2340
gccccgacac ccgccaacac ccgctgacgc gccctgacgg gcttgtctgc tcccggcatc  2400
```

```
cgcttacaga caagctgtga ccgtctccgg gagctgcatg tgtcagaggt tttcaccgtc  2460
atcaccgaaa cgcgcgagac gaaagggcct cgtgatacgc ctattttat aggttaatgt   2520
catgataata atggtttctt agacgtcagg tggcactttt cggggaaatg tgcgcggaac  2580
ccctatttgt ttatttttct aaatacattc aaatatgtat ccgctcatga acaataacc   2640
ctgataaatg cttcaataat attgaaaaag gaagagtatg agtattcaac atttccgtgt  2700
cgcccttatt cccttttttg cggcattttg ccttcctgtt tttgctcacc cagaaacgct  2760
ggtgaaagta aaagatgctg aagatcagtt gggtgcacga gtgggttaca tcgaactgga  2820
tctcaacagc ggtaagatcc ttgagagttt tcgccccgaa gaacgttttc caatgatgag  2880
cacttttaaa gttctgctat gtggcgcggt attatcccgt attgacgccg ggcaagagca  2940
actcggtcgc cgcatacact attctcagaa tgacttggtt gagtactcac cagtcacaga  3000
aaagcatctt acggatggca tgacagtaag agaattatgc agtgctgcca taaccatgag  3060
tgataacact gcggccaact tacttctgac aacgatcgga ggaccgaagg agctaaccgc  3120
tttttttgcac aacatggggg atcatgtaac tcgccttgat cgttgggaac cggagctgaa  3180
tgaagccata ccaaacgacg agcgtgacac cacgatgcct gtagcaatgg caacaacgtt  3240
gcgcaaacta ttaactggcg aactacttac tctagcttcc cggcaacaat taatagactg  3300
gatggaggcg gataaagttg caggaccact tctgcgctcg gcccttccgg ctggctggtt  3360
tattgctgat aaatctggag ccggtgagcg tgggtctcgc ggtatcattg cagcactggg  3420
gccagatggt aagcccctcc cgtatcgtagt tatctacacg acggggagtc aggcaactat  3480
ggatgaacga aatagacaga tcgctgagat aggtgcctca ctgattaagc attggtaact  3540
gtcagaccaa gtttactcat atatacttta gattgattta aaacttcatt tttaatttaa  3600
aaggatctag gtgaagatcc ttttttgataa tctcatgacc aaaatccctt aacgtgagtt  3660
ttcgttccac tgagcgtcag accccgtaga aagatcaaag gatcttctt gagatcctt   3720
ttttctgcgc gtaatctgct gcttgcaaac aaaaaaacca ccgctaccag cggtggtttg  3780
tttgccggat caagagctac caactctttt tccgaaggta actggcttca gcagagcgca  3840
gataccaaat actgtcctte tagtgtagcc gtagttaggc caccacttca agaactctgt  3900
agcaccgcct acatacctcg ctctgctaat cctgttaaca gtggctgctg ccagtggcga  3960
taagtcgtgt cttaccgggt tggactcaag acgatagtta ccggataagg cgcagcggtc  4020
gggctgaacg ggggggttcgt gcacacagcc cagcttggag cgaacgacct acaccgaact  4080
gagataccta cagcgtgagc tatgagaaag cgccacgctt cccgaaggga gaaaggcgga  4140
caggtatccg gtaagcggca gggtcggaac aggagagcgc acgagggagc ttccaggggg  4200
aaacgcctgg tatctttata gtcctgtcgg gtttcgccac ctctgacttg agcgtcgatt  4260
tttgtgatgc tcgtcagggg gcggagcct atggaaaaac gccagcaacg cggcctttt   4320
acggttcctg gccttttgct ggccttttgc tcacatgttc tttcctgcgt tatccctga   4380
ttctgtggat aaccgtatta ccgccttttga gtgagctgat accgctcgcc gcagccgaac  4440
gaccgagcgc agcgagtcag tgagcgagga agcggaagag cgcccaatac gcaaaccgcc  4500
tctcccccgcg cgttggccga ttcattaatg cagcagctgc gcgctcgctc gctcactgag  4560
gccgcccggg caaagcccgg gcgtcgggcg acctttggtc gcccggcctc agtgagcgag  4620
cgagcgcgca gagagggagt ggccaactcc atcactaggg gttccttgta gttaatgatt  4680
aacccgccat gctacttatc tacgtagcca tgctctagga cattgattat tgactagtga  4740
agttccgcgt tacataactt acggtaaatg gcccgcctgg ctgaccgccc aacgaccccg  4800
gcccattgac gtcaataatg acgtatgttc ccatagtaac gccaataggg acttccatt   4860
gacgtcaatg ggtggagtat ttacggtaaa ctgcccactt ggcagtacat caagtgtatc  4920
atatgccaag tacgcccct attgacgtca atgacggtaa atggcccgcc tggcattatg  4980
cccagtacat gaccttatgg gactttccta cttggcagta catctacgta ttagtcatcg  5040
ctattaccat ggtcgaggtg agccccacgt tctgcttcac tctccccatc tcccccccct  5100
ccccacccc aattttgtat ttatttattt tttaattatt ttgtgcagcg atgggggcgg  5160
gggggggggg gggcgcgcgc caggcgggga ggggcgggg gaggggcggg gcggggcgag  5220
gcggagaggt gcggcggcag ccaatcagag cggcgcgctc cgaaagtttc ctttatggc   5280
gaggcggcgc ggcggcggc cctataaaaa gcgaagcgcg cggcgggcgg gagtcgctgc  5340
gcgctgcctt cgccccgtgc cccgctccgc cgccgcctcg cgccgcccgc ccggctctg   5400
actgaccgcg ttactaaaac aggtaagtcc ggcctccgcg ccggttttg gcgcctcccg  5460
cgggcgcccc cctcctcacg cgagcgctg ccacgtcaga cgaagggcgc agcgagcgtc  5520
ctgatccttc cgcccggacg ctcaggacag cggcccgctg ctcataagac tcggccttag  5580
aaccccagta tcagcagaag gacatttag acgggactt gggtgactct agggcactgg  5640
ttttctttcc agagagcgga acaggcgagg aaaagtagtc ccttctcggc gattctgcgg  5700
agggatctcc gtggggcggt gaacgccgat gatgcctcta ctaaccatgt tcatgttttc  5760
ttttttttttc tacaggtcct gggtgacgaa caggttaccg ccaccatggc caccggctct  5820
cgcacaagcc tgctgctggc tttcggactg ctgtgcctgc cttggctcca ggagggctcc  5880
gcc                                                                 5883

SEQ ID NO: 2            moltype = DNA   length = 456
FEATURE                 Location/Qualifiers
source                  1..456
                        mol_type = other DNA
                        organism = synthetic construct
SEQUENCE: 2
gctagcatcg ataccgtcgc tatgtgctgg aggcttgctg aaggctgtat gctgtaaggt    60
ggttatggga gaatgccgtt ttggcctctg actgacggca ttctcctaac caccttacag   120
gacacaaggc ctgttactag cactcacatg gaacaaatgg cctctagcct ggaggcttga   180
tgaaggctgt atgctgttga gtttcgcatt cttgttgccg ttttggcctc tgactgacgg   240
caacaagagc gaaactcaac aggacacaag gcctgttact agcactcaca tggaacaaat   300
ggcctctagc ctgaggcttg ctgaaggctg tatgctgtc tatcctttca agctagtcac   360
cgttttggcc tctgactgac ggtgactagc gaaaggatag acaggacaca aggcctgtta   420
ctagcactca catggaacaa atggcctctc tagaat                             456

SEQ ID NO: 3            moltype = DNA   length = 456
FEATURE                 Location/Qualifiers
source                  1..456
                        mol_type = other DNA
```

```
                         organism = synthetic construct
SEQUENCE: 3
gctagcatcg ataccgtcgc tatgtgctgg aggcttgctg aaggctgtat gctgaagtta    60
gcatgtgtcc cagaaccgtt ttggcctctg actgacggtt ctgggacatg ctaacttcag   120
gacacaaggc ctgttactag cactcacatg aacaaatggc cctctagcct ggaggcttgc   180
tgaaggctgt atgctgagaa gaaaggtatc ccaattgccg ttttggcctc tgactgacgg   240
caattgggac ctttcttctc aggacacaag gcctgttact agcactcaca tggaacaaat   300
ggcctctagc ctggaggctt gctgaaggct gtatgctgta gtgtttccaa atactgcttg   360
cgttttggcc tctgactgac gcaagcagta tggaaacact acaggacaca aggcctgtta   420
ctagcactca catggaacaa atggcctctc tagaat                             456

SEQ ID NO: 4              moltype = DNA  length = 456
FEATURE                   Location/Qualifiers
source                    1..456
                          mol_type = other DNA
                          organism = synthetic construct
SEQUENCE: 4
gctagcatcg ataccgtcgc tatgtgctgg aggcttgctg aaggctgtat gctgtctgac    60
agtgatgtca tcctttcgtt ttggcctctg actgacgaaa ggatgatcac tgtcagacag   120
gacacaaggc ctgttactag cactcacatg aacaaatgg cctctagcct ggaggcttgc    180
tgaaggctgt atgctgattt aggtcagatg gaaactcgcg ttttggcctc tgactgacgc   240
gagtttccct gacctaaatc aggacacaag gcctgttact agcactcaca tggaacaaat   300
ggcctctagc ctggaggctt gctgaaggct gtatgctgag tgtatgctta acgtggactt   360
cgttttggcc tctgactgac gaagtccacg aagcatacac tcaggacaca aggcctgtta   420
ctagcactca catggaacaa atggcctctc tagaat                             456

SEQ ID NO: 5              moltype = DNA  length = 456
FEATURE                   Location/Qualifiers
source                    1..456
                          mol_type = other DNA
                          organism = synthetic construct
SEQUENCE: 5
gctagcatcg ataccgtcgc tatgtgctgg aggcttgctg aaggctgtat gctgatactt    60
cagcctgaat cgtgaccgtt ttggcctctg actgacggtc acgattggct gaagtatcag   120
gacacaaggc ctgttactag cactcacatg aacaaatgg cctctagcct ggaggcttgc    180
tgaaggctgt atgctgactt cactcatatt gttccactcg ttttggcctc tgactgacga   240
gtggaacaat gagtgaagtc aggacacaag gcctgttact agcactcaca tggaacaaat   300
ggcctctagc ctggaggctt gctgaaggct gtatgctgta tattctacaa atcaccaggg   360
cgttttggcc tctgactgac gccctggtga tgtagaatat acaggacaca aggcctgtta   420
ctagcactca catggaacaa atggcctctc tagaat                             456

SEQ ID NO: 6              moltype = DNA  length = 456
FEATURE                   Location/Qualifiers
source                    1..456
                          mol_type = other DNA
                          organism = synthetic construct
SEQUENCE: 6
gctagcatcg ataccgtcgc tatgtgctgg aggcttgctg aaggctgtat gctgtataag    60
tccagtgaga agaaggcgtt ttggcctctg actgacgcct cttctctgg acttatacag    120
gacacaaggc ctgttactag cactcacatg aacaaatgg cctctagcct ggaggcttgc    180
tgaaggctgt atgctgctat catcaaatga gctgctgcta tttggcctct gactgacgca   240
gcagctcttg atgatagtca ggacacaagg cctgttacta gcactcacat ggaacaaatg   300
gcctctagcc tggaggcttg ctgaaggctg tatgctgaag actgctggaa attctatggc   360
tgttttggcc tctgactgac gaccatagaa tccagcagtc tcaggacaca aggcctgtta   420
ctagcactca catggaacaa atggcctctc tagaat                             456

SEQ ID NO: 7              moltype = DNA  length = 457
FEATURE                   Location/Qualifiers
source                    1..457
                          mol_type = other DNA
                          organism = synthetic construct
SEQUENCE: 7
gctagcatcg ataccgtcgc tatgtgctgg aggcttgctg aaggctgtat gctgattagc    60
actggtgatt tccggctgtt ttggcctctg actgacgacc ggaaatccag tgctaatcag   120
gacacaaggc ctgttactag cactcacatg aacaaatgg cctctagcct ggaggcttgc    180
tgaaggctgt atgctgattg agtttcgcat tcttgttgcc gttttggcct ctgactgacg   240
gcaacaagag cgaaactcaa caggacacaa ggcctgttac tagcactcac atggaacaaa   300
tggcctctag cctggaggct tgctgaaggc tgtatgctga ttgatcaggc aaacatagtc   360
ccgttttggc ctctgactga cggggactat gtgcctgatca atcaggacac aaggcctgtt  420
actagcactc acatggaaca aatggcctct ctagaat                            457

SEQ ID NO: 8              moltype = DNA  length = 456
FEATURE                   Location/Qualifiers
source                    1..456
                          mol_type = other DNA
                          organism = synthetic construct
SEQUENCE: 8
gctagcatcg ataccgtcgc tatgtgctgg aggcttgctg aaggctgtat gctgtctgat    60
cgtggtgtta tttgggcgtt ttggcctctg actgacgccc aaataaccac gatcagacag   120
```

```
gacacaaggc ctgttactag cactcacatg gaacaaatgg cctctagcct ggaggcttgc    180
tgaaggctgt atgctgttga gtttcgcatt cttgttgccg ttttggcctc tgactgacgg    240
caacaagagc gaaactcaac aggacacaag gcctgttact agcactcaca tggaacaaat    300
ggcctctagc ctggaggctt gctgaaggct gtatgctgta tcctcttata actcagcctc    360
cgttttggcc tctgactgac ggaggctgag ataagaggat acaggacaca aggcctgtta    420
ctagcactca catggaacaa atggcctctc tagaat                              456

SEQ ID NO: 9            moltype = DNA   length = 456
FEATURE                 Location/Qualifiers
source                  1..456
                        mol_type = other DNA
                        organism = synthetic construct
SEQUENCE: 9
gctagcatcg ataccgtcgc tatgtgctgg aggcttgctg aaggctgtat gctgtcgtac    60
tgacttgtag gtatgccgtt ttggcctctg actgacggca tacctaagtc agtacgtcag    120
gacacaaggc ctgttactag cactcacatg gaacaaatgg cctctagcct ggaggcttgc    180
tgaaggctgt atgctgactc ctaatcaata gcttccaccg ttttggcctc tgactgacgg    240
tggaagcttg attaggagtc aggacacaag gcctgttact agcactcaca tggaacaaat    300
ggcctctagc ctggaggctt gctgaaggct gtatgctgaa tatgccttta agctttgctg    360
cgttttggcc tctgactgac gcagcaaagc aaaggcatat tcaggacaca aggcctgtta    420
ctagcactca catggaacaa atggcctctc tagaat                              456

SEQ ID NO: 10           moltype = DNA   length = 6339
FEATURE                 Location/Qualifiers
source                  1..6339
                        mol_type = other DNA
                        organism = synthetic construct
SEQUENCE: 10
aatcaacctc tggattacaa aatttgtgaa agattgactg gtattcttaa ctatgttgct    60
ccttttacgc tatgtggata cgctgcttta atgcctttgt atcatgctat tgcttcccgt    120
atggctttca ttttctcctc cttgtataaa tcctggttgc tgtctctttta tgaggagttg    180
tggcccgttg tcaggcaacg tggcgtggtg tgcactgtgt ttgctgacgc aaccccccact    240
ggttgggggca ttgccaccac ctgtcagctc ctttccggga cttttcgcttt cccctcccct    300
attgccacgg cgaactcat cgccgcctgc cttgcccgct gctggacagg ggctcggctg    360
ttgggcactg acaattccgt ggtgttgtcg gggaaatcat cgtccttttcc ttggctgctc    420
gcctgtgttg ccacctggat tctgcgcggg acgtccttct gctacgtccc ttcggccctc    480
aatccagcgg accttccttc ccgcggcctg ctgccggctc tgcggcctct tccgcgtctt    540
cgccttcgcc ctcagacgag tcggatctcc ctttgggccg cctccccgcc taagcttatc    600
gataccgtcg agatctaact tgtttattgc agcttataat ggttacaaat aaagcaatag    660
catcacaaat ttcacaaata aagcattttt tcactgcat tctagttgtg gtttgtccaa    720
actcatcaat gtatcttatc atgtctggat ctcgacctcg actagagcat ggctacgtag    780
ataagtagca tggcgggtta atcattaact acaaggaacc cctagtgatg gagttggcca    840
ctccctctct gcgcgctcgc tcgctcactg aggccgggcg accaaaggtc gcccgacgcc    900
cgggctttgc ccgggcggcc tcagtgagcg agcgagcgcg cagctggcgt aatagcgaag    960
aggcccgcac cgatcgccct tcccaacagt tgcgcagcct gaatggcgaa tggcgattcc    1020
gttgcaatgg ctggcggtaa tattgttctg gatattacca gcaaggccga tagttttgagt    1080
tcttctactc aggcaagtga tgttattact aatcaaagaa gtattgcgac aacggttaat    1140
ttgcgtgatg gacagactct tttactcggt ggcctcactg attataaaaa cacttctcag    1200
gattctggcg taccgttcct gtctaaaatc cttttaatcg gcctcctgtt tagctcccgc    1260
tctgattcta acgaggaaag cacgttatac gtgctcgtca aagcaaccat agtacgcgcc    1320
ctgtagcggc gcattaagcg cggcgggtgt ggtggttacg ccgcagcgtga ccgctacact    1380
tgccagcgcc ctagcgcccg ctcctttcgc tttcttccct tcctttctcg ccacgttcgc    1440
cggctttccc cgtcaagctc taaatcgggg gctccctttta gggttccgat ttagtgcttt    1500
acggcacctc gaccccaaaa aacttgatta gggtgatggt tcacgtagtg gccatcgcc    1560
ctgatagacg gttttttcgcc ctttgacgtt ggagtccacg ttctttaata gtggactctt    1620
gttccaaact ggaacaacac tcaacctctat ctcggtctat tcttttgatt tataagggat    1680
tttgccgatt tcggcctatt ggttaaaaaa tgagctgatt taacaaaaat ttaacgcgaa    1740
ttttaacaaa atattaacgt ttacaattta aatatttgct tatacaatct tcctgttttt    1800
ggggcttttc tgattatcaa ccggggtaca tatgattgac atgctagttt tacgattacg    1860
ttcatcgat tctcttgttt gctccagact ctcaggcaat gacctgatag cctttgtaga    1920
gacctctcaa aaatagctac cctctccggc atgaatttat cagctagaac ggttgaatat    1980
catattgatg gtgatttgac tgtctccggc ctttctcacc cgtttgaatc tttacctaca    2040
cattactcag gcattgcatt taaaatatat gagggttcta aaaattttta tccttgcgtt    2100
gaaataaagg cttctcccgc aaaagtatta cagggtcata atgtttttgg tacaaccgat    2160
ttagctttat gctctgaggc tttattgctt aattttgcta attcttttgcc ttgcctgtat    2220
gatttatggg atgttgggaat tcctgatgcg gtattttctc cttacgcatc tgtgcggtat    2280
ttcacaccgc atatggtgca ctctcagtac aatctgctct gatgccgcat agttaagcca    2340
gccccgacac ccgccaacac ccgctgacgc gccctgacgg gcttgtctgc tcccggcatc    2400
cgcttacaga caagctgtga ccgtctccgg gagctgcatg tgtcagaggt tttcaccgtc    2460
atcaccgaaa cgcgcgagac gaaagggcct cgtgatacgc ctatttttat aggttaatgt    2520
catgataata atggtttctt agacgtcagg tggcactttt cggggaaatg tgcgcggaac    2580
ccctatttgt ttatttttct aaatacattc aaatatgtat ccgctcatga caataaccc    2640
ctgataaatg cttcaataat attgaaaaag gaagagtatg agtattcaac atttccgtgt    2700
cgcccttatt ccctttttgc ggcattttgcc cttcctgttt ttgctcacc cagaaacgct    2760
ggtgaaagta aaagatgctg aagatcagtt gggtgcacga gtgggttaca tcgaactgga    2820
tctcaacagc ggtaagatcc ttgagagttt tcgccccgaa gaacgttttc caatgatgag    2880
cacttttaaa gttctgctat gtggcgcggt attatcccgt attgacgccg ggcaagagca    2940
actcggtcgc cgcatacact attctcagaa tgacttggtt gagtactcac cagtcacaga    3000
aaagcatctt acggatggca tgacagtaag agaattatgc agtgctgcca taaccatgag    3060
```

```
tgataacact gcggccaact tacttctgac aacgatcgga ggaccgaagg agctaaccgc  3120
ttttttgcac aacatggggg atcatgtaac tcgccttgat cgttgggaac cggagctgaa  3180
tgaagccata ccaaacgacg agcgtgacac cacgatgcct gtagcaatgg caacaacgtt  3240
gcgcaaacta ttaactggcg aactacttac tctagcttcc cggcaacaat taatagactg  3300
gatggaggcg gataaagttg caggaccact tctgcgctcg gcccttccgg ctggctggtt  3360
tattgctgat aaatctggag ccggtgagcg tgggtctcgc ggtatcattg cagcactggg  3420
gccagatggt aagccctccc gtatcgtagt tatctcacg acgggagtc aggcaactat  3480
ggatgaacga aatagacaga tcgctgagat aggtgcctca ctgattaagc attggtaact  3540
gtcagaccaa gtttactcat atatacttta gattgattta aaacttcatt tttaatttaa  3600
aaggatctag gtgaagatcc ttttttgataa tctcatgacc aaaatccctt aacgtgagtt  3660
ttcgttccac tgagcgtcag acccgtaga aaagatcaaa ggatcttctt gagatccttt  3720
ttttctgcgc gtaatctgct gcttgcaaac aaaaaaacca ccgctaccag cggtggtttg  3780
tttgccggat caagagctac caactctttt tccgaaggta actggcttca gcagagcgca  3840
gataccaaat actgtccttc tagtgtagcc gtagttaggc caccacttca agaactctgt  3900
agcaccgcct acatacctcg ctctgctaat cctgttacca gtggctgctg ccagtggcga  3960
taagtcgtgt cttaccggt tggactcaag acgatagtta ccggataagg cgcagcggtc  4020
gggctgaacg gggggttcgt gcacacagcc cagcttggag cgaacgacct acaccgaact  4080
gagataccta cagcgtgagc tatgagaaag cgccacgctt cccgaaggga gaaaggcgga  4140
caggtatccg gtaagcggca gggtcggaac aggagagcgc acgagggagc ttccaggggg  4200
aaaacgcctgg tatctttata gtcctgtcgg gtttcgccac ctctgacttg agcgtcgatt  4260
tttgtgatgc tcgtcagggg gcggagcct atggaaaaac gccagcaacg cggcctttt  4320
acggttcctg gccttttgct ggccttttgc tcacatgttc tttcctgcgt tatccctga  4380
ttctgtggat aaccgtatta ccgcctttga gtgagctgat accgctcgcc gcagccgaac  4440
gaccgagcgc agcgagtcag tgagcgagga agcggaagag cgcccaatac gcaaaccgcc  4500
tctccccgcg cgttggccga ttcattaatg cagcagctgc gcgctcgctc gctcactgag  4560
gccgcccggg caaagcccgg gcgtcgggcg acctttgtc gcccggcctc agtgagcgag  4620
cgagcgcgca gagagggagt ggccaactcc atcactaggg gttccttgta gttaatgatt  4680
aacccgccat gctacttatc tacgtagcca tgctctagga cattgattat tgactagtgg  4740
agttccgcgt tacataactt acggtaaatg gcccgcctgg ctgaccgccc aacgacccc  4800
gcccattgac gtcaataatg acgtatgttc ccatagtaac gccaatgagg acttcccatt  4860
gacgtcaatg ggtggagtat ttacggtaaa ctgcccactt ggcagtacat caagtgtatc  4920
atatgccaag tacgcccct attgacgtca atgacggtaa atggcccgcc tggcattatg  4980
cccagtacat gaccttatgg gactttccta cttggcagta catctacgta ttagtcatcg  5040
ctattaccat ggtcgaggtg agccccacgt tctgcttcac tctccccatc tccccccc  5100
ccccaccccc aattttgtat ttatttattt tttaattatt ttgtgcagcg atgggggcgg  5160
ggggggggg gggcgcgcgc caggcgggc ggggcggggc gagggcggg gcggggcgag  5220
gcggagaggt gcggcggcag ccaatcagag cggcgcgctc cgaaagtttc cttttatggc  5280
gaggcggcgg cggcggcggc cctataaaaa gcgaagcgcg cggcgggcgg gagtcgctgc  5340
gcgctgcctt cgccccgtgc cccgctccgc cgccgcctcg cgccgcccgc cccggctctg  5400
actgaccgcg ttactaaaac aggtaagtcc ggcctccgcg ccgggttttg gcgcctcccg  5460
cgggcgcccc cctcctcacg cgcagcgctg ccacgtcaga cgaagggcgc agcgagcgtc  5520
ctgatccttc cgcccggacg ctcaggacag cggcccgctg ctcataagac tcggccttag  5580
aaccccagta tcagcagaag gacatttag gacgggactt gggtgactct agggcactgg  5640
ttttctttcc agagagcgga acaggcgagg aaaagtagtc ccttctcggc gattctgcgg  5700
agggatctcc gtggggcgt gaacgccgat gatgcctcta ctaaccatgt tcatgttttc  5760
ttttttttc tacaggtcct gggtgacgaa cagggtaccg ccaccatggc caccggctct  5820
cgcacaagcc tgctgctggc tttcgactg ctgtgcctgc cttggctcca ggaggggccc  5880
gccgctagca tcgataccgt cgctatgtgc tggaggcttg ctgaaggctg tatgctgtaa  5940
ggtggttatg ggagaatgcc gttttggcct ctgactgacg gcattctcct aaccaccta  6000
caggacacaa ggcctgttac tagcactcac atggaacaaa tggcctctag cctggaggct  6060
tgctgaaggc tgtatgctgt tgagtttcgc attcttgttg ccgtttttgc ctctgactag  6120
cggcaacaag agcgaaactc aacaggacac aaggcctgtt actagcactc acatggaaca  6180
aatgcctct agcctggagg cttgctgaag gctgtatgct gtctatcctt tcaagctagt  6240
caccgttttg gcctctgact gacggtgact agcgaaagga tagacaggac acaaggcctg  6300
ttactagcac tcacatggaa caaatggcct ctctagaat                          6339

SEQ ID NO: 11          moltype = DNA  length = 6339
FEATURE                Location/Qualifiers
source                 1..6339
                       mol_type = other DNA
                       organism = synthetic construct
SEQUENCE: 11
aatcaacctc tggattacaa aatttgtgaa agattgactg gtattcttaa ctatgttgct  60
ccttttacgc tatgtggata cgctgcttta atgcctttgt atcatgctat tgcttcccgt  120
atggctttca ttttctcctc cttgtataaa tcctggttgc tgtctcttta tgaggagttg  180
tggcccgttg tcaggcaacg tggcgtggtg tgcactgtgt ttgctgacgc aaccccccact  240
ggttgggca ttgccaccac ctgtcagctc ctttccggga ctttcgcttt ccccctccct  300
attgccacgg cggaactcat cgccgcctgc cttgcccgct gctggacagg ggctcggctg  360
ttgggcactg acaattccgt ggtgttgtcg gggaaatcat cgtccttttcc ttggctgctc  420
gcctgtgttg ccacctggat tctgcgcggg acgtccttct gctacgtccc ttcggccctc  480
aatccagcgg accttccttc ccgcggcctg ctgccggctc tgcggcctct tccgcgtctt  540
cgccttcgcc ctcagacgag tcggatctcc ctttgggccg cctccccgcc taagcttatc  600
gataccgtcg agatctaact tgtttattgc agcttataat ggttacaaat aaagcaatag  660
catcacaaat ttcacaaata aagcattttt tcactgcatt ctagttgtgg tttgtccaaa  720
actcatcaat gtatcttatc atgtctggat ctcgacctcg actagagcat ggctacgtag  780
ataagtagca tggcgggtta atcattaact acaaggaacc cctagtgatg gagttggcca  840
ctccctctct gcgcgctcgc tcgctcactg aggccgggcg accaaggtc gcccgacgcc  900
cgggctttgc ccgggcggcc tcagtgagcg agcgagcgcg cagctggcgt aatagcgaag  960
aggcccgcac cgatcgccct tcccaacagt tgcgcagcct gaatggcgaa tggcgattcc  1020
```

```
gttgcaatgg ctggcggtaa tattgttctg gatattacca gcaaggccga tagtttgagt   1080
tcttctactc aggcaagtga tgttattact aatcaaagaa gtattgcgac aacggttaat   1140
ttgcgtgatg gacagactct tttactcggt ggcctcactg attataaaaa cacttctcag   1200
gattctggcg taccgttcct gtctaaaatc cctttaatcg gcctcctgtt tagctcccgc   1260
tctgattcta acgaggaaag cacgttatac gtgctcgtca aagcaaccat agtacgcgcc   1320
ctgtagcggc gcattaagcg cggcgggtgt ggtggttacg cgcagcgtga ccgctacact   1380
tgccagcgcc ctagcgcccg ctcctttcgc tttcttccct tcctttctcg ccacgttcgc   1440
cggctttccc cgtcaagctc taaatcgggg ctccctttta gggttccgat ttagtgcttt   1500
acggcacctc gaccccaaaa aacttgatta gggtgatggt tcacgtagtg ggccatcgcc   1560
ctgatagacg gttttcgcc ctttgacgtt ggagtccacg ttctttaata gtggactctt   1620
gttccaaact ggaacaacac tcaaccctat ctccggtctat tcttttgatt tataagggat   1680
tttgccgatt tcggcctatt ggttaaaaaa tgagctgatt taacaaaaat ttaacgcgaa   1740
ttttaacaaa atattaacgt ttacaattta aatatttgct tatacaatct tcctgttttt   1800
ggggcttttc tgattatcaa ccggggtaca tatgattgac atgctagttt tacgattacc   1860
gttcatcgat tctcttgttt gctccagact ctcaggcaat gacctgatag cctttgtaga   1920
gacctctcaa aaatagctac cctctccggc atgaatttat cagctagaac ggttgaatat   1980
catattgatg gtgatttgac tgtctccggc ctttctcacc cgtttgaatc tttacctaca   2040
cattactcag gcattgcatt taaaatatat gagggttcta aaaattttta tccttgcgtt   2100
gaaataaagg cttctcccgc aaaagtatta caggtgcata atgttttttgg tacaaccgat   2160
ttagctttat gctctgaggc tttattgctt aattttgcta attctttgcc ttgcctgtat   2220
gatttattgg atgttggaat tcctgatgcg gtattttctc cttacgcatc tgtgcggtat   2280
ttcacaccgc atatggtgca ctctcagtac aatctgctct gatgccgcat agttaagcca   2340
gccccgacac cgccaacac cgctgacgc gccctgacgg gcttgtctgc tcccggcatc   2400
cgcttacaga caagctgtga ccgtctccgg gagctgcatg tgtcagaggt tttcaccgtc   2460
atcaccgaaa cgcgcgagac gaaagggcct cgtgatacgc ctatttttat aggttaatgt   2520
catgataata atggtttctt agacgtcagg tggcactttt cggggaaatg tgcgcggaac   2580
ccctatttgt ttatttttct aaatacattc aaatatgtat ccgctcatga gacaataacc   2640
ctgataaatg cttcaataat attgaaaaag gaagagtatg agtattcaac atttccgtgt   2700
cgcccttatt ccctttttg cggcattttg ccttcctgtt tttgctcacc cagaaacgct   2760
ggtgaaagta aaagatgctg aagatcagtt gggtgcacga gtgggttaca tcgaactgga   2820
tctcaacagc ggtaagatcc ttgagagttt tcgccccgaa gaacgttttc caatgatgag   2880
cacttttaaa gttctgctat gtggcgcggt attatcccgt attgacgccg ggcaagagca   2940
actcggtcgc cgcatacact attctcagaa tgacttggtt gagtactcac cagtcacaga   3000
aaagcatctt acggatggca tgacagtaag agaattatgc agtgctgcca taaccatgag   3060
tgataacact gcggccaact tacttctgac aacgatcgga ggaccgaagg agctaaccgc   3120
tttttttgcac aacatggggg atcatgtaac tcgccttgat cgttgggaac cggagctgaa   3180
tgaagccata ccaaacgacg agcgtgacac cacgatgcct gtagcaatgg caacaacgtt   3240
gcgcaaacta ttaactggcg aactacttac tctagcttcc cggcaacaat taatagactg   3300
gatggaggcg gataaagttg caggaccact tctgcgctcg gcccttccgg ctggctgttt   3360
tattgctgat aaatctggag ccggtgagcg tgggtctcgc ggtatcattg cagcactggg   3420
gccagatggt aagccctccc gtatcgtagt tatctacacg acggggagtc aggcaactat   3480
ggatgaacga aatagacaga tcgctgagat aggtgcctca ctgattaagc attggtaact   3540
gtcagaccaa gtttactcat atatacttta gattgattta aaacttcatt tttaatttaa   3600
aaggatctag gtgaagatcc tttttgataa tctcatgacc aaaatccctt aacgtgagtt   3660
ttcgttccac tgagcgtcag accccgtaga aagatcaaa ggatcttctt gagatccttt   3720
ttttctgcgc gtaatctgct gcttgcaaac aaaaaaacca ccgctaccag cggtggtttg   3780
tttgccggat caagagctac caactctttt tccgaaggta actggcttca gcagagcgca   3840
gataccaaat actgtccttc tagtgtagcc gtagttaggc caccacttca agaactctgt   3900
agcaccgcct acatacctcg ctctgctaat cctgttacca gtggctgctg ccagtggcga   3960
taagtcgtgt cttaccgggt tggactcaag acgatagtta ccggataagg cgcagcggtc   4020
gggctgaacg gggggttcgt gcacacagcc cagcttggag cgaacgacct acaccgaact   4080
gagataccta cagcgtgagc tatgagaaag cgccacgctt cccgaaggga gaaaggcgga   4140
caggtatccg gtaagcggca gggtcggaac aggagagcgc acgagggagc ttccaggggg   4200
aaaacgcctg tatctttata gtcctgtcgg gtttcgccac ctctgacttg agcgtcgatt   4260
tttgtgatgc tcgtcagggg gcggagcct atggaaaaac gccagcaacg cggccttttt   4320
acggttcctg gccttttgct ggccttttgc tcacatgttc tttcctgcgt tatcccctga   4380
ttctgtggat aaccgtatta ccgcctttga gtgagctgat accgctcgcc gcagccgaac   4440
gaccgagcgc agcgagtcag tgagcgagga agcggaagag cgcccaatac gcaaaccgcc   4500
tctccccgcg cgttggccga ttcattaatg cagcagctgc gcgctcgctc gctcactgag   4560
gccgccggga caaagccgg gcgtcgggcg acctttggtc gcccggcctc agtgagcgag   4620
cgagcgcgca gagagggagt ggccaactcc atcactaggg gttccttgta gttaatgatt   4680
aacccgccat gctacttatc tacgtagcca tgctctagga cattgattat tgactagtgg   4740
agttccgcgt tacataactt acggtaaatg gcccgcctgg ctgaccgccc aacgaccccc   4800
gcccattgac gtcaataatg acgtatgttc ccatagtaac gccaataggg actttccatt   4860
gacgtcaatg ggtggagtat ttacggtaaa ctgcccactt ggcagtacat caagtgtatc   4920
atatgccaag tacgccccct attgacgtca atgacggtaa atggcccgcc tggcattatg   4980
cccagtacat gaccttatgg gactttccta cttggcagta catctacgta ttagtcatcg   5040
ctattaccat ggtcgaggtg agccccacgt tctgcttcac tctccccatc tccccccctc   5100
cccacccccc aattttgtat ttatttattt tttaattatt ttgtgcagcg atgggggcgg   5160
gggggggggg gggcgcgcgc caggcggggc ggggcggggc gaggggcggg gcggggcgag   5220
gcggagaggt gcggcggcag ccaatcagag cggcgcgctc cgaaagtttc cttttatggc   5280
gaggcggcgg cggcggcggc cctataaaaa gcgaagcgcg cggcgggcgg gagtcgctgc   5340
gcgctgcctt cgccccgtgc cccgctccgc cgccgcctcg cgccgcccgc cccggctctg   5400
actgaccgcg ttactaaaac aggtaagtcc ggcctccggg gcctccctga   5460
cgggcgcccc cctcctcacg gcgagcgctg ccagtcaga cgaagggcgc agcgagcgtc   5520
ctgatccttc cgcccggacg ctcaggacag cggcccgctg ctcataagac tcggccttag   5580
aaccccagta tcagcagaag gacatttag gacgggactt gggtgactct agggcactgg   5640
ttttctttcc agagagcgga acaggcgagg aaaagtagtc ccttctcggc gattctgcgg   5700
agggatctcc gtggggcggt gaacgccgat gatgcctcta ctaaccatgt tcatgttttc   5760
```

```
tttttttttc tacaggtcct gggtgacgaa cagggtaccg ccaccatggc caccggctct  5820
cgcacaagcc tgctgctggc tttcggactg ctgtgcctgc cttggctcca ggagggctcc  5880
gccgctagca tcgataccgt cgctatgtgc tggaggcttg ctgaaggctg tatgctgaag  5940
ttagcatgtg tcccagaacc gttttggcct ctgactgacg gttctgggac atgctaactt  6000
caggacacaa ggcctgttac tagcactcac atggaacaaa tggcctctag cctggaggct  6060
tgctgaaggc tgtatgctga agaagaaggt atcccaattg ccgttttggc ctctctgactga  6120
cggcaattgg gaccttttctt ctcaggacac aaggcctgtt actagcactc acatggaaca  6180
aatggcctct agcctggagg cttgctgaag gctgtatgct gtagtgtttc caaatactgc  6240
ttgcgttttg gcctctgact gacgcaagca gtatggaaac actacaggac acaaggcctg  6300
ttactagcac tcacatggaa caaatggcct ctctagaat                          6339

SEQ ID NO: 12          moltype = DNA   length = 6339
FEATURE                Location/Qualifiers
source                 1..6339
                       mol_type = other DNA
                       organism = synthetic construct
SEQUENCE: 12
aatcaacctc tggattacaa aatttgtgaa agattgactg gtattcttaa ctatgttgct  60
ccttttacgc tatgtggata cgctgcttta atgcctttgt atcatgctat tgcttcccgt  120
atggctttca ttttctcctc cttgtataaa tcctggttgc tgtctctctta tgaggagttg  180
tggcccgttg tcaggcaacg tggcgtggtg tgcactgtgt ttgctgacgc aacccccact  240
ggttggggca ttgccaccac ctgtcagctc ctttccgggca cttttcgcttt ccccctccct  300
attgccacgg cggaactcat cgccgcctgc cttgcccgct gctggacagg ggctcggctg  360
ttgggcactg acaattccgt ggtgttgtcg gggaaatcat cgtcctttcc ttggctgctc  420
gcctgtgttg ccacctggat tctgcgcggg acgtccttct gctacgtccc ttcggccctc  480
aatccagcgg accttcctc ccgcggcctg ctgccggctc ctccgcgtct tcgcct         540
cgccttcgcc ctcagacgag tcggatctcc ctttgggccg cctccccgcc taagcttatc  600
gataccgtcg agatcaact tgttattgc agcttataat ggttacaaat aaagcaatag  660
catcacaaat ttcacaaata aagcattttt ttcactgcat tctagttgtg gtttgtccaa  720
actcatcaat gtatcttatc atgtctggat ctcgacctcg atagagcat ggctacgtag  780
ataagtagca tggcgggtta atcattaact acaaggaacc cctagtgatg gagttggcca  840
ctccctctct gcgcgctcgc tcgctcactg aggccgggcg accaaaggtc gcccgacgcc  900
cgggctttgc ccgggcggcc tcagtgagcg agcgagcgcg cagctggcgt aatagcgaag  960
aggcccgcac cgatcgccct tcccaacagt tgcgcagcct gaatggcgaa tggcgattcc  1020
gttgcaatgg ctggcggtaa tattgttctg gatattacca gcaaggccga tagtttgagt  1080
tcttctactc aggcaagtga tgttattact aatcaaagaa gtattgcgac aacgttaat   1140
ttgcgtgatg gacagactct tttactcggt ggcctcactg attataaaaa cacttctcag  1200
gattctggcg taccgttcct gtctaaaatc cctttaatcg gcctcctgtt tagctccgc  1260
tctgattcta acgaggaaag cacgttatac tgtctcgtca aagcaaccat agtacgcgc   1320
ctgtagcggc gcattaagcg cggcgggtgt ggtggttacg cgcagcgtga ccgctacact  1380
tgccagcgcc ctagcgcccg ctcctttcgc tttcttccct tcctttctcg ccacgttcgc  1440
cggctttccc cgtcaagctc taaatcgggg gctcccttta gggttccgat ttagtgcttt  1500
acggcacctc gaccccaaaa aacttgatta gggtgatggt tcacgtagtg ggccatcgcc  1560
ctgatagacg gtttttcgcc ctttgacgtt ggagtccacg ttctttaata gtggactctt  1620
gttccaaact ggaacaacac tcaacccctat ctcggtctat tcttttgatt tataagggat  1680
tttgccgatt tcggcctatt ggttaaaaaa tgagctgatt taacaaaaat ttaacgcgaa  1740
ttttaacaaa atattaacgt ttacaattta aatatttgct tatacaatct tcctgttttt  1800
ggggcttttc tgattatcaa ccggggtaca tatgattgac atgctagttt tacgattacc  1860
gttcatcgat tctcttgttt gctccagact ctcaggcaat gacctgatag cctttgtaga  1920
gacctctcaa aaatagctac cctctccggc atgaattat cagctagaac ggttgaatat  1980
catattgatg gtgatttgac tgtctccggc ctttctcacc cgtttgaatc tttacctaca  2040
cattactcag gcattgcatt taaaatatat gagggttcta aaaatttta tccttgcgtt  2100
gaaataaagg cttctcccgc aaaagtatta cagggtcata atgtttttgg tacaaccgat  2160
ttagctttat gctctgaggc tttattgctt aattttgcta attctttgcc ttgcctgtat  2220
gatttattgg atgttggaat tcctgatgcg gtattttctc cttacgcatc tgtgcggtat  2280
ttcacaccgc atatggtgca ctctcagtac aatctgctct gatgccgcat agttaagcca  2340
gccccgacac ccgccaacac ccgctgacgc gccctgacgg gcttgtctgc tcccggcatc  2400
cgcttacaga caagctgtga ccgtctccgg gagctgcatg tgtcagaggt tttcaccgtc  2460
atcaccgaaa cgcgcgagac gaaagggcct cgtgatacgc ctatttttat aggttaatgt  2520
catgataata atggttctt agacgtcagg tggcacttt cggggaaatg tgcgcggaac  2580
ccctatttgt ttatttttct aaatacattc aaatatgtat ccgctcatga dacaataacc  2640
ctgataaatg cttcaataat attgaaaaag gaagagtatg agtattcaac atttccgtgt  2700
cgcccttatt ccctttttttg cggcattttg ccttcctgtt tttgctcacc cagaaacgct  2760
ggtgaaagta aaagatgctg aagatcagtt gggtgcacga gtgggttaca tcgaactgga  2820
tctcaacagc ggtaagatcc ttgagagttt tcgccccgaa gaacgttttc caatgatgag  2880
cacttttaaa gttctgctat gtggcgcggt attatcccgt attgacgccg ggcaagagca  2940
actcggtcgc cgcatacact attctcagaa tgacttggtt gagtactcac cagtcacaga  3000
aaagcatctt acggatggca tgacagtaag agaattatgc agtgctgcca taaccatgag  3060
tgataacact gcggccaact tacttctgac aacgatcgga ggaccgaagg agctaaccgc  3120
tttttttgcac aacatggggg atcatgtaac tcgccttgat cgttgggaac cggagctgaa  3180
tgaagccata ccaaacgacg agcgtgacac cacgatgcct gtagcaatgg caacaacgtt  3240
gcgcaaacta ttaactggcg aactacttac tctagcttcc cggcaacaat taatagactg  3300
gatggaggcg gataaagttg caggaccact tctgcgctcg gcccttccgg ctggctggtt  3360
tattgctgat aaatctggag ccggtgagcg tgggtctcgc ggtatcattg cagcactggg  3420
gccagatggt aagccctccc gtatcgtagt tatctacacg acggggagtc aggcaactat  3480
ggatgaacga aatagacaga tcgctgagat aggtgcctca ctgattaagc attggtaact  3540
gtcagaccaa gtttactcat atatacttta gattgattta aaacttcatt tttaatttaa  3600
aaggatctag gtgaagatcc ttttttgataa tctcatgacc aaaatccctt aacgtgagtt  3660
ttcgttccac tgagcgtcag accccgtaga aaagatcaaa ggatcttctt gagatccttt  3720
```

| | | | | |
|---|---|---|---|---|
| ttttctgcgc | gtaatctgct | gcttgcaaac | aaaaaaacca | ccgctaccag cggtggtttg 3780 |
| tttgccggat | caagagctac | caactctttt | tccgaaggta | actggcttca gcagagcgca 3840 |
| gataccaaat | actgtccttc | tagtgtagcc | gtagttaggc | caccacttca agaactctgt 3900 |
| agcaccgcct | acatacctcg | ctctgctaat | cctgttacca | gtggctgctg ccagtggcga 3960 |
| taagtcgtgt | cttaccgggt | tggactcaag | acgatagtta | cggataagg cgcagcggtc 4020 |
| gggctgaacg | gggggttcgt | gcacacagcc | cagcttggag | cgaacgacct acaccgaact 4080 |
| gagataccta | cagcgtgagc | tatgagaaag | cgccacgctt | cccgaaggga gaaaggcgga 4140 |
| caggtatccg | gtaagcggca | gggtcggaac | aggagagcgc | acgagggagc ttccaggggg 4200 |
| aaacgcctgg | tatctttata | gtcctgtcgg | gtttcgccac | ctctgacttg agcgtcgatt 4260 |
| tttgtgatgc | tcgtcagggg | ggcggagcct | atggaaaaac | gccagcaacg cggccttttt 4320 |
| acggttcctg | gccttttgct | ggcctttgc | tcacatgttc | tttcctgcgt tatccctga 4380 |
| ttctgtggat | aaccgtatta | ccgcctttga | gtgagctgat | accgctcgcc gcagccgaac 4440 |
| gaccgagcgc | agcgagtcag | tgagcgagga | agcggaagag | cgcccaatac gcaaaccgcc 4500 |
| tctccccgcg | cgttggccga | ttcattaatg | cagcagctgc | gcgctcgctc gctcactgag 4560 |
| gccgcccggg | caaagcccgg | gcgtcgggcg | acctttggtc | gcccggcctc agtgagcgag 4620 |
| cgagcgcgca | gagagggagt | ggccaactcc | atcactaggg | gttccttgta gttaatgatt 4680 |
| aacccgccat | gctacttatc | tacgtagcca | tgctctagga | cattgattat tgactagtgg 4740 |
| agttccgcgt | tacataactt | acggtaaatg | gcccgcctgg | ctgaccgccc aacgacccc 4800 |
| gcccattgac | gtcaataatg | acgtatgttc | ccatagtaac | gccaataggg actttccatt 4860 |
| gacgtcaatg | ggtggagtat | ttacggtaaa | ctgcccactt | ggcagtacat caagtgtatc 4920 |
| atatgccaag | tacgccccct | attgacgtca | atgacgtaa | atggcccgcc tggcattatg 4980 |
| cccagtacat | gaccttatgg | gactttccta | cttggcagta | catctacgta ttagtcatcg 5040 |
| ctattaccat | ggtcgaggtg | agccccacgt | tctgcttcac | tctccccatc tcccccccct 5100 |
| ccccacccc | aattttgtat | ttatttattt | tttaattatt | ttgtgcagcg atgggggcgg 5160 |
| gggggggggg | gggcgcgcgc | caggcgggc | ggggcgggc | gaggggcggg gcggggcgag 5220 |
| gcggagaggt | gcggcgacag | ccaatcagag | cggcgcgctc | cgaaagtttc cttttatgcc 5280 |
| gaggcggcgg | cggcggcggc | cctataaaaa | gcgaagcgcg | cggcgggcgg gagtcgctgc 5340 |
| gcgctgcctt | cgccccgtgc | cccgctccgc | cgccgcctcg | cgccgcccgc cccggctctg 5400 |
| actgaccgcg | ttactaaaac | aggtaagtcc | ggcctccgcg | ccgggttttg gcgcctcccg 5460 |
| cgggcgcccc | cctcctcacg | gcgagcgctg | ccacgtcaga | cgaagggcgc agcgagcgtc 5520 |
| ctgatccttc | cgcccggacg | ctcaggacag | cggcccgctg | ctcataagac tcggccttag 5580 |
| aaccccagta | tcagcagaag | gacatttag | gacgggactt | gggtgactct agggcactgg 5640 |
| ttttcttcc | agagagcgga | acaggcgagg | aaaagtagtc | ccttctcggc gattctgcgg 5700 |
| agggatctcc | gtggggcggt | gaacgccgat | gatgcctcta | ctaaccatgt tcatgttttc 5760 |
| tttttttc | tacaggtcct | gggtgacgaa | cagggtaccg | ccaccatgtc caccggctct 5820 |
| cgcacaagcc | tgctgctggc | tttcggactg | ctgtgcctgc | cttggctcca ggagggctcc 5880 |
| gccgctagca | tcgataccgt | cgctatgtgc | tggaggcttg | ctgaaggctg tatgctgtct 5940 |
| gacagtgatg | tcatcctttc | gttttggcct | ctgactgacg | aaaggatgat cactgtcaga 6000 |
| caggacacaa | ggcctgttac | tagcactcac | atggaacaaa | tggcctctag cctggaggct 6060 |
| tgctgaaggc | tgtatgctga | tttaggtcag | atggaaactc | gcgttttggc ctctgactga 6120 |
| cgcgagtttc | cctgacctaa | atcaggacac | aaggcctgtt | actagcactc acatggaaca 6180 |
| aatggcctct | agcctggagg | cttgctgaag | gctgtatgct | gagtgtatgc ttaacgtgga 6240 |
| cttcgttttg | gcctctgact | gacgaagtcc | acgaagcata | cactcaggac acaaggcctg 6300 |
| ttactagcac | tcacatggaa | caaatggcct | ctctagaat | 6339 |

SEQ ID NO: 13          moltype = DNA   length = 6339
FEATURE                Location/Qualifiers
source                 1..6339
                       mol_type = other DNA
                       organism = synthetic construct
SEQUENCE: 13

| | | | | |
|---|---|---|---|---|
| aatcaacctc | tggattacaa | aatttgtgaa | agattgactg | gtattcttaa ctatgttgct 60 |
| ccttttacgc | tatgtggata | cgctgcttta | atgcctttgt | atcatgctat tgcttcccgt 120 |
| atggctttca | ttttctcctc | cttgtataaa | tcctggttgc | tgtctcttta tgaggagttg 180 |
| tggcccgttg | tcaggcaacg | tggcgtggtg | tgcactgtgt | ttgctgacgc aaccccccact 240 |
| ggttggggca | ttgccaccac | ctgtcagctc | ctttccggga | cttttcgctt tccccctccct 300 |
| attgccacgg | cggaactcat | cgccgcctgc | cttgcccgct | gctggacagg gctcggctg 360 |
| ttgggcactg | acaattccgt | ggtgttgtcg | gggaaatcat | cgtcctttcc ttggctgctc 420 |
| gcctgtgttg | ccacctggat | tctgcgcggg | acgtccttct | gctacgtccc ttcggccctc 480 |
| aatccagcgg | accttccttc | ccgcggcctg | ctgccggctc | tgcgcctctt tccgcgtctt 540 |
| cgccttcgcc | ctcagacgag | tcggatctcc | ctttgggccg | cctccccgcc taagcttatc 600 |
| gataccgtca | agatctaact | tgtttattgc | agcttataat | ggttacaaat aaagcaatag 660 |
| catcacaaat | ttcacaaata | aagcattttt | ttcactgcat | tctagttgtg gtttgtccaa 720 |
| actcatcaat | gtatcttatc | atgtctggat | ctcgacctcg | acatagagct tgctacgtag 780 |
| ataagtagca | tggcgggtta | atcattaact | acaaggaacc | cctagtgatg gagttggcca 840 |
| ctccctctct | gcgcgctcgc | tcgctcactg | aggccgggcg | accaaggtc gcccgacgcc 900 |
| cgggctttgc | ccgggcggcc | tcagtgagcg | agcgagcgcg | cagctggcgt aatagcgaag 960 |
| aggcccgcac | cgatcgccct | tcccaacagt | tgcgcagcct | gaatggcgaa tggcgattcc 1020 |
| gttgcaatgg | ctggcggtaa | tattgttctg | gatattacca | gcaaggccga tagtttgagt 1080 |
| tcttctactc | aggcaagtga | tgttattact | aatcaaagaa | gtattgcgac aacggttaat 1140 |
| ttgcgtgatg | gacagactct | tttactcggt | ggcctcactg | attataaaa cacttctcag 1200 |
| gattctggcg | taccgttcct | gtctaaaatc | cctttaatcg | gcctcctgtt tagctcccgc 1260 |
| tctgattcta | acgaggaaag | cacgttatac | gtgctcgtca | aagcaaccat agtacgcgcc 1320 |
| ctgtagcggc | gcattaagcg | cggcgggtgt | ggtggttacg | gcgcagcgtga ccgctacact 1380 |
| tgccagcgcc | ctagcgcccg | ctcctttcgc | tttcttccct | tcctttctcg ccacgttcgc 1440 |
| cggctttccc | cgtcaagctc | taaatcgggg | gctccctta | gggttccgat ttagtgcttt 1500 |
| acggcacctc | gaccccaaaa | aacttgatta | gggtgatggt | tcacgtagtg gccatcgcc 1560 |
| ctgatagacg | gttttcgcc | ctttgacgtt | ggagtccacg | ttctttaata gtggactctt 1620 |
| gttccaaact | ggaacaacac | tcaacccctat | ctcggtctat | tcttttgatt tataagggat 1680 |

```
tttgccgatt tcggcctatt ggttaaaaaa tgagctgatt taacaaaaat ttaacgcgaa   1740
ttttaacaaa atattaacgt ttacaattta aatatttgct tatacaatct tcctgttttt   1800
ggggcttttc tgattatcaa ccggggtaca tatgattgac atgctagttt tacgattacc   1860
gttcatcgat tctcttgttt gctccagact ctcaggcaat gacctgatag cctttgtaga   1920
gacctctcaa aaatagctac cctctccggc atgaatttat cagctagaac ggttgaatat   1980
catattgatg gtgatttgac tgtctccggc ctttctcacc cgtttgaatc tttacctaca   2040
cattactcag gcattgcatt taaaatatat gaggggttcta aaaattttta tccttgcgtt   2100
gaaataaagg cttctcccgc aaaagtatta cagggtcata atgttttttgg tacaaccgat   2160
ttagctttat gctctgaggc tttattgctt aattttgcta attctttgcc ttgcctgtat   2220
gatttattgg atgttggaat tcctgatgcg gtatttttctc cttacgcatc tgtgcggtat   2280
ttcacaccgc atatggtgca ctctcagtac aatctgctct gatgccgcat agttaagcca   2340
gccccgacac ccgccaacac ccgctgacgc gccctgacgg gcttgtctgc tcccggcatc   2400
cgcttacaga caagctgtga ccgtctccgg gagctgcatg tgtcagaggt tttcaccgtc   2460
atcaccgaaa cgcgcgagac gaaagggcct cgtgatacgc ctatttttat aggttaatgt   2520
catgataata atggtttctt agacgtcagg tggcactttt cggggaaatg tgcgcggaac   2580
ccctatttgt ttattttttct aaatacattc aaatatgtat ccgctcatga acaataacc    2640
ctgataaatg cttcaataat attgaaaaag gaagagtatg agtattcaac atttccgtgt   2700
cgcccttatt cccttttttg cggcatttttg ccttcctgtt tttgctcacc cagaaacgct   2760
ggtgaaagta aaagatgctg aagatcagtt gggtgcacga gtgggttaca tcgaactgga   2820
tctcaacagc ggtaagatcc ttgagagttt tcgccccgaa gaacgttttc caatgatgag   2880
cacttttaaa gttctgctat gtggcgcggt attatcccgt attgacgccg ggcaagagca   2940
actcggtcgc cgcatacact attctcagaa tgacttggtt gagtactcac cagtcacaga   3000
aaagcatctt acgatggca tgacagtaag agaattatgc agtgctgcca taaccatgag   3060
tgataacact gcggccaact tacttctgac aacgatcgga ggaccgaagg agctaaccgc   3120
ttttttgcac aacatggggg atcatgtaac tcgccttgat cgttgggaac cggagctgaa   3180
tgaagccata ccaaacgacg agcgtgacac cacgatgcct gtagcaatgg caacaacgtt   3240
gcgcaaacta ttaactggcg aactacttac tctagcttcc cggcaacaat taatagactg   3300
gatgaggcg gataaagttg caggaccact tctgcgctcg gcccttccgg ctggctggtt    3360
tattgctgat aaatctggag ccggtgagcg tgggtctcgc ggtatcattg cagcactggg   3420
gccagatggt aagccctccc gtatcgtagt tatctacacg acggggagtc aggcaactat   3480
ggatgaacga aatagacaga tcgctgagat aggtgcctca ctgattaagc attggtaact   3540
gtcagaccaa gtttactcat atatacttta gattgattta aaacttcatt tttaatttaa   3600
aaggatctag gtgaagatcc ttttgataa tctcatgacc aaaatccctt aacgtgagtt    3660
ttcgttccac tgagcgtcag accccgtaga aaagatcaaa ggatcttctt gagatccttt   3720
ttttctgcgc gtaatctgct gcttgcaaac aaaaaaacca ccgctaccag cggtggtttg   3780
tttgccggat caagagctac caactctttt tccgaaggta actggcttca gcagagcgca   3840
gataccaaat actgtccttc tagtgtagcc gtagttaggc caccacttca agaactctgt   3900
agcaccgcct acatacctcg ctctgctaat cctgttacca gtggctgctg ccagtggcga   3960
taagtcgtgt cttaccgggt tggactcaag acgatagtta ccggataagg cgcagcggtc   4020
gggctgaacg gggggttcgt gcacacagcc cagcttggag cgaacgacct acaccgaact   4080
gagatacccta cagcgtgagc tatgagaaag cgccacgctt cccgaaggga aaggcggga    4140
caggtatccg gtaagcggca gggtcggaac aggagagcgc acgagggagc ttccagggg    4200
aaacgcctgg tatctttata gtcctgtcgg gtttcgccac ctctgacttg agcgtcgatt   4260
tttgtgatgc tcgtcagggg gcggagcct atggaaaaac gccagcaacg cggccttttt    4320
acggttcctg gccttttgct ggccttttgc tcacatgttc tttcctgcgt tatccctga    4380
ttctgtggat aaccgtatta ccgcctttga gtgagctgat accgctcgcc gcagccgaac   4440
gaccgagcg agcgagtcag tgagcgagga agcggaagag cgcccaatac gcaaaccgcc   4500
tctccccgcg cgttggccga ttcattaatg cagcagctgc gcgctcgctc gctcactgag   4560
gccgcccggg caaagcccgg gcgtcgggcg acctttggtc gcccggcctc agtgagcgag   4620
cgagcgcgca gagagggagt ggccaactcc atcactaggg gttccttgta gttaatgatt   4680
aacccgccat gctacttatc tacgtagcca tgctctagaa cattgattat tgactagtgg   4740
agttccgcgt tacataactt acggtaaatg gcccgcctgg ctgaccgccc aacgaccccc   4800
gcccattgac gtcaataatg acgtatgttc ccatagtaac gccaataggg actttccatt   4860
gacgtcaatg ggtggagtat ttacggtaaa ctgcccactt ggcagtacat caagtgtatc   4920
atatgccaag tacgccccct attgacgtca atgacggtaa atggcccgcc tggcattatg   4980
cccagtacat gaccttatgg gactttccta cttggcagta catctacgta ttagtcatcg   5040
ctattaccat ggtcgaggtg agccccacgt tctgcttcac tctccccatc tcccccccct   5100
ccccacccc aattttgtat ttattttattt ttaattatt ttgtgcagcg atgggggcg      5160
ggggggggg ggcgcgcgc caggcggggc ggggcggggc gaggggcggg gcggggcgag    5220
gcggagggt gcggcgcag ccaatcagag cggcgcgctc cgaaagtttc cttttatggc     5280
gaggcggcag cggcggcggc cctataaaaa gcgaagcgcg cggcgggcgg gagtcgctgc   5340
gcgctgcctt cgccccgtgc cccgctccgc cgccgcctcg cgccgcccgc cccggctctg   5400
actgaccgcg ttactaaaac aggtaagtcc ggcctccgcg ccgggttttg gcgcctcccg   5460
cgggcgcccc cctcctcacg gcgagcgctg ccacgtcaga gaagggcgc agcgtcgatt    5520
ctgatccttc cgcccggacg ctcaggacag cggcccgctg ctcataagac tcggccttag   5580
aaccccagta tcagcagaag gacatttag gacgggactt gggtgactct agggcactgg   5640
ttttcttttcc agagagcgga acaggcgagg aaaagtagtc ccttctcggc gattctgcgg   5700
agggatctcc gtgggcggt gaacgccgat gatgcctcta ctaaccatgt tcatgttttc   5760
ttttttttc tacaggtcct gggtgacgaa cagggtaccg ccaccatgtc caccggctct   5820
cgcacaagcc tgctgctggc tttcggactg ctgtgcctgc cttggctcca ggagggctcc   5880
gccgctagca tcgataccgt cgctatgtgc tggaggcttg ctgaaggctg tatgctgata   5940
cttcagcctg aatcgtgacc gttttggcct ctgactgacg gtcacgattg ctgaagtat    6000
caggacacaa ggcctgttac tagcactcac atggaacaaa tggcctctag cctggaggct   6060
tgctgaaggc tgtatgctga cttcactcat attgttccac tcgttttggc ctctgactga   6120
cgagtgggaac aatgagtgaa gtcaggacac aaggcctgtt actagcactc acatggaaca   6180
aatgccctct agcctggagg cttgctgaag gctgtatgct gtatattcta caaatcacca   6240
gggcgttttg gcctctgact gacgccctgg tgatgtagaa tatacaggac acaaggcctg   6300
ttactagcac tcacatggaa caaatggcct ctctagaat                          6339
```

SEQ ID NO: 14       moltype = DNA   length = 6339
FEATURE             Location/Qualifiers
source              1..6339
                    mol_type = other DNA
                    organism = synthetic construct
SEQUENCE: 14
aatcaacctc tggattacaa aatttgtgaa agattgactg gtattcttaa ctatgttgct   60
ccttttacgc tatgtggata cgctgcttta atgcctttgt atcatgctat tgcttcccgt  120
atggctttca ttttctcctc cttgtataaa tcctggttgc tgtctcttta tgaggagttg  180
tggcccgttg tcaggcaacg tggcgtggtg tgcactgtgt ttgctgacgc aaccccccact 240
ggttggggca ttgccaccac ctgtcagctc ctttccggga ctttcgcttt cccctccct  300
attgccacgg cggaactcat cgccgcctgc cttgcccgct gctggacagg ggctcggctg  360
ttgggcactg acaattccgt ggtgttgtcg gggaaatcat cgtcctttcc ttggctgctc  420
gcctgtgttg ccacctggat tctgcgcggg acgtcctcct gctacgtcct ttcggccctc  480
aatccagcgg accttcctcc ccgcggcctg ctgccggctc tgcggcctct tccgcgtctt  540
cgccttcgcc ctcagacgag tcggatctcc ctttgggccg cctcccgcc taagcttatc  600
gataccgtcg agatctaact tgtttattgc agcttataat ggttacaaat aaagcaatag  660
catcacaaat ttcacaaata aagcattttt ttcactgcat tctagttgtg gtttgtccaa  720
actcatcaat gtatcttatc atgtctggat ctcgacctcg actagagcat ggctacgtag  780
ataagtagca tggcgggtta atcattaact acaaggaacc cctagtgatg gagttggcca  840
ctcccctctct gcgcgctcgc tcgctcactg aggccgggcg accaaaggtc gcccgacgcc  900
cgggctttgc ccgggcggcc tcagtgagcg agcgagcgcg cagctggcgt aatagcgaag  960
aggcccgcac cgatcgccct tcccaacagt tgcgcagcct gaatggcgaa tggcgattcc 1020
gttgcaatgg ctgcgcgtaa tattgttctg gatattacca gcaaggccga tagtttgagt 1080
tcttctactc aggcaagtga tgttattact aatcaaagaa gtattgcgac aacgttaat 1140
ttgcgtgatg gacagactct tttactcggt ggcctcactg attataaaaa cacttctcag 1200
gattctggcg taccgttcct gtctaaaatc cctttaatcg gcctcctgtt tagctcccgc 1260
tctgattcta acgaggaaag cacgttatac gtgctcgtca aagcaaccat agtacgcgcc 1320
ctgtagcggc gcattaagcg cggcgggtgt ggtggttacg cgcagcgtga ccgctacact 1380
tgccagcgcc ctagcgcccg ctcctttcgc tttcttccct tcctttctcg ccacgttcgc 1440
cggctttccc cgtcaagctc taaatcgggg gctccctta gggttccgat ttagtgcttt 1500
acggcacctc gaccccaaaa aacttgatta gggtgatggt tcacgtagtg gccatcgcc 1560
ctgatagacg gttttcgcc ctttgacgtt ggagtccacg ttctttaata gtggactctt 1620
gttccaaact ggaacaacac tcaaccctat ctcggtctat tcttttgatt tataagggat 1680
tttgccgatt tcggcctatt ggttaaaaaa tgagctgatt taacaaaaat ttaacgcgaa 1740
ttttaacaaa atattaacgt ttacaattta aatatttgct tatacaatct tcctgttttt 1800
ggggcttttc tgattatcaa ccggggtaca tatgattgac atgctagttt tacgattacc 1860
gttcatcgat tctcttgttt gctccagact ctcaggcaat gacctgatag cctttgtaga 1920
gacctctcaa aaatagctac cctctccggc atgaatttat cagctagaac ggttgaatat 1980
catattgatg gtgatttgac tgtctccggc ctttctcacc cgtttgaatc tttacctaca 2040
cattactcag gcattgcatt taaaatatat gagggttcta aaaattttta tccttgcgtt 2100
gaaataaagg cttctcccgc aaaagtatta cagggtcata atgtttttgg tacaaccgat 2160
ttagctttat gctctgaggc tttattgctt aattttgcta attctttgcc ttgcctgtat 2220
gatttattgg atgttggaat tcctgatgcg gtattttctc cttacgcatc tgtgcggtat 2280
ttcacaccgc atatggtgca ctctcagtac aatctgctct gatgccgcat agttaagcca 2340
gccccgacac ccgccaacac ccgctgacgc gccctgacgg gcttgtctgc tcccggcatc 2400
cgcttacaga caagctgtga ccgtctccgg gagctgcatg tgtcagaggt tttcaccgtc 2460
atcaccgaaa cgcgcgagac gaaagggcct cgtgatacgc ctatttttat aggttaatgt 2520
catgataata atggtttctt agacgtcagg tggcacttt cggggaaatg tgcgcggaac 2580
ccctatttgt ttatttttct aaatacattc aaatatgtat ccgctcatga gacaataacc 2640
ctgataaatg cttcaataat attgaaaaag gaagagtatg agtattcaac atttccgtgt 2700
cgcccttatt cccttttttg cggcattttg ccttcctgtt tttgctcacc cagaaacgct 2760
ggtgaaagta aaagatgctg aagatcagtt gggtgcacga gtgggttaca tcgaactgga 2820
tctcaacagc ggtaagatcc ttgagagttt tcgccccgaa gaacgttttc caatgatgag 2880
cacttttaaa gttctgctat gtggcgcggt attatcccgt attgacgccg ggcaagagca 2940
actcggtcgc cgcatacact attctcagaa tgacttggtt gagtactcac cagtcacaga 3000
aaagcatctt acggatggca tgacagtaag agaattatgc agtgctgcca taaccatgag 3060
tgataacact gcggccaact tacttctgac aacgatcgga ggaccgaagg agctaaccgc 3120
ttttttgcac aacatggggg atcatgtaac tcgccttgat cgttgggaac cggagctgaa 3180
tgaagccata ccaaacgacg agcgtgacac cacgatgcct gtagcaatgg caacaacgtt 3240
gcgcaaacta ttaactggcg aactacttac tctagcttcc cggcaacaat taatagactg 3300
gatggaggcg gataaagttg caggaccact tctgcgctcg gcccttccgg ctggctggtt 3360
tattgctgat aaatctggag ccggtgagcg tgggtctcgc ggtatcattg cagcactggg 3420
gccagatggt aagccctccc gtatcgtagt tatctacacg acggggagtc aggcaactat 3480
ggatgaacga aatagacaga tcgctgagat aggtgcctca ctgattaagc attggtaact 3540
gtcagaccaa gtttactcat atatacttta gattgattta aaacttcatt tttaatttaa 3600
aaggatctag gtgaagatcc ttttgataa tctcatgacc aaaatccctt aacgtgagtt 3660
ttcgttccac tgagcgtcag accccgtaga aagatcaaa ggatcttctt gagatccttt 3720
ttttctgcgc gtaatctgct gcttgcaaac aaaaaaacca ccgctaccag cggtggtttg 3780
tttgccggat caagagctac caactctttt tccgaaggta actggcttca gcagagcgca 3840
gataccaaat actgtccttc tagtgtagcc gtagttaggc caccacttca agaactctgt 3900
agcaccgcct acatacctcg ctctgctaat cctgttacca gtggctgctg ccagtggcga 3960
taagtcgtgt cttaccgggt tggactcaag acgatagtta ccggataagg cgcagcggtc 4020
gggctgaacg gggggttcgt gcacacagcc cagcttggag cgaacgacct acaccgaact 4080
gagataccta cagcgtgagc tatgagaaag cgccacgctt cccgaaggga gaaaggcgga 4140
caggtatccg gtaagcggca gggtcggaac aggagagcgc acgagggagc ttccaggggg 4200
aaacgcctgg tatctttata gtcctgtcgg gtttcgccac ctctgacttg agcgtcgatt 4260
tttgtgatgc tcgtcagggg ggcggagcct atggaaaaac gccagcaacg cggcctttt 4320
acggttcctg gccttttgct ggccttttgc tcacatgttc tttcctgcgt tatccccctga 4380

```
ttctgtggat aaccgtatta ccgcctttga gtgagctgat accgctcgcc gcagccgaac 4440
gaccgagcgc agcgagtcag tgagcgagga agcggaagag cgcccaatac gcaaaccgcc 4500
tctcccccgcg cgttggccga ttcattaatg cagcagctgc gcgctcgctc gctcactgag 4560
gccgcccggg caaagcccgg gcgtcgggcg acctttggtc gcccggcctc agtgagcgag 4620
cgagcgcgca gagagggagt ggccaactcc atcactaggg gttccttgta gttaatgatt 4680
aacccgccat gctacttatc tacgtagcca tgctctagga cattgattat tgactagtgg 4740
agttccgcgt tacataactt acggtaaatg gcccgcctgg ctgaccgccc aacgaccccc 4800
gcccattgac gtcaataatg acgtatgttc ccatagtaac gccataggga ctttccatt 4860
gacgtcaatg ggtggagtat ttacgtaaa ctgcccactt ggcagtacat caagtgtatc 4920
atatgccaag tacgccccct attgacgtca atgacggtaa atggcccgcc tggcattatg 4980
cccagtacat gaccttatgg gactttccta cttggcagta catctacgta ttagtcatcg 5040
ctattaccat ggtcgaggtg agccccacgt tctgcttcac tctccccatc tcccccccct 5100
ccccacccce aattttgtat ttatttattt tttaattatt ttgtgcagcg atgggggcgg 5160
ggggggggcgg gggcgcgcgc caggcggggc ggggcggggc gaggggcggg gcggggcgag 5220
gcggagaggt gcggcggcag ccaatcagag cggcgcgctc cgaaagtttc cttttatggc 5280
gaggcggcgg cggcggcggc cctataaaaa gcgaagcgcg cggcgggcgg gagtcgctgc 5340
gcgctgcctt cgccccgtgc cccgctccgc cgccgcctcg cgccgcccgc cccggctctg 5400
actgaccgcg ttactaaaac aggtaagtcc ggcctccggg ccgggttttg gcgcctcccg 5460
cgggcgcccc cctcctcacg gcgagcgctg ccacgtcaga cgaagggcgc agcgagcgtc 5520
ctgatccttc cgcccggacg ctcaggacag cggcccgctg ctcataagac tcggccttag 5580
aaccccagta tcagcagaag gacatttag gacgggactt gggtgactct agggcactgg 5640
ttttcttttc agagagcgga acaggcgagg aaaagtagtc ccttctcggc gattctgcgg 5700
agggatctcc gtggggcggt gaacgccgat gatgcctcta ctaaccatgt tcatgttttc 5760
ttttttttttc tacaggtcct gggtgacgaa cagggtaccg ccaccatggc caccggctct 5820
cgcacaagcc tgctgctggc tttcggactg ctgtgcctgc cttggctcca ggagggctcc 5880
gccgctagca tcgataccgt cgctatgtgc tggaggcttg ctgaaggctg tatgctgtat 5940
aagtccagtg agaagaaggc gttttggcct ctgactgacg ccttcttctc tggacttata 6000
caggacacaa ggcctgttac tagcactcac atggaacaaa tggcctctag cctgaggct 6060
tgctgaaggc tgtatgctgc tatcatcaaa tgagctgctg cgttttggcc tctgactgac 6120
gcagcagctc ttgatgatag tcaggacaca aggcctgtta ctagcactca catggaacaa 6180
atggcctcta gcctgaggc ttgctgaagg ctgtatgctg aagactgctg gaaattctat 6240
ggctgttttg gcctctgact gacgaccata gaatccagca gtctcaggac acaaggcctg 6300
ttactagcac tcacatggaa caaatggcct ctctagaat 6339

SEQ ID NO: 15          moltype = DNA   length = 6340
FEATURE                Location/Qualifiers
source                 1..6340
                       mol_type = other DNA
                       organism = synthetic construct
SEQUENCE: 15
aatcaacctc tggattacaa aatttgtgaa agattgactg gtattcttaa ctatgttgct 60
ccttttacgc tatgtggata cgctgcttta atgcctttgt atcatgctat tgcttcccgt 120
atggctttca ttttctcctc cttgtataaa tcctggttgc tgtctcttta tgaggagttg 180
tggcccgttg tcaggcaacg tggcgtggtg tgcactgtgt ttgctgacgc aaccccact 240
ggttggggca ttgccaccac ctgtcagctc ctttccggga cttttgcttt cccctccct 300
attgccacgg cggaactcat cgccgcctgc cttgcccgct gctggacagg ggctcggctg 360
ttgggcactg acaattccgt ggtgttgtcg gggaaatcat cgtccttcc ttggctgctc 420
gcctgtgttg ccacctggat tctgcgcggg acgtccttct gctacgtccc ttcggccctc 480
aatccagcgg accttccttc ccgcggcctg ctgccggctc tgcggcctct tccgcgtctt 540
cgccttcgcc ctcagacgag tcggatctcc ctttgggccg cctccccgcc taagcttatc 600
gataccgtcg agatctaact tgtttattgc agcttataat ggttacaaat aaagcaatag 660
catcacaaat ttcacaaata aagcattttt tcactgcat tctagttgtg gtttgtccaa 720
actcatcaat gtatcttatc atgtctggat ctcgacctcg actagagcat ggctacgtag 780
ataagtagca tggcgggtta atcattaact acaaggaacc cctagtgatg gagttggcca 840
ctccctctct gcgcgctcgc tcgctcactg aggccggggc accaaaggtc gcccgacgcc 900
cgggctttgc ccgggcggcc tcagtgagcg agcgagcgcg cagctggcgt aatagcgaag 960
aggcccgcac cgatcgccct tcccaacagt tgcgcagcct gaatggcgaa tggcgattcc 1020
gttgcaatgg ctggcggtaa tattgttctg gatattacca gcaaggccga tagtttgagt 1080
tcttctactc aggcaagtga tgttattact aatcaaagaa gtattgcgac aacggttaat 1140
ttgcgtgatg gacagactct tttactcggt ggcctcactg attataaaaa cacttctcag 1200
gattctggcg taccgttcct gtctaaaatc ccttttaatcg gcctcctgtt tagctcccgc 1260
tctgattcta acgaggaaag cacgttatac gtgctcgtca aagcaaccat agtacgcgcc 1320
ctgtagcggc gcattaagcg cggcgggtgt ggtggttacg cgcagcgtga ccgctacact 1380
tgccagcgcc ctagcgcccg ctcctttcgc tttcttccct tcctttctcg ccacgttcgc 1440
cggctttccc cgtcaagctc taaatcgggg gctccctta gggttccgat ttagtgcttt 1500
acggcacctc gaccccaaaa aacttgatta gggtgatggt tcacgtagtg gccatcgcc 1560
ctgatagacg gttttcgcc ctttgacgtt ggagtccacg ttctttaata gtggactctt 1620
gttccaaact ggaacaacac tcaacctat ctcggtctat tcttttgatt tataagggat 1680
tttgccgatt tcggcctatt ggttaaaaaa tgagctgatt taacaaaat ttaacgcgaa 1740
ttttaacaaa atattaacgt ttacaattta aatatttgct tatacaatct tcctgttttt 1800
ggggcttttc tgattatcaa ccggggtaca tatgattgac atgctagttt tacgattacc 1860
gttcatcgat tctcttgttt gctccagact ctcaggcaat gacctgatag cctttgtaga 1920
gacctctcaa aaatagctac cctctccggc atgaattat cagctagaac ggttgaatat 1980
catattgatg gtgatttgac tgtctccggc ctttctcacc cgtttgaatc tttacctaca 2040
cattactcag gcattgcatt taaaatatat gagggttcta aaaatttta tccttgcgtt 2100
gaaataaagg cttctcccgc aaaagtatta cagggtcata atgtttttgg tacaaccgat 2160
ttagctttat gctctgaggc tttattgctt aattttgcta attctttgcc ttgcctgtat 2220
gatttattgg atgttggaat tcctgatgcg gtattttctc cttacgcatc tgtgcggtat 2280
ttcacaccgc atatggtgca ctctcagtac aatctgctct gatgccgcat agttaagcca 2340
```

```
gccccgacac ccgccaacac ccgctgacgc gccctgacgg gcttgtctgc tcccggcatc  2400
cgcttacaga caagctgtga ccgtctccgg gagctgcatg tgtcagaggt tttcaccgtc  2460
atcaccgaaa cgcgcgagac gaaagggcct cgtgatacgc ctattttttat aggttaatgt  2520
catgataata atgtttcttt agacgtcagg tggcactttt cggggaaatg tgcgcggaac  2580
ccctatttgt ttatttttct aaatacattc aaatatgtat cgcgctcatga gacaataacc  2640
ctgataaatg cttcaataat attgaaaaag gaagagtatg agtattcaac atttccgtgt  2700
cgcccttatt ccctttttg cggcattttg ccttcctgtt tttgctcacc cagaaacgct  2760
ggtgaaagta aaagatgctg aagatcagtt gggtgcacga gtgggttaca tcgaactgga  2820
tctcaacagc ggtaagatcc ttgagagttt tcgccccgaa gaacgttttc caatgatgag  2880
cacttttaaa gttctgctat gtggcgcggt attatcccgt attgacgccg gcaagagca  2940
actcggtcgc cgcatacact attctcagaa tgacttggtt gagtactcac cagtcacaga  3000
aaagcatctt acggatggca tgacagtaag agaattatgc agtgctgcca taaccatgag  3060
tgataacact gcggccaact tacttctgac aacgatcgga ggaccgaagg agctaaccgc  3120
ttttttgcac aacatggggg atcatgtaac tcgccttgat cgttgggaac cggagctgaa  3180
tgaagccata ccaaacgacg agcgtgacac cacgatgcct gtagcaatgg caacaacgtt  3240
gcgcaaacta ttaactggcg aactacttac tctagcttcc cggcaacaat taatagactg  3300
gatggaggcg gataaagttg caggaccact tctgcgctcg gcccttccgg ctggctggtt  3360
tattgctgat aaatctggag ccggtgagcg tgggtctcgc ggtatcattg cagcactggg  3420
gccagatggt aagccctccc gtatcgtagt tatctcacg acggggagtc aggcaactat  3480
ggatgaacga aatagacaga tcgctgagat aggtgcctca ctgattaagc attggtaact  3540
gtcagaccaa gtttactcat atatacttta gattgattta aaacttcatt tttaatttaa  3600
aaggatcctag gtgaagatcc ttttttgataa tctcatgacc aaaatcccctt aacgtgagtt  3660
ttcgttccac tgagcgtcag accccgtaga aagatcaaa ggatcttctt gagatccttt  3720
ttttctgcgc gtaatctgct gcttgcaaac aaaaaaacca ccgctaccag cggtggtttg  3780
tttgccggat caagagctac caactctttt tccgaaggta actggcttca gcagagcgca  3840
gataccaaat actgtccttc tagtgtagcc gtagttaggc caccacttca agaactctgt  3900
agcaccgcct acatacctcg ctctgctaat cctgttacca gtggctgctg ccagtggcga  3960
taagtcgtgt cttaccgggt tggactcaag acgatagtta ccggataagg cgcagcggtc  4020
gggctgaacg gggggttcgt gcacacagcc cagcttggag cgaacgacct acaccgaact  4080
gagatacccta cagcgtgagc tatgagaaag cgccacgctt cccgaaggga gaaaggcgga  4140
caggtatccg gtaagcggca gggtcggaac aggagagcgc acgagggagc ttccaggggg  4200
aaacgcctgg tatctttata gtcctgtcgg gtttcgccac ctctgacttg agcgtcgatt  4260
tttgtgatgc tcgtcagggg gcggagcct atggaaaaac gccagcaacg cggccttttt  4320
acggttcctg gccttttgct ggcctttgc tcacatgttc tttcctgcgt tatccctga  4380
ttctgtggat aaccgtatta ccgcctttga gtgagctgat accgctcgcc gcagccgaac  4440
gaccgagcgc agcgagtcag tgagcgagga agcggaagag cgcccaatac gcaaaccgcc  4500
tctccccgcg cgttggccga ttcattaatg cagcagctgc gcgctcgctc gctcactgag  4560
gccgcccggg caaagcccgg gcgtcgggcg acctttggtc gcccggcctc agtgagcgag  4620
cgagcgcgca gagagggagt ggccaactcc atcactaggg gttccttgta gttaatgatt  4680
aacccgccat gctacttatc tacgtagcca tgctctagga cattgattat tgactagtgg  4740
agttccgcgt tacataactt acggtaaatg gcccgcctgg ctgaccgccc aacgacccc  4800
gcccattgac gtcaataatg acgtatgttc ccatagtaac gccaataggg actttccatt  4860
gacgtcaatg ggtggagtat ttacgtaaa ctgcccactt ggcagtacat caagtgtatc  4920
atatgccaag tacgcccctt attgacgtca atgacggtaa atggcccgcc tggcattatg  4980
cccagtacat gaccttatgg gactttccta cttggcagta catctacgta ttagtcatcg  5040
ctattaccat ggtcgaggtg agccccacgt tctgcttcac tctccccatc tcccccccct  5100
ccccacccc aattttgtat ttatttattt tttaattatt tgtgcagcg atggggggcgg  5160
gggggggggg gggcgcgcgc caggcggggc ggggggggc gagggcggg gcggggcgag  5220
gcggagaggt gcggcggcag ccaatcagag cggcgcgctc cgaaagtttc cttttatggc  5280
gaggcggcgg cggcggcggc cctataaaaa gcgaagcgcg cggcgggcgg gagtcgctgc  5340
gcgctgcctt cgccccgtgc cccgctccgc cgccgcctcg cgccgcccgc cccggctcg  5400
actgaccgcg ttactaaaac aggtaagtcc ggcctccgcg ccgggttttg gcgcctcccg  5460
cgggcgcccc cctcctcacg cgagcgctc ccacgtcaga cgaagggcgc agcgagcgtc  5520
ctgatccttc cgcccggacg ctcaggacag cggcccgctg ctcataagac tcggccttag  5580
aacccagta tcagcagaag gacatttag gacgggactt gggtgactct agggcactgg  5640
ttttctttcc agagagcgga acaggcgagg aaaagtagtc ccttctcggc gattctgcgg  5700
agggatctcc gtgggcggt gaacgccgat gatgcctcta ctaaccatgt tcatgttttc  5760
tttttttttc tacaggtcct gggtgacgaa cagggtaccg ccaccatggc caccggctct  5820
cgcacaagcc tgctgctggc tttcggactg ctgtgcctgc cttggcttca ggagggctcc  5880
gccgctagca tcgataccgt cgctatgtgc tggaggcttg ctgaaggtcg tatgctgatt  5940
agcactggtg atttccggct gttttggcct ctgactgacg accggaaatc cagtgctaat  6000
caggacacaa ggcctgttac tagcactcac atggaacaaa tggcctctag cctggaggct  6060
tgctgaaggc tgtatgctga ttgagtttcg cattcttgtt ccgttttgg cctctgactg  6120
acggcaacaa gagcgaaact caacaggaca caaggctgct tactagcact cacatggaca  6180
aaatggcctc tagcctggag gcttgctgaa ggctgtatgc tgattgatca ggcaaacata  6240
gtcccgtttt ggcctctgac tgacgggact atgtgcctga tcaatcagga cacaaggcct  6300
gttactagca ctcacatgga acaaatggcc tctctagaat                        6340

SEQ ID NO: 16       moltype = DNA   length = 6339
FEATURE             Location/Qualifiers
source              1..6339
                    mol_type = other DNA
                    organism = synthetic construct
SEQUENCE: 16
aatcaacctc tggattacaa aatttgtgaa agattgactg gtattcttaa ctatgttgct    60
ccttttacgc tatgtggata cgctgcttta atgcctttgt atcatgctat tgcttcccgt   120
atggctttca ttttctcctc cttgtataaa tcctggttgc tgtctcttta tgaggagttg   180
tggcccgttg tcaggcaacg tggcgtggtg tgcactgtgt ttgctgacgc aaccccact    240
ggttgggca ttgccaccac ctgtcagctc ctttccggga ctttcgcttt ccccctccct   300
```

```
attgccacgg cggaactcat cgccgcctgc cttgccccgct gctggacagg ggctcggctg   360
ttgggcactg acaattccgt ggtgttgtcg gggaaatcat cgtcctttcc ttggctgctc   420
gcctgtgttg ccacctggat tctgcgcggg acgtccttct gctacgtccc ttcggccctc   480
aatccagcgc accttcctte ccgcggcctg ctgccggctc tgcggcctct tccgcgtctt   540
cgccttcgcc ctcagacgag tcggatctcc ctttgggacg cctccccgcc taagcttatc   600
gataccgtcg agatctaact tgtttattgc agcttataat ggttacaaat aaagcaatag   660
catcacaaat ttcacaaata aagcattttt ttcactgcat tctagttgtg gtttgtccaa   720
actcatcaat gtatcttatc atgtctggat ctcgacctcg actagagcat ggctacgtag   780
ataagtagca tggcgggtta atcattaact acaaggaacc cctagtgatg gagttggcca   840
ctccctctct gcgcgctcgc tcgctcactg aggccgggcg accaaaggtc gcccgacgcc   900
cgggctttgc ccgggcggcc tcagtgagcg agcgagcgcg cagctggcgt aatagcgaag   960
aggcccgcac cgatcgccct tcccaacagt tgcgcagcct gaatgcgaa tggcgattcc   1020
gttgcaatgg ctggcggtaa tattgttctg gatattacca gcaaggccga tagtttgagt   1080
tcttctactc aggcaagtga tgttattact aatcaaagaa gtattcgcac aacgttaat   1140
ttgcgtgatg gacagactct tttactcggt ggcctcactg attataaaaa cacttctcag   1200
gattctggcg taccgttcct gtctaaaatc cctttaatcg gcctcctgtt tagctcccgc   1260
tctgattcta acgaggaaag cacgttatac gtgctcgtca aagcaaccat agtacgcgcc   1320
ctgtagcggc gcattaagcg cggcgggtgt ggtggttacg cgcagcgtga ccgctacact   1380
tgccagcgcc ctagcgcccg ctcctttcgc tttcttccct tcctttctcg ccacgttcgc   1440
cggctttccc cgtcaagctc taaatcgggg gctcccttta gggttccgat ttagtgcttt   1500
acggcacctc gaccccaaaa aacttgatta gggtgatggt tcacgtagtg ggccatcgcc   1560
ctgatagacg gtttttcgcc cttttgacgtt ggagtccacg ttctttaata gtggactctt   1620
gttccaaact ggaacaacac tcaaccctat ctcggtctat tcttttgatt tataagggat   1680
tttgccgatt tcggcctatt ggttaaaaaa tgagctgatt taacaaaaat ttaacgcgaa   1740
ttttaacaaa atattaacgt ttacaattta aatatttgct tatacaatct tcctgttttt   1800
ggggctttc tgattatcaa ccggggtaca tatgattgac atgctaattt tacgattacc   1860
gttcatcgat tctcttgttt gctccagact ctcaggcaat gacctgatag cctttgtaga   1920
gacctctcaa aaatagcatc cctctccggc atgaattat cagctagaac ggttgaatat   1980
catattgatg gtgatttgac tgtctccggc cttttctcacc cgtttgaatc tttacctaca   2040
cattactcag gcattgcatt taaaatat gaggggttcta aaaattttta tccttgcgtt   2100
gaaataaagg cttctccgc aaagtatta cagggtcata atgtttttgg tacaaccgat   2160
ttagctttat gctctgaggc tttattgctt aattttgcta attctttgcc ttgcctgtat   2220
gatttattgg atgttggaat tcctgatgcg gtattttctc cttacgcatc tgtgcggtat   2280
ttcacaccgc atatggtgca ctctcagtac aatctgctct gatgccgcat agttaagcca   2340
gccccgacac ccgccaacac ccgctgacgc gccctgacgg gcttgtctgc tcccggcatc   2400
cgcttacaga caagctgtga ccgtctccgg gagctgcatg tgtcagaggt tttcaccgtc   2460
atcaccgaaa cgcgcgagac gaaagggcct cgtgatacgc ctatttttat aggttaatgt   2520
catgataata atggtttctt agacgtcagg tggcactttt cggggaaatg tgcgcggaac   2580
ccctatttgt ttatttttct aaatacattc aaatatgtat ccgctcatga gacaataacc   2640
ctgataaatg cttcaataat attgaaaaag gaagagtatg agtattcaac atttccgtgt   2700
cgcccttatt cccttttttg cggcattttg ccttcctgtt tttgctcacc cagaaacgct   2760
ggtgaaagta aaagatgctg aagatcagtt gggtgcacga gtgggttaca tcgaactgga   2820
tctcaacagc ggtaagatcc ttgagagttt tcgccccgaa gaacgttttc caatgatgag   2880
cacttttaaa gttctgctat gtggcgcggt attatcccgt attgacgccg gcaagagca   2940
actcggtcgc cgcatacact attctcagaa tgacttggtt gagtactcac cagtcacaga   3000
aaagcatctt acgatggca tgacagtaag agaattatgc agtgctgcca taaccatgag   3060
tgataacact gcggccaact tacttctgac aacgatcgga ggaccgaagg agctaaccgc   3120
tttttttgcac aacatggggg atcatgtaac tcgccttgat cgttgggaac cggagctgaa   3180
tgaagccata ccaaacgacg agcgtgacac cacgatgcct gtagcaatgg caacaacgtt   3240
gcgcaaacta ttaactggcg aactacttac tctagcttcc cggcaacaat taatagactg   3300
gatggaggcg gataaagttg caggaccact tctgcgctcg gcccttccgg ctggctgtt   3360
tattgctgat aaatctggag ccggtgagcg tgggtctcgc ggtatcattg cagcactggg   3420
gccagatggt aagccctccc gtatcgtagt tatctacacg acgggagtc aggcaactat   3480
ggatgaacga aatagacaga tcgctgagat aggtgcctca ctgattaagc attggtaact   3540
gtcagaccaa gtttactcat atatacttta gattgattta aaacttcatt tttaatttaa   3600
aaggatctag gtgaagatcc ttttttgataa tctcatgacc aaaatccctt aacgtgagtt   3660
ttcgttccac tgagcgtcag accccgtaga aagatcaaa ggatcttctt gagatccttt   3720
ttttctgcgc gtaatctgct gcttgcaaac aaaaaaacca ccgctaccag cggtggtttg   3780
tttgccggat caagagctac caactctttt tccgaaggta actggcttca gcagagcga   3840
gataccaaat actgtccttc tagtgtagcc gtagttaggc caccacttca agaactctgt   3900
agcaccgcct acatacctcg ctctgctaat cctgttacca gtggctgctg ccagtggcga   3960
taagtcgtgt cttaccgggt tggactcaag acgatagtta ccggataagg cgcagcggtc   4020
gggctgaacg gggggttcgt gcacacagcc cagcttggag cgaacgacct acaccgaact   4080
gagatacccta cagcgtgagc tatgagaaag cgccacgctt cccgaagggag aaaggcggaa   4140
caggtatccg gtaagcggca gggtcggaac aggagagcgc acgagggagc ttccagggg   4200
aaacgcctgg tatctttata gtcctgtcgg gtttcgccac ctctgacttg agcgtcgatt   4260
tttgtgatgc tcgtcagggg gcggagcct atggaaaaac gccagcaacg cggcctttt   4320
acggttcctg gccttttgct ggccttttgc tcacatgttc tttcctgcgt tatcccctga   4380
ttctgtggat aaccgtatta ccgcctttga gtgagctgat accgctcgcc gcagccgaa   4440
gaccgagcgc agcgagtcag tgagcgagga agcggaagag cgcccaatac gcaaaccgcc   4500
tctccccgcg cgttggccga ttcattaatg cagcagctgc gcgctcgctc gctcactgag   4560
gccgcccggg caaagcccgg gcgtcggcg acctttggtc gcccggcctc agtgagcgag   4620
cgagcgcgca gagagggagt ggccaactcc atcactaggg gttccttgta gttaatgatt   4680
aaccctcact gctacttatc tacgtagcca tgtctctgaa cattgattat tgactagtga   4740
agttccgcgt tacataactt acggtaaatg gcccgcctgg ctgaccgccc aacgacccc   4800
gcccattgac gtcaataatg acgtatgttc ccatagtaac gccaataggg actttccatt   4860
gacgtcaatg ggtggagtat ttacggtaaa ctgcccactt ggcagtacat caagtgtatc   4920
atatgccaag tacgcccct attgacgtca atgacgtaa atggcccgcc tggcattatg   4980
cccagtacat gaccttatgg gactttccta cttggcagta catctacgta ttagtcatcg   5040
```

```
ctattaccat ggtcgaggtg agcccacgt tctgcttcac tctcccatc tcccccct    5100
ccccacccc aatttgtat ttattatt tttaattatt ttgtgcagcg atggggcgg     5160
gggggggggg gggcgcgcgc caggcgggc ggggcgggc gagggcgg gcggggcgag    5220
gcggagaggt gcggcggcag ccaatcagag cggcgcgctc cgaaagttc ctttatggc  5280
gaggcggcgg cggcggcgc cctataaaaa gcgaagcgcg cggcggcgg gagtcgctgc  5340
gcgctgcctt cgccccgtgc ccgctccgc cgccgcctcg cgccgcccgc ccccggctctg 5400
actgaccgcg ttactaaaac aggtaagtcc ggcctccgcg ccgggttttg gcgcctcccg 5460
cgggcgcccc cctcctcacg gcgagcgctg ccacgtcaga cgaagggcgc agcgagcgtc 5520
ctgatccttc cgcccggacg ctcaggacag cggcccggctc ctcataagac tcggccttag 5580
aaccccagta tcagcagaag gacatttag gacgggactt gggtgactct agggcactgg  5640
ttttctttcc agagagcgga acaggcgagg aaaagtagtc ccttctcggc gattctgcgg  5700
agggatctcc gtggggcggt gaacgccgat gatgcctcta ctaaccatgt tcatgtttc   5760
tttttttc tacaggtcct gggtgacgaa caggtaccg ccaccatggc caccggctct    5820
cgcacaagcc tgctgctggc tttcggactg ctgtgcctgc cttggctcca ggagggctcc  5880
gccgctagca tcgatacgt cgctatgtgc tggaggcttg ctgaaggctg tatgctgtct   5940
gatcgtggtg ttatttgggc gttttggcct ctgactgacg cccaaataac cacgatcaga  6000
caggacacaa ggcctgttac tagcactcac atggaacaaa tggcctctag cctggaggct   6060
tgctgaaggc tgtatgctgt tgagtttcgc attcttgttg ccgttttgcc ctctgactga   6120
cggcaacaag agcgaaactc aacaggacac aaggcctgtt actagcactc acatggaaca   6180
aatgcctct agcctggagg cttgctgaag gctgtatgct gtatcctctt ataactcagc    6240
ctccgttttg gcctctgact gacgaggct gagataagag gatacaggac acaaggcctg    6300
ttactagcac tcacatggaa caaatggcct ctctagaat                          6339

SEQ ID NO: 17          moltype = DNA   length = 6339
FEATURE                Location/Qualifiers
source                 1..6339
                       mol_type = other DNA
                       organism = synthetic construct
SEQUENCE: 17
aatcaacctc tggattacaa aatttgtgaa agattgactg gtattcttaa ctatgttgct    60
cctttacgc tatgtggata cgctgcttta atgcctttgt atcatgctat tgcttccgt    120
atggctttca ttttctcctc cttgtataaa tcctggttgc tgtctcttta tgaggagttg    180
tggcccgttg tcaggcaacg tggcgtggtg tgcactgtgt ttgctgacgc aaccccccact   240
ggttggggca ttgccaccac ctgtcagctc cttccggga ctttcgcttt cccctcct      300
attgccacgg cggaactcat cgccgcctgc cttgcccgct gctgacagg ggctcggctg    360
ttgggcactg acaattccgt ggtgttgtcg gggaaatcat cgtccttcc ttggctgctc    420
gcctgtgttg ccacctggat tctgcgcggg acgtccttct gctacgtccc ttcggccctc   480
aatccagcgg accttcctc cgcggcctg ctgccggctc tgcggcctct tccgcgtctt    540
cgccttgcc ctcagacgag tcggatctcc cttgggcg cctcccccgc taagcttatc     600
gataccgtcg agatctaact tgtttattgc agcttataat ggttacaaat aaagcaatag   660
catcacaaat ttcacaaata aagcattttt tcactgcat tctagttgtg gtttgtccaa   720
actcatcaat gtatcttatc atgtctggat ctcgacctcg actagagcat ggctacgtag    780
ataagtagca tggcgggtta atcattaact acaaggaact cctagtagtg gagttggcca    840
ctccctctct gcgcgctcgc tcgctcactg aggccgggcg accaaaggtc gcccgacgcc     900
cgggctttgc ccgggcggcc tcagtgagcg agcgagcgcg cagctggcgt aatagcgaag     960
aggcccgcac cgatcgccct tcccaacagt tgcgcagcct gaatggcgaa tggcgattcc    1020
gttgcaatgg ctggcggtaa tattgttctg gatattacca gcaaggccga tagtttgagt    1080
tcttctactc aggcaagtga tgttattact aatcaaagaa gtattgcgac aacggttaat    1140
ttgcgtgatg gacagactct tttactcggt ggcctcactg attataaaa cacttctcag   1200
gattctggcg taccgttcct gtctaaaatc cctttaatcg gcctcctgtt tagctcccgc   1260
tctgattcta acgaggaaag cacgttatac gtgctcgtca aagcaaccat agtacgcgcc   1320
ctgtagcggc gcattaagcg cggcgggtgt ggtggttacg cgcagcgtga ccgctacact   1380
tgccagcgcc ctagcgcccg ctcctttcgc tttcttccct tcctttctcg ccacgttcgc   1440
cggctttccc cgtcaagctc taaatcgggg gctcccttta gggttccgat ttagtgcttt   1500
acggcacctc gaccccaaaa aacttgatta gggtgatggt tcacgtagtg ggccatcgcc   1560
ctgatagacg gttttcgcc ctttgacgtt ggagtccacg ttctttaata gtggactctt   1620
gttccaaact ggaacaacac tcaacctat ctcggtctat tctttgatt tataagggat    1680
tttgccgatt tcggcctatt ggttaaaaaa tgagctgatt taacaaaaat ttaacgcgaa   1740
ttttaacaaa atattaacgt ttacaattta aatatttgct tatacaatct tcctgttttt   1800
ggggcttttc tgattatcaa ccggggtaca tatgattgac atgctagttt tacgattacc   1860
gttcatcgat tctcttgttt gctccagact ctcaggcaat gacctgatag cctttgtaga   1920
gacctctcaa aaatagctac cctctccggc atgaattat cagctagaac ggttgaatat    1980
catattgatg gtgatttgac tgtctccggc ctttctcacc cgtttgaatc tttacctaca   2040
cattactcag gcattgcatt taaaatatat gagggttcta aaaatttta tccttgcgtt   2100
gaaataaagg cttctcccgc aaaagtatta caggtcata atgttttgg tacaaccgat    2160
ttagctttat gctctgaggc tttattgctt aattttgcta attctttgcc ttgcctgtat   2220
gatttattgg atgttggaat tcctgatgcg gtattttctc cttacgcatc tgtgcggtat   2280
ttcacaccgc atatggtgca ctctcagtac aatctgctct gatgccgcat agttaagcca   2340
gccccgacac ccgccaacac ccgccgacgc gccccgacgg gcttgtctgc tcccggcatc   2400
cgcttacaga caagctgtga ccgtctccgg gagctgcatg tgtcagaggt tttcaccgtc   2460
atcaccgaaa cgcgcgagac gaaagggcct cgtgatacgc ctatttttat aggttaatgt   2520
catgataata atggtttctt agacgtcagg tggcactttt cggggaaatg tgcgcggaac   2580
ccctatttgt ttatttttct aaatacattc aaatatgtat ccgctcatga acaataaccc   2640
tgataaatg cttcaataat attgaaaaag gaagagtatg agtattcaac atttccgtgt   2700
cgcccttatt ccctttttg cggcattttg ccttcctgtt tttgctcacc cagaaacgct   2760
ggtgaaagta aaagatgctg aagatcagtt gggtgcacga gtgggttaca tcgaactgga   2820
tctcaacagc ggtaagatcc ttgagagttt tcgccccgaa gaacgttttc caatgatgag   2880
cacttttaaa gttctgctat gtggcgcggt attatcccgt attgacgccg ggcaagagca   2940
actcggtcgc cgcatacact attctcagaa tgacttggtt gagtactcac cagtcacaga   3000
```

-continued

```
aaagcatctt acggatggca tgacagtaag agaattatgc agtgctgcca taaccatgag 3060
tgataacact gcggccaact tacttctgac aacgatcgga ggaccgaagg agctaaccgc 3120
ttttttgcac aacatggggg atcatgtaac tcgccttgat cgttgggaac cggagctgaa 3180
tgaagccata ccaaacgacg agcgtgacac cacgatgcct gtagcaatgg caacaacgtt 3240
gcgcaaacta ttaactggcg aactacttac tctagcttcc cggcaacaat taatagactg 3300
gatggaggcg gataaagttg caggaccact tctgcgctcg gcccttccgg ctggctggtt 3360
tattgctgat aaatctggag ccggtgagcg tgggtctcgc ggtatcattg cagcactggg 3420
gccagatggt aagccctccc gtatcgtagt tatctcacacg acggggagtc aggcaactat 3480
ggatgaacga aatagacaga tcgctgagat aggtgcctca ctgattaagc attggtaact 3540
gtcagaccaa gtttactcat atatacttta gattgattta aaacttcatt tttaatttaa 3600
aaggatctag gtgaagatcc ttttttgataa tctcatgacc aaaatccctt aacgtgagtt 3660
ttcgttccac tgagcgtcag acccgtaga aaagatcaaa ggatcttctt gagatccttt 3720
ttttctgcgc gtaatctgct gcttgcaaac aaaaaaacca ccgctaccag cggtggtttg 3780
tttgccggat caagagctac caactctttt tccgaaggta actggcttca gcagagcgca 3840
gataccaaat actgtccttc tagtgtagcc gtagttaggc caccacttca agaactctgt 3900
agcaccgcct acatacctcg ctctgctaat cctgttacca gtggctgctg ccagtggcga 3960
taagtcgtgt cttaccgggt tggactcaag acgatagtta ccggataagg cgcagcggtc 4020
gggctgaacg gggggttcgt gcacacagcc cagcttggag cgaacgacct acaccgaact 4080
gagataccta cagcgtgagc tatgagaaag cgccacgctt cccgaaggga gaaaggcgga 4140
caggtatccg gtaagcggca gggtcggaac aggagagcgc acgagggagc ttccagggg 4200
aaacgcctgg tatctttata gtcctgtcgg gtttcgccac ctctgacttg agcgtcgatt 4260
tttgtgatgc tcgtcagggg ggcggagcct atggaaaaac gccagcaacg cggccttttt 4320
acggttcctg gccttttgct ggccttttgc tcacatgttc tttcctgcgt tatccctga 4380
ttctgtggat aaccgtatta ccgcctttga gtgagctgat accgctcgcc gcagccgaac 4440
gaccgagcgc agcgagtcag tgagcgagga agcggaagag cgcccaatac gcaaaccgcc 4500
tctccccgcg cgttggccga ttcattaatg cagcagctgc gcgctcgctc gctcactgag 4560
gccgcccggg caaagcccgg gcgtcgggcg acctttggtc gcccggcctc agtgagcgag 4620
cgagcgcgca gagagggagt ggccaactcc atcactaggg gttccttgta gttaatgatt 4680
aacccgccat gctacttatc tacgtagcca tgctctagga cattgattat tgactagtgg 4740
agttccgcgt tacataactt acggtaaatg ccccgcctgg ctgaccgccc aacgacccc 4800
gcccattgac gtcaataatg acgtatgttc ccatagtaac gccaataggg actttccatt 4860
gacgtcaatg ggtggagtat ttacggtaaa ctgcccactt ggcagtacat caagtgtatc 4920
atatgccaag tacgccccct attgacgtca atgacggtaa atggcccgcc tggcattatg 4980
cccagtacat gaccttatgg gactttccta cttggcagta catctacgta ttagtcatcg 5040
ctattaccat ggtcgaggtg agccccacgt tctgcttcac tctcccccatc tccccccct 5100
ccccaccccc aattttgtat ttatttattt tttaattatt ttgtgcagcg atggggcgg 5160
gggggggggg gggcgcgcgc caggcggggc ggggcgggc gaggggcggg gcggggcgag 5220
gcggagaggt gcggcggcag ccaatcagag cggcgcgctc cgaaagtttc cttttatggc 5280
gaggcggcgg cggcggcggc cctataaaaa gcgaagcgcg cggcgggcgg gagtcgctgc 5340
gcgctgcctt cgccccgtgc cccgctccgc cgccgcctcg cgccgcccgc ccccggctctg 5400
actgaccgcg ttactaaaac aggtaagtcc ggcctccgcg ccgggttttg gcgcctccg 5460
cgggcgcccc cctcctcacg gcgagcgctg ccacgtcaga cgaagggcgc agcgagcgtc 5520
ctgatccttc cgcccggacg ctcaggacag cggcccgctg ctcataagac tcggccttag 5580
aaccccagta tcagcagaag gacattttag gacgggactt gggtgactct agggcactgg 5640
ttttcttttcc agagagcgga acaggcgagg aaaagtagtc ccttctcggc gattctgcgg 5700
agggatctc gtgggcggt gaacgccgat gatgcctcta ctaaccatgt tcatgttttc 5760
ttttttttc tacaggtcct gggtgacgaa cagggtaccg ccaccatggc caccggctct 5820
cgcacaagcc tgctgctggc tttcggactg ctgtgcctgc cttggctcca ggagggctcc 5880
gccgctagca tcgataccgt cgctatgtgc tggaggcttg ctgaaggctg tatgctgtcg 5940
tactgacttg taggtatgcc gttttggcct ctgactgacg gcatacctaa gtcagtacgt 6000
caggacacaa ggcctgttac tagcactcac atggaacaaa tggcctctag cctgaggct 6060
tgctgaaggc tgtatgctga ctcctaatca atagcttcca ccgttttggc ctctgactga 6120
cggtggaagc ttgattagga gtcaggacac aaggcctgtt actagcactc acatggaaca 6180
aatgcctct agcctggagg cttgctgaag gctgtatgct gaatatgcct ttaagctttg 6240
ctgcgttttg gcctctgact gacgcagcaa agcaaaggca tattcaggac acaaggcctg 6300
ttactagcac tcacatggaa caaatggcct ctctagaat             6339
```

COMPOSITION FOR REGULATING PRODUCTION OF INTERFERING RIBONUCLEIC ACID

CROSS REFERENCE TO RELATED APPLICATION

The present application is a division of U.S. patent application Ser. No. 18/518,069 filed Nov. 22, 2023, entitled "Composition For Regulating Production Of Interfering Ribonucleic Acid" currently pending, the entirety of which is incorporated herein by reference.

SEQUENCE LISTING

This application contains a Sequence Listing electronically submitted via patent Center to the United States Patent and Trademark Office as an XML Document file entitled "A8149358US-Sequence Listing.xml" created on 2023 Nov. 17 and having a size of 75,546 bytes. The information contained in the Sequence Listing is incorporated by reference herein.

TECHNICAL FIELD

The present disclosure generally relates to compositions for regulating production of interfering ribonucleic acid (RNA). In particular, the present disclosure relates to compositions for regulating gene expression and therefore, the production of interfering RNA that will suppress over-expression or mis-expression of kinases.

BACKGROUND

Bioactive molecules, including kinases, are necessary for the homeostatic control of biological systems.

When bioactive molecules are over-expressed or mis-expressed, homeostasis is lost, and disease is often the result.

As such, it may be desirable to establish therapies, treatments and/or interventions that address when homeostasis and regulation of bioactive molecules is lost to prevent or treat the resulting disease.

SUMMARY

Some embodiments of the present disclosure relate to one or more compositions that upregulate the production of one or more sequences of micro interfering ribonucleic acid (miRNA). The sequences of miRNA may be complementary to a sequence of target messenger RNA (mRNA) that encodes for translation of a target biomolecule and the miRNA can cause the bioavailability of the target mRNA to decrease because it is degraded or inactivated by the miRNA, thereby causing a decrease in bioavailability of the target biomolecule within a subject that is administered the one or more compositions. In some embodiments of the present disclosure, the target biomolecule is a cytokine. In some embodiments of the present disclosure, the target biomolecule is a cytokine such as IL-1beta. In some embodiments of the present disclosure, the target biomolecule is a cytokine such as IL-18. In some embodiments of the present disclosure, the target biomolecule is a cytokine such as IL-6. In some embodiments of the present disclosure, the target biomolecule is a cytokine such as IL-17A. In some embodiments of the present disclosure, the target biomolecule is a cytokine such as interferon gamma. In some embodiments of the present disclosure, the target biomolecule is a cytokine such as IL-2. In some embodiments of the present disclosure, the target biomolecule is a cytokine such as IL-4. In some embodiments of the present disclosure, the target biomolecule is a cytokine such as IL-5. In some embodiments of the present disclosure, the target biomolecule is a cytokine such as IL-10. In some embodiments of the present disclosure, the target biomolecule is a cytokine such as IL-22.

In some embodiments of the present disclosure the compositions comprise a plasmid of deoxyribonucleic acid (DNA) that includes one or more insert sequences of nucleic acids that encode for the production of miRNA and a backbone sequence of nucleic acids that facilitates introduction of the one or more insert sequences into one or more of a subject's cells where it is expressed and/or replicated. Expression of the one or more insert sequences by one or more cells of the subject results in an increased production of the miRNA and, therefore, decreased translation or production of the target biomolecule by one or more of the subject's cells.

Some embodiments of the present disclosure relate to compositions that upregulate the production of miRNA that degrades, or causes degradation of, or inactivates or causes the inactivation of, the target mRNA of the target biomolecule.

Some embodiments of the present disclosure relate to a recombinant plasmid (RP). In some embodiments of the present disclosure, the RP comprises a nucleotide sequence of SEQ ID NO. 1 and SEQ ID NO. 2. The RP comprises a nucleotide sequence encoding one or more nucleotide sequences encoding a miRNA sequence that targets mRNA of Bruton's tyrosine kinase.

Some embodiments of the present disclosure relate to a recombinant plasmid. In some embodiments of the present disclosure, the RP comprises a nucleotide sequence of SEQ ID NO. 1 and SEQ ID NO. 3. The RP comprises a nucleotide sequence encoding one or more nucleotide sequences encoding a miRNA sequence that targets mRNA of EGF.

Some embodiments of the present disclosure relate to a recombinant plasmid. In some embodiments of the present disclosure, the RP comprises a nucleotide sequence of SEQ ID NO. 1 and SEQ ID NO. 4. The RP comprises a nucleotide sequence encoding one or more nucleotide sequences encoding a miRNA sequence that targets mRNA of VEGF.

Some embodiments of the present disclosure relate to a recombinant plasmid. In some embodiments of the present disclosure, the RP comprises a nucleotide sequence of SEQ ID NO. 1 and SEQ ID NO. 5. The RP comprises a nucleotide sequence encoding one or more nucleotide sequences encoding a miRNA sequence that targets mRNA of BRAF.

Some embodiments of the present disclosure relate to a recombinant plasmid. In some embodiments of the present disclosure, the RP comprises a nucleotide sequence of SEQ ID NO. 1 and SEQ ID NO. 6. The RP comprises a nucleotide sequence encoding one or more nucleotide sequences encoding a miRNA sequence that targets mRNA of ALK.

Some embodiments of the present disclosure relate to a recombinant plasmid. In some embodiments of the present disclosure, the RP comprises a nucleotide sequence of SEQ ID NO. 1 and SEQ ID NO. 7. The RP comprises a nucleotide sequence encoding one or more nucleotide sequences encoding a miRNA sequence that targets mRNA of HER.

Some embodiments of the present disclosure relate to a recombinant plasmid. In some embodiments of the present disclosure, the RP comprises a nucleotide sequence of SEQ ID NO. 1 and SEQ ID NO. 8. The RP comprises a nucleotide sequence encoding one or more nucleotide sequences encoding a miRNA sequence that targets mRNA of FLT3.

Some embodiments of the present disclosure relate to a recombinant plasmid. In some embodiments of the present disclosure, the RP comprises a nucleotide sequence of SEQ ID NO. 1 and SEQ ID NO. 9. The RP comprises a nucleotide sequence encoding one or more nucleotide sequences encoding a miRNA sequence that targets mRNA of PARP.

Some embodiments of the present disclosure relate to a method of making a composition/target cell complex. The method comprising a step of administering a RP comprising SEQ ID NO. 1 and one of SEQ ID NO. 2, SEQ ID NO. 3, SEQ ID NO. 4, SEQ ID NO. 5, SEQ ID NO. 6, SEQ ID NO. 7, SEQ ID NO. 8, or SEQ ID NO. 9, to a target cell for forming the composition/target cell complex, wherein the composition/target cell complex causes the target cell to increase production of one or more sequences of miRNA that decreases production of a target biomolecule.

Embodiments of the present disclosure relate to at least one approach for inducing endogenous production of one or more sequences of miRNA that target and silence mRNA of a target biomolecule, for example Bruton's tyrosine kinase. A first approach utilizes gene vectors containing nucleotide sequences for increasing the endogenous production of one or more sequences of miRNA, which are complete or partial sequences and/or combinations thereof, that target and silence the mRNA of Bruton's tyrosine kinase, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example EGF. A first approach utilizes gene vectors containing nucleotide sequences for increasing the endogenous production of one or more sequences of miRNA, which are complete or partial sequences and/or combinations thereof, that target and silence the mRNA of EGF, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example VEGF. A first approach utilizes gene vectors containing nucleotide sequences for increasing the endogenous production of one or more sequences of miRNA, which are complete or partial sequences and/or combinations thereof, that target and silence the mRNA of VEGF, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example BRAF. A first approach utilizes gene vectors containing nucleotide sequences for increasing the endogenous production of one or more sequences of miRNA, which are complete or partial sequences and/or combinations thereof, that target and silence the mRNA of BRAF, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example ALK. A first approach utilizes gene vectors containing nucleotide sequences for increasing the endogenous production of one or more sequences of miRNA, which are complete or partial sequences and/or combinations thereof, that target and silence the mRNA of ALK, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example HER. A first approach utilizes gene vectors containing nucleotide sequences for increasing the endogenous production of one or more sequences of miRNA, which are complete or partial sequences and/or combinations thereof, that target and silence the mRNA of HER, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example FLT3. A first approach utilizes gene vectors containing nucleotide sequences for increasing the endogenous production of one or more sequences of miRNA, which are complete or partial sequences and/or combinations thereof, that target and silence the mRNA of FLT3, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example PARP. A first approach utilizes gene vectors containing nucleotide sequences for increasing the endogenous production of one or more sequences of miRNA, which are complete or partial sequences and/or combinations thereof, that target and silence the mRNA of PARP, which can be administered to a subject to increase the subject's production of one or more sequences of the miRNA.

DETAILED DESCRIPTION

Unless defined otherwise, all technical and scientific terms used therein have the meanings that would be commonly understood by one of skill in the art in the context of the present description. Although any methods and materials similar or equivalent to those described therein can also be used in the practice or testing of the present disclosure, the preferred methods and materials are now described. All publications mentioned therein are incorporated therein by reference to disclose and describe the methods and/or materials in connection with which the publications are cited.

As used therein, the singular forms "a", "an", and "the" include plural references unless the context clearly dictates otherwise. For example, reference to "a composition" includes one or more compositions and reference to "a subject" or "the subject" includes one or more subjects.

As used therein, the terms "about" or "approximately" refer to within about 25%, preferably within about 20%, preferably within about 15%, preferably within about 10%, preferably within about 5% of a given value or range. It is understood that such a variation is always included in any given value provided therein, whether or not it is specifically referred to.

As used therein, the term "ameliorate" refers to improve and/or to make better and/or to make more satisfactory.

As used therein, the term "cell" refers to a single cell as well as a plurality of cells or a population of the same cell type or different cell types. Administering a composition to a cell includes in vivo, in vitro and ex vivo administrations and/or combinations thereof.

As used therein, the term "complex" refers to an association, either direct or indirect, between one or more particles of a composition and one or more target cells. This association results in a change in the metabolism of the target cell. As used therein, the phrase "change in metabolism" refers to an increase or a decrease in the one or more target cells' production of one or more proteins, and/or any post-translational modifications of one or more proteins.

As used therein, the term "composition" refers to a substance that, when administered to a subject, causes one or more chemical reactions and/or one or more physical reactions and/or one or more physiological reactions and/or one or more immunological reactions in the subject. In some embodiments of the present disclosure, the composition is a plasmid vector.

As used therein, the term "endogenous" refers to the production and/or modification of a molecule that originates within a subject.

As used therein, the term "exogenous" refers to a molecule that is within a subject but that did not originate within the subject. As used therein, the terms "production", "producing" and "produce" refer to the synthesis and/or replication of DNA, the transcription of one or more sequences of RNA, the translation of one or more amino acid sequences, the post-translational modifications of an amino acid sequence, and/or the production of one or more regulatory molecules that can influence the production and/or functionality of an effector molecule or an effector cell. For clarity, "production" is also used therein to refer to the functionality of a regulatory molecule, unless the context reasonably indicates otherwise.

As used therein, the term "subject" refers to any therapeutic target that receives the composition. The subject can be a vertebrate, for example, a mammal including a human. The term "subject" does not denote a particular age or sex. The term "subject" also refers to one or more cells of an organism, an in vitro culture of one or more tissue types, an in vitro culture of one or more cell types, ex vivo preparations, and/or a sample of biological materials such as tissue, and/or biological fluids.

As used therein, the term "target biomolecule" refers to a kinase that is found within a subject. A biomolecule may be endogenous or exogenous to a subject.

As used therein, the term "target cell" refers to one or more cells and/or cell types that are deleteriously affected, either directly or indirectly, by a dysregulated biomolecule. The term "target cell" also refers to cells that are not deleteriously affected but that are the cells in which it is desired that the composition interacts.

As used therein, the term "therapeutically effective amount" refers to the amount of the composition used that is of sufficient quantity to ameliorate, treat and/or inhibit one or more of a disease, disorder or a symptom thereof. The "therapeutically effective amount" will vary depending on the composition used, the route of administration of the composition and the severity of the disease, disorder or symptom thereof. The subject's age, weight and genetic make-up may also influence the amount of the composition that will be a therapeutically effective amount.

As used therein, the terms "treat", "treatment" and "treating" refer to obtaining a desired pharmacologic and/or physiologic effect. The effect may be prophylactic in terms of completely or partially preventing an occurrence of a disease, disorder or symptom thereof and/or the effect may be therapeutic in providing a partial or complete amelioration or inhibition of a disease, disorder, or symptom thereof. Additionally, the term "treatment" refers to any treatment of a disease, disorder, or symptom thereof in a subject and includes: (a) preventing the disease from occurring in a subject which may be predisposed to the disease but has not yet been diagnosed as having it; (b) inhibiting the disease, i.e., arresting its development; and (c) ameliorating the disease.

As used therein, the terms "unit dosage form" and "unit dose" refer to a physically discrete unit that is suitable as a unitary dose for patients. Each unit contains a predetermined quantity of the composition and optionally, one or more suitable pharmaceutically acceptable carriers, one or more excipients, one or more additional active ingredients, or combinations thereof. The amount of composition within each unit is a therapeutically effective amount.

Where a range of values is provided therein, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges, and are also, encompassed within the disclosure, subject to any specifically excluded limit in the stated range. Where the stated range includes one or both of the limits, ranges excluding either or both of those included limits are also included in the disclosure.

In some embodiments of the present disclosure, a composition is a recombinant plasmid (RP) for introducing genetic material, such as one or more nucleotide sequences, into a target cell for reproduction or transcription of an insert that comprises one or more nucleotide sequences that are carried within the RP. In some embodiments of the present disclosure, the RP is delivered without a carrier, by a viral vector, by a protein coat, or by a lipid vesicle. In some embodiments of the present disclosure, the vector is an adeno-associated virus vector.

In some embodiments of the present disclosure, the insert comprises one or more nucleotide sequences that encode for production of at least one sequence of miRNA that decreases the production of target biomolecules. The miRNA may, directly or indirectly, bind to and degrade the target mRNA or otherwise inactivate the target mRNA so that less or none of the target-biomolecule protein is produced.

In some embodiments of the present disclosure, the target biomolecule is Bruton's tyrosine kinase.

In some embodiments of the present disclosure, the target biomolecule is EGF.

In some embodiments of the present disclosure, the target biomolecule is VEGF.

In some embodiments of the present disclosure, the target biomolecule is BRAF.

In some embodiments of the present disclosure, the target biomolecule is ALK.

In some embodiments of the present disclosure, the target biomolecule is HER.

In some embodiments of the present disclosure, the target biomolecule is FLT3.

In some embodiments of the present disclosure, the target biomolecule is PARP.

In some embodiments of the present disclosure, the insert comprises one or more nucleotide sequences that each encode one or more miRNA sequences that may be complementary to and degrade, or cause degradation of, mRNA of the target biomolecule.

Some embodiments of the present disclosure relate to a composition that can be administered to a subject with a condition that results, directly or indirectly, from the production of a dysregulated biomolecule. When a therapeutically effective amount of the composition is administered to the subject, the subject may change production and/or functionality of one or more biomolecules.

In some embodiments of the present disclosure, the subject may respond to receiving the therapeutic amount of the composition by changing production and/or functionality of one or more intermediary molecules by changing production of one or more DNA sequences, one or more RNA sequences, and/or one or more proteins that regulate the levels and/or functionality of the one or more intermediary molecules. The one or more intermediary molecules regulate the subject's levels and/or functionality of the one or more biomolecules.

In some embodiments of the present disclosure, administering a therapeutic amount of the composition to a subject upregulates the production, functionality or both one or more sequences of miRNA that each target the mRNA of one or more target biomolecules. In some embodiments of the present disclosure, there are one, two, three, four, five, or six miRNA sequences that each are complementary to and degrade, or cause degradation of, one biomolecule, such as Bruton's tyrosine kinase, EGF, VEGF, BRAF, ALK, HER, FLT3, or PARP. In some embodiments of the present disclosure, the composition may comprise multiple copies of the same nucleotide sequence of miRNA.

In some embodiments of the present disclosure, the composition is an RP that may be used for gene therapy. The gene therapy is useful for increasing the subject's endogenous production of one or more sequences of miRNA that target the mRNA of a target biomolecule. For example, the RP can contain one or more nucleotide sequences that cause increased production of one or more nucleotide sequences that cause an increased production of one or more miRNA sequences that are each complementary to and degrade, or cause degradation of, or inactivate, or cause inactivation of, one biomolecule, such as Bruton's tyrosine kinase, EGF, VEGF, BRAF, ALK, HER, FLT3, or PARP. Increased endogenous expression of the one or more miRNA sequences results in a decreased bioavailability of the desired biomolecule, which may also be referred to as a target biomolecule.

In some embodiments of the present disclosure, the delivery vehicle of the RP used for gene therapy may be a virus that can be enveloped, or not (unenveloped), replication effective or not (replication ineffective), or combinations thereof. In some embodiments of the present disclosure, the vector is a virus that is not enveloped and not replication effective. In some embodiments of the present disclosure, the vector is a virus of the Parvoviridae family. In some embodiments of the present disclosure, the vector is a virus of the genus Dependoparvovirus. In some embodiments of the present disclosure, the vector is an adeno-associated virus (AAV). In some embodiments of the present disclosure, the vector is a recombinant AAV. In some embodiments of the present disclosure, the vector is a recombinant AAV6.2FF.

In some embodiments of the present disclosure, the delivery vehicle of the RP used for gene therapy may be a protein coat.

In some embodiments of the present disclosure, the delivery vehicle of the RP used for gene therapy may be a lipid vesicle.

The embodiments of the present disclosure also relate to administering a therapeutically effective amount of the composition. In some embodiments of the present disclosure, the therapeutically effective amount of the composition that is administered to a patient is between about 10 and about $1\times10^{16}$ TCID$_{50}$/kg (50% tissue culture infective dose per kilogram of the patient's body mass. In some embodiments of the present disclosure, the therapeutically effective amount of the composition that is administered to the patient is about $1\times10^{13}$ TCID$_{50}$/kg. In some embodiments of the present disclosure, the therapeutically effective amount of the composition that is administered to a patient is measured in TPC/kg (total particle count of the composition per kilogram of the patient's body mass). In some embodiments the therapeutically effective amount of the composition is between about 10 and about $1\times10^{16}$ TCP/kg.

Some embodiments of the present disclosure relate to an adenovirus associated virus (AAV) genome consisting of a RP that when operable inside a target cell will cause the target cell to produce a miRNA sequence that downregulates production of a biomolecule, with examples being Bruton's tyrosine kinase, EGF, VEGF, BRAF, ALK, HER, FLT3, or PARP. The RP is comprised of AAV2 inverted terminal repeats (ITRs), a composite CASI promoter, a human growth hormone (HGH) signal peptide followed by a miRNA expression cassette containing up to six different miRNAs targeting Bruton's tyrosine kinase, EGF, VEGF, BRAF, ALK, HER, FLT3, or PARP, followed by a Woodchuck Hepatitis Virus post-transcriptional regulatory element (WPRE) and an SV40 polyA signal.

```
SEQ ID NO. 1 (backbone sequence No. 1):
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaaccccc actggttggggcattgccaccacctgtcagctcctttccgggactttcgctttccccctc cctattgccacggcggaactcatcgccgcctgccttgccgctgctggacaggggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt
```

-continued cttcgccttcgccctcagacgagtcggatctcccttttgggccgcctccccgcctaagctt atcgataccgtcgagatctaacttgtttattgcagcttataatggttacaaataaagcaa tagcatcacaaatttcacaaataaagcattttttcactgcattctagttgtggtttgtc caaactcatcaatgtatcttatcatgtctggatctcgacctcgactagagcatggctacg tagataagtagcatggcgggttaatcattaactacaaggaaccctagtgatggagttgg ccactccctctctgcgcgctcgctcgtcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatcccttt aatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgctttcttcccttcctttctcgccacgtt cgccggctttccccgtcaagctctaaatcgggggctcccttta gggttccgatttagtgc tttacggcacctcgaccccaaaaaacttgattagggtgatggttcacgtagtgggccatc gccctgatagacggttttt cgcccttt gacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttgggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggcctttctcacccgtttgaatctttacct acacattactcaggcattgcatttaaaatatatgagggttctaaaattttatccttgc gttgaaataaaggcttctcccgcaaaagtattacagggtcataatgttttt ggtacaacc gatttagctttatgctctgaggctttattgcttaattttgctaattcttt gccttgcctg tatgatttattggatgttggaattcctgatgcggtattttctccttacgcatctgtgcgg tatttcacaccgcatatggtgcactctcagtacaatctgctctgatgccgcatagttaag ccagccccgacaccc gccaacaccc gctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctatttttataggttaa tgtcatgataataatggtttcttagacgtcaggtggcacttttcggggaaatgtgcgcgg aacccctatttgtttatttttctaaatacattcaaatatgtatccgctcatgagacaata accctgataaatgcttcaataatattgaaaaaggaagagtatgagtattcaacatttccg tgtcgcccttattcccttttttgcggcattttgccttcctgtttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga -continued

```
gcaactcggtcgccgcatacactattctcagaatgacttggttgagtactcaccagtcac
agaaaagcatcttacggatggcatgacagtaagagaattatgcagtgctgccataaccat
gagtgataacactgcggccaacttacttctgacaacgatcggaggaccgaaggagctaac
cgcttttttgcacaacatgggggatcatgtaactcgccttgatcgttgggaaccggagct
gaatgaagccataccaaacgacgagcgtgacaccacgatgcctgtagcaatggcaacaac
gttgcgcaaactattaactggcgaactacttactctagcttcccggcaacaattaataga
ctggatggaggcggataaagttgcaggaccacttctgcgctcggcccttccggctggctg
gtttattgctgataaatctggagccggtgagcgtgggtctcgcggtatcattgcagcact
ggggccagatggtaagccctcccgtatcgtagttatctacacgacggggagtcaggcaac
tatggatgaacgaaatagacagatcgctgagataggtgcctcactgattaagcattggta
actgtcagaccaagtttactcatatatactttagattgatttaaaacttcattttaatt
taaaaggatctaggtgaagatcctttttgataatctcatgaccaaaatcccttaacgtga
gttttcgttccactgagcgtcagacccccgtagaaaagatcaaaggatcttcttgagatcc
ttttttctgcgcgtaatctgctgcttgcaaacaaaaaaaccaccgctaccagcggtggt
ttgtttgccggatcaagagctaccaactcttttccgaaggtaactggcttcagcagagc
gcagataccaaatactgtccttctagtgtagccgtagttaggccaccacttcaagaactc
tgtagcaccgcctacatacctcgctctgctaatcctgttaccagtggctgctgccagtgg
cgataagtcgtgtcttaccgggttggactcaagacgatagttaccggataaggcgcagcg
gtcgggctgaacggggggttcgtgcacacagcccagcttggagcgaacgacctacaccga
actgagatacctacagcgtgagctatgagaaagcgccacgcttcccgaagggagaaaggc
ggacaggtatccggtaagcggcagggtcggaacaggagagcgcacgagggagcttccagg
gggaaacgcctggtatctttatagtcctgtcgggtttcgccacctctgacttgagcgtcg
atttttgtgatgctcgtcaggggggcggagcctatggaaaaacgccagcaacgcggcctt
tttacggttcctggccttttgctggccttttgctcacatgttctttcctgcgttatcccc
tgattctgtggataaccgtattaccgcctttgagtgagctgataccgctcgccgcagccg
aacgaccgagcgcagcgagtcagtgagcgaggaagcggaagagcgcccaatacgcaaacc
gcctctccccgcgcgttggccgattcattaatgcagcagctgcgcgctcgctcgctcact
gaggccgcccgggcaaagcccgggcgtcgggcgacctttggtcgcccggcctcagtgagc
gagcgagcgcgcagagagggagtggccaactccatcactaggggttccttgtagttaatg
attaacccgccatgctacttatctacgtagccatgctctaggacattgattattgactag
tggagttccgcgttacataacttacggtaaatggcccgcctggctgaccgcccaacgacc
cccgcccattgacgtcaataatgacgtatgttcccatagtaacgccaatagggactttcc
attgacgtcaatgggtggagtatttacggtaaactgcccacttggcagtacatcaagtgt
atcatatgccaagtacgccccctattgacgtcaatgacggtaaatggcccgcctggcatt
atgcccagtacatgaccttatgggactttcctacttggcagtacatctacgtattagtca
tcgctattaccatggtcgaggtgagccccacgttctgcttcactctccccatctccccc
cctccccacccccaattttgtatttatttattttttaattattttttgtgcagcgatggggg
gggggggggggggcgcgcgccaggcggggcggggcgggcgaggggggggcggggcga
ggcggagaggtgcggcggcagccaatcagagcggcgcgctccgaaagtttccttttatgg
cgaggcggcggcggcggcggccctataaaaagcgaagcgcgcggggggggagtcgctgcg
cgctgccttcgccccgtgccccgctccgccgccgcctcgcgccgcccgccccggctctga
``` ctgaccgcgttactaaaacaggtaagtccggcctccgcgccgggttttggcgcctcccgg ggcgccccctcctcacggcgagcgctgccacgtcagacgaagggcgcagcgagcgtcct gatccttccgcccggacgctcaggacagcggcccgctgctcataagactcggccttagaa ccccagtatcagcagaaggacattttaggacgggacttgggtgactctagggcactggtt ttctttccagagagcggaacaggcgaggaaaagtagtcccttctcggcgattctgcggag ggatctccgtgggcggtaacgccgatgatgcctctactaaccatgttcatgttttctt ttttttctacaggtcctgggtgacgaacagggtaccgccaccatggccaccggctctcg cacaagcctgctgctggctttcggactgctgtgcctgccttggctccaggagggctccgc c 3'

SEQ ID NO. 2
(miRNA expression cassette No. 2-Bruton's tyrosine kinase):
5' gctagcatcgataccgtcgctatgtgctggaggcttgctgaaggctgtatgctgtaa ggtggttatgggagaatgccgttttggcctctgactgacggcattctcctaaccaccta caggacacaaggcctgttactagcactcacatggaacaaatggcctctagcctggaggct tgctgaaggctgtatgctgttgagtttcgcattcttgttgccgttttggcctctgactga cggcaacaagagcgaaactcaacaggacacaaggcctgttactagcactcacatggaaca aatggcctctagcctggaggcttgctgaaggctgtatgctgtctatcctttcaagctagt caccgttttggcctctgactgacggtgactagcgaaaggatagacaggacacaaggcctg ttactagcactcacatggaacaaatggcctctctagaat 3'

SEQ ID NO. 3 (miRNA expression cassette No. 3-EGFR):
5' gctagcatcgataccgtcgctatgtgctggaggcttgctgaaggctgtatgctgaag ttagcatgtgtcccagaaccgttttggcctctgactgacggttctgggacatgctaactt caggacacaaggcctgttactagcactcacatggaacaaatggcctctagcctggaggct tgctgaaggctgtatgctgagaagaaaggtatcccaattgccgttttggcctctgactga cggcaattgggaccttcttctcaggacacaaggcctgttactagcactcacatggaaca aatggcctctagcctggaggcttgctgaaggctgtatgctgtagtgtttccaaatactgc ttgcgttttggcctctgactgacgcaagcagtatggaaacactacaggacacaaggcctg ttactagcactcacatggaacaaatggcctctctagaat 3'

SEQ ID NO. 4 (miRNA expression cassette No. 4-VEGF):
5' gctagcatcgataccgtcgctatgtgctggaggcttgctgaaggctgtatgctgtct gacagtgatgtcatcctttcgttttggcctctgactgacgaaaggatgatcactgtcaga caggacacaaggcctgttactagcactcacatggaacaaatggcctctagcctggaggct tgctgaaggctgtatgctgatttaggtcagatggaaactcgcgttttggcctctgactga cgcgagtttccctgacctaaatcaggacacaaggcctgttactagcactcacatggaaca aatggcctctagcctggaggcttgctgaaggctgtatgctgagtgtatgcttaacgtgga cttcgttttggcctctgactgacgaagtccacgaagcatacactcaggacacaaggcctg ttactagcactcacatggaacaaatggcctctctagaat 3'

SEQ ID NO. 5 (miRNA expression cassette No. 5-BRAF):
5' gctagcatcgataccgtcgctatgtgctggaggcttgctgaaggctgtatgctgata cttcagcctgaatcgtgaccgttttggcctctgactgacggtcacgattggctgaagtat caggacacaaggcctgttactagcactcacatggaacaaatggcctctagcctggaggct tgctgaaggctgtatgctgacttcactcatattgttccactcgttttggcctctgactga cgagtggaacaatgagtgaagtcaggacacaaggcctgttactagcactcacatggaaca aatggcctctagcctggaggcttgctgaaggctgtatgctgtatattctacaaatcacca gggcgttttggcctctgactgacgccctggtgatgtagaatatacaggacacaaggcctg ttactagcactcacatggaacaaatggcctctctagaat 3'

SEQ ID NO. 6 (miRNA expression cassette No. 6-ALK):
5' gctagcatcgataccgtcgctatgtgctggaggcttgctgaaggctgtatgctgtat aagtccagtgagaagaaggcgttttggcctctgactgacgccttcttctctggacttata caggacacaaggcctgttactagcactcacatggaacaaatggcctctagcctggaggct tgctgaaggctgtatgctgctatcatcaaatgagctgctgcgttttggcctctgactgac gcagcagctcttgatgatagtcaggacacaaggcctgttactagcactcacatggaacaa atggcctctagcctggaggcttgctgaaggctgtatgctgaagactgctggaaattctat ggctgttttggcctctgactgacgaccatagaatccagcagtctcaggacacaaggcctg ttactagcactcacatggaacaaatggcctctctagaat 3'

SEQ ID NO. 7 (miRNA expression cassette No. 7-HER):
5' gctagcatcgataccgtcgctatgtgctggaggcttgctgaaggctgtatgctgatt agcactggtgatttccggctgttttggcctctgactgacgaccggaaatccagtgctaat caggacacaaggcctgttactagcactcacatggaacaaatggcctctagcctggaggct tgctgaaggctgtatgctgattgagtttcgcattcttgttgccgttttggcctctgactg acggcaacaagagcgaaactcaacaggacacaaggcctgttactagcactcacatggaac aaatggcctctagcctggaggcttgctgaaggctgtatgctgattgatcaggcaaacata gtcccgttttggcctctgactgacgggactatgtgcctgatcaatcaggacacaaggcct gttactagcactcacatggaacaaatggcctctctagaat 3'

SEQ ID NO. 8 (miRNA expression cassette No. 8-FLT3):
5' gctagcatcgataccgtcgctatgtgctggaggcttgctgaaggctgtatgctgtct gatcgtggtgttatttgggcgttttggcctctgactgacgcccaaataaccacgatcaga caggacacaaggcctgttactagcactcacatggaacaaatggcctctagcctggaggct tgctgaaggctgtatgctgttgagtttcgcattcttgttgccgttttggcctctgactga cggcaacaagagcgaaactcaacaggacacaaggcctgttactagcactcacatggaaca aatggcctctagcctggaggcttgctgaaggctgtatgctgtatcctcttataactcagc ctccgttttggcctctgactgacggaggctgagataagaggatacaggacacaaggcctg ttactagcactcacatggaacaaatggcctctctagaat 3'

SEQ ID NO. 9 (miRNA expression cassette No. 9-PARP):
5' gctagcatcgataccgtcgctatgtgctggaggcttgctgaaggctgtatgctgtcg tactgacttgtaggtatgccgttttggcctctgactgacggcatacctaagtcagtacgt caggacacaaggcctgttactagcactcacatggaacaaatggcctctagcctggaggct tgctgaaggctgtatgctgactcctaatcaatagcttccaccgttttggcctctgactga cggtggaagcttgattaggagtcaggacacaaggcctgttactagcactcacatggaaca aatggcctctagcctggaggcttgctgaaggctgtatgctgaatatgcctttaagctttg ctgcgttttggcctctgactgacgcagcaaagcaaaggcatattcaggacacaaggcctg ttactagcactcacatggaacaaatggcctctctagaat 3'

SEQ ID NO: 10 = SEQ ID NO: 1 + SEQ ID NO: 2
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag -continued

```
ttgtggcccgttgtcaggcaacgtggcgtggtgtgcactgtgtttgctgacgcaacccc
actggttggggcattgccaccacctgtcagctccttccgggactttcgctttccccctc
cctattgccacggcggaactcatcgccgcctgccttgcccgctgctggacagggctcgg
ctgttgggcactgacaattccgtggtgttgtcggggaaatcatcgtcctttccttggctg
ctcgcctgtgttgccacctggattctgcgcgggacgtccttctgctacgtcccttcggcc
ctcaatccagcggaccttccttcccgcggcctgctgccggctctgcggcctcttccgcgt
cttcgccttcgccctcagacgagtcggatctccctttgggccgcctcccgcctaagctt
atcgataccgtcgagatctaacttgtttattgcagcttataatggttacaaataaagcaa
tagcatcacaaatttcacaaataaagcattttttcactgcattctagttgtggtttgtc
caaactcatcaatgtatcttatcatgtctggatctcgacctcgactagagcatggctacg
tagataagtagcatggcgggttaatcattaactacaaggaaccctagtgatggagttgg
ccactccctctctgcgcgctcgctcgctcactgaggccgggcgaccaaaggtcgcccgac
gcccgggctttgcccgggcggcctcagtgagcgagcgagcgcgcagctggcgtaatagcg
aagaggcccgcaccgatcgccttcccaacagttgcgcagcctgaatggcgaatggcgat
tccgttgcaatggctggcggtaatattgttctggatattaccagcaaggccgatagtttg
agttcttctactcaggcaagtgatgttattactaatcaaagaagtattgcgacaacggtt
aatttgcgtgatggacagactcttttactcggtggcctcactgattataaaaacacttct
caggattctggcgtaccgttcctgtctaaaatccctttaatcggcctcctgtttagctcc
cgctctgattctaacgaggaaagcacgttatacgtgctcgtcaaagcaaccatagtacgc
gccctgtagcggcgcattaagcgcggcgggtgtggtggttacgcgcagcgtgaccgctac
acttgccagcgccctagcgcccgctcctttcgctttcttcccttcctttctcgccacgtt
cgccggctttccccgtcaagctctaaatcggggctcccttagggttccgatttagtgc
tttacggcacctcgaccccaaaaaacttgattagggtgatggttcacgtagtgggccatc
gccctgatagacggttttcgccttcgacgttggagtccacgttctttaatagtggact
cttgttccaaactggaacaacactcaaccctatctcggtctattctttgatttataagg
gattttgccgatttcggcctattggttaaaaaatgagctgatttaacaaaaatttaacgc
gaattttaacaaaatattaacgtttacaatttaaatatttgcttatacaatcttcctgtt
tttgggcttttctgattatcaaccggggtacatatgattgacatgctagttttacgatt
accgttcatcgattctcttgtttgctccagactctcaggcaatgacctgatagcctttgt
agagacctctcaaaaatagctaccctctccggcatgaatttatcagctagaacggttgaa
tatcatattgatggtgatttgactgtctccggcctttctcacccgtttgaatctttacct
acacattactcaggcattgcatttaaaatatatgagggttctaaaaattttatccttgc
gttgaaataaaggcttctcccgcaaaagtattacagggtcataatgttttggtacaacc
gatttagctttatgctctgaggctttattgcttaattttgctaattctttgccttgcctg
tatgatttattggatgttggaattcctgatgcggtattttctccttacgcatctgtgcgg
tatttcacaccgcatatggtgcactctcagtacaatctgctctgatgccgcatagttaag
ccagccccgacaccgccaacacccgctgacgcgccctgacgggcttgtctgctcccggc
atccgcttacagacaagctgtgaccgtctccgggagctgcatgtgtcagaggttttcacc
gtcatcaccgaaacgcgcgagacgaaagggcctcgtgatacgcctatttttataggttaa
tgtcatgataataatggtttcttagacgtcaggtggcacttttcggggaaatgtgcgcgg
```

-continued

```
aacccctatttgtttattttttctaaatacattcaaatatgtatccgctcatgagacaata accctgataaatgcttcaataatattgaaaaaggaagagtatgagtattcaacatttccg tgtcgcccttattccctttttttgcggcattttgccttcctgttttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatactttagattgatttaaaacttcattttttaatt taaaaggatctaggtgaagatcctttttgataatctcatgaccaaaatcccttaacgtga gttttcgttccactgagcgtcagaccccgtagaaaagatcaaaggatcttcttgagatcc ttttttttctgcgcgtaatctgctgcttgcaaacaaaaaaaccaccgctaccagcggtggt ttgtttgccggatcaagagctaccaactctttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg atttttgtgatgctcgtcagggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgacctttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca
```

-continued tcgctattaccatggtcgaggtgagccccacgttctgcttcactctcccatctccccc cctccccaccccaattttgtatttatttattttttaattattttgtgcagcgatggggg gggggggggggggggcgcgcgccaggcggggggggcggggcgagggggggggggcgagg cggagaggtgcggcggcagccaatcagagcggcgcgctccgaaagtttccttttatggcg aggcggcggcggcggcggccctataaaaagcgaagcgcgcggggggggagtcgctgcgcg ctgccttcgcccgtgcccgctccgccgccgcctcgcgccgcccgccccggctctgact gaccgcgttactaaaacaggtaagtccggcctccgcgccgggttttggcgcctcccgcgg gcgcccccctcctcacggcgagcgctgccacgtcagacgaagggcgcagcgagcgtcctg atccttccgcccggacgctcaggacagcggcccgctgctcataagactcggccttagaac cccagtatcagcagaaggacattttaggacgggacttgggtgactctagggcactggttt tctttccagagagcggaacaggcgaggaaaagtagtcccttctcggcgattctgcggagg gatctccgtggggcggtgaacgccgatgatgcctctactaaccatgttcatgttttcttt tttttctacaggtcctgggtgacgaacagggtaccgccaccatggccaccggctctcgc acaagcctgctgctggctttcggactgctgtgcctgccttggctccaggagggctccgcc gctagcatcgataccgtcgctatgtgctggaggcttgctgaaggctgtatgctgtaaggt ggttatgggagaatgccgttttggcctctgactgacggcattctcctaaccaccttacag gacacaaggcctgttactagcactcacatggaacaaatggcctctagcctggaggcttgc tgaaggctgtatgctgttgagtttcgcattcttgttgccgttttggcctctgactgacgg caacaagagcgaaactcaacaggacacaaggcctgttactagcactcacatggaacaaat ggcctctagcctggaggcttgctgaaggctgtatgctgtctatccttttcaagctagtcac cgttttggcctctgactgacggtgactagcgaaaggatagacaggacacaaggcctgtta ctagcactcacatggaacaaatggcctctctagaat 3'

SEQ ID NO: 11 = SEQ ID NO: 1 + SEQ ID NO: 3
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctcttatgaggag ttgtggcccgttgtcaggcaacgtggcgtggtgtgcactgtgtttgctgacgcaaccccc actggttggggcattgccaccacctgtcagctccttccgggactttcgctttccccctc cctattgccacggcggaactcatcgccgcctgccttgcccgctgctggacagggctcgg ctgttgggcactgacaattccgtggtgttgtcggggaaatcatcgtccttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctcccttgggccgcctccccgcctaagctt atcgataccgtcgagatctaacttgtttattgcagcttataatggttacaaataaagcaa tagcatcacaaatttcacaaataaagcattttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg -continued

```
agttcttctactcaggcaagtgatgttattactaatcaaagaagtattgcgacaacggtt
aatttgcgtgatggacagactcttttactcggtggcctcactgattataaaaacacttct
caggattctggcgtaccgttcctgtctaaaatcccctttaatcggcctcctgtttagctcc
cgctctgattctaacgaggaaagcacgttatacgtgctcgtcaaagcaaccatagtacgc
gccctgtagcggcgcattaagcgcggcgggtgtggtggttacgcgcagcgtgaccgctac
acttgccagcgccctagcgcccgctccttttcgctttcttcccttcctttctcgccacgtt
cgccggctttccccgtcaagctctaaatcgggggctccctttagggttccgatttagtgc
tttacggcacctcgaccccaaaaaacttgattagggtgatggttcacgtagtgggccatc
gccctgatagacggttttttcgccctttgacgttggagtccacgttctttaatagtggact
cttgttccaaactggaacaacactcaaccctatctcggtctattcttttgatttataagg
gattttgccgatttcggcctattggttaaaaaatgagctgatttaacaaaaatttaacgc
gaattttaacaaaatattaacgtttacaatttaaatatttgcttatacaatcttcctgtt
tttgggcttttctgattatcaaccggggtacatatgattgacatgctagttttacgatt
accgttcatcgattctcttgtttgctccagactctcaggcaatgacctgatagcctttgt
agagacctctcaaaaatagctaccctctccggcatgaatttatcagctagaacggttgaa
tatcatattgatggtgatttgactgtctccggcctttctcacccgtttgaatctttacct
acacattactcaggcattgcatttaaaatatatgagggttctaaaaattttttatccttgc
gttgaaataaaggcttctcccgcaaaagtattacagggtcataatgttttggtacaacc
gatttagctttatgctctgaggcttttattgcttaattttgctaattctttgccttgcctg
tatgatttattggatgttggaattcctgatgcggtattttctccttacgcatctgtgcgg
tatttcacaccgcatatggtgcactctcagtacaatctgctctgatgccgcatagttaag
ccagccccgacacccgccaacacccgctgacgcgccctgacgggcttgtctgctcccggc
atccgcttacagacaagctgtgaccgtctccgggagctgcatgtgtcagaggttttcacc
gtcatcaccgaaacgcgcgagacgaaagggcctcgtgatacgcctattttatagggttaa
tgtcatgataataatggtttcttagacgtcaggtggcacttttcggggaaatgtgcgcgg
aaccctatttgtttatttttctaaatacattcaaatatgtatccgctcatgagacaata
accctgataaatgcttcaataatattgaaaaaggaagagtatgagtattcaacatttccg
tgtcgcccttattcccttttttgcggcattttgccttcctgttttttgctcacccagaaac
gctggtgaaagtaaaagatgctgaagatcagttgggtgcacgagtgggttacatcgaact
ggatctcaacagcggtaagatccttgagagttttcgccccgaagaacgttttccaatgat
gagcacttttaaagttctgctatgtggcgcggtattatcccgtattgacgccgggcaaga
gcaactcggtcgccgcatacactattctcagaatgacttggttgagtactcaccagtcac
agaaaagcatcttacggatggcatgacagtaagagaattatgcagtgctgccataaccat
gagtgataacactgcggccaacttacttctgacaacgatcggaggaccgaaggagctaac
cgcttttttgcacaacatggggatcatgtaactcgccttgatcgttgggaaccggagct
gaatgaagccataccaaacgacgagcgtgacaccacgatgcctgtagcaatggcaacaac
gttgcgcaaactattaactggcgaactacttactctagcttcccggcaacaattaataga
ctggatggaggcggataaagttgcaggaccacttctgcgctcggcccttccggctggctg
gtttattgctgataaatctggagccggtgagcgtgggtctcgcggtatcattgcagcact
ggggccagatggtaagccctcccgtatcgtagttatctacacgacggggagtcaggcaac
```

-continued

```
tatggatgaacgaaatagacagatcgctgagataggtgcctcactgattaagcattggta actgtcagaccaagtttactcatatatactttagattgatttaaaacttcattttaatt taaaaggatctaggtgaagatccttttgataatctcatgaccaaaatcccttaacgtga gttttcgttccactgagcgtcagacccgtagaaaagatcaaaggatcttcttgagatcc ttttttctgcgcgtaatctgctgcttgcaaacaaaaaaaccaccgctaccagcggtggt ttgtttgccggatcaagagctaccaactctttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg atttttgtgatgctcgtcaggggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgacctttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctcccccc cctccccaccccaattttgtatttatttattttttaattattttgtgcagcgatggggg gggggggggggggcgcgcgccaggcggggcggggcgggcgagggcggggggggcga ggcggagaggtgcggcggcagccaatcagagcggcgcgctccgaaagtttccttttatgg cgaggcggcggcggcggccctataaaaagcgaagcgcgcggggggggagtcgctgcg cgctgccttcgccccgtgcccgctccgccgccgcctcgcgccgccgccccggctctga ctgaccgcgttactaaaacaggtaagtccggcctccgcgccgggttttggcgcctcccgc gggcgcccccctcctcacggcgagcgctgccacgtcagacgaagggcgcagcgagcgtcc tgatccttccgcccggacgctcaggacagcggcccgctgctcataagactcggccttaga acccagtatcagcagaaggacattttaggacgggacttgggtgactctagggcactggt tttcttccagagagcggaacaggcgaggaaaagtagtcccttctcggcgattctgcgga gggatctccgtggggcggtgaacgccgatgatgcctctactaaccatgttcatgttttct ttttttttctacaggtcctgggtgacgaacagggtaccgccaccatggccaccggctctc gcacaagcctgctgctggctttcggactgctgtgcctgccttggctccaggagggctccg ccgctagcatcgataccgtcgctatgtgctggaggcttgctgaaggctgtatgctgaagt
``` tagcatgtgtcccagaaccgttttggcctctgactgacggttctgggacatgctaacttc aggacacaaggcctgttactagcactcacatggaacaaatggcctctagcctggaggctt gctgaaggctgtatgctgagaagaaaggtatcccaattgccgttttggcctctgactgac ggcaattgggacctttcttctcaggacacaaggcctgttactagcactcacatggaacaa atggcctctagcctggaggcttgctgaaggctgtatgctgtagtgtttccaaatactgct tgcgttttggcctctgactgacgcaagcagtatggaaacactacaggacacaaggcctgt tactagcactcacatggaacaaatggcctctctagaat 3'

SEQ ID NO: 12 = SEQ ID NO: 1 + SEQ ID NO: 4
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaacccc actggttggggcattgccaccacctgtcagctcctttccgggactttcgctttccccctc cctattgccacggcggaactcatcgccgcctgccttgcccgctgctggacagggggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctcccctttgggccgcctcccgcctaagctt atcgataccgtcgagatctaacttgtttattgcagcttataatggttacaaataaagcaa tagcatcacaaatttcacaaataaagcatttttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggggcctcagtgagcgagcgagcgcgcagctggcgtaatagcga agaggcccgcaccgatcgcccttcccaacagttgcgcagcctgaatggcgaatggcgatt ccgttgcaatggctggcggtaatattgttctggatattaccagcaaggccgatagtttga gttcttctactcaggcaagtgatgttattactaatcaaagaagtattgcgacaacggtta atttgcgtgatggacagactcttttactcggtggcctcactgattataaaaacacttctc aggattctggcgtaccgttcctgtctaaaatcccttaatcggcctcctgtttagctccc gctctgattctaacgaggaaagcacgttatacgtgctcgtcaaagcaaccatagtacgcg ccctgtagcggcgcattaagcgcggcgggtgtggtggttacgcgcagcgtgaccgctaca cttgccagcgccctagcgcccgctcctttcgctttcttcccttcctttctcgccacgttc gccggctttccccgtcaagctctaaatcggggctccctttagggttccgatttagtgct ttacggcacctcgaccccaaaaaacttgattagggtgatggttcacgtagtgggccatcg ccctgatagacggtttttcgccctttgacgttggagtccacgttctttaatagtggactc ttgttccaaactggaacaacactcaaccctatctcggtctattcttttgatttataaggg attttgccgatttcggcctattggttaaaaaatgagctgatttaacaaaaatttaacgcg aattttaacaaaatattaacgtttacaatttaaatatttgcttatacaatcttcctgttt ttggggcttttctgattatcaaccggggtacatatgattgacatgctagttttacgatta ccgttcatcgattctcttgtttgctccagactctcaggcaatgacctgatagcctttgta gagacctctcaaaaatagctaccctctccggcatgaatttatcagctagaacggttgaat -continued

```
atcatattgatggtgatttgactgtctccggcctttctcacccgtttgaatctttaccta cacattactcaggcattgcatttaaaatatatgagggttctaaaaattttttatccttgcg ttgaaataaaggcttctcccgcaaaagtattacagggtcataatgttttttggtacaaccg atttagctttatgctctgaggctttattgcttaattttgctaattctttgccttgcctgt atgatttattggatgttggaattcctgatgcggtattttctccttacgcatctgtgcggt atttcacaccgcatatggtgcactctcagtacaatctgctctgatgccgcatagttaagc cagccccgacacccgccaacacccgctgacgcgccctgacgggcttgtctgctcccggca tccgcttacagacaagctgtgaccgtctccgggagctgcatgtgtcagaggttttcaccg tcatcaccgaaacgcgcgagacgaaagggcctcgtgatacgcctatttttataggttaat gtcatgataataatggtttcttagacgtcaggtggcacttttcggggaaatgtgcgcgga acccctatttgtttattttctaaatacattcaaatatgtatccgctcatgagacaataa ccctgataaatgcttcaataatattgaaaaaggaagagtatgagtattcaacatttccgt gtcgcccttattccctttttttgcggcattttgccttcctgtttttgctcacccagaaacg ctggtgaaagtaaaagatgctgaagatcagttgggtgcacgagtgggttacatcgaactg gatctcaacagcggtaagatccttgagagttttcgccccgaagaacgttttccaatgatg agcacttttaaagttctgctatgtggcgcggtattatcccgtattgacgccgggcaagag caactcggtcgccgcatacactattctcagaatgacttggttgagtactcaccagtcaca gaaaagcatcttacggatggcatgacagtaagagaattatgcagtgctgccataaccatg agtgataacactgcggccaacttacttctgacaacgatcggaggaccgaaggagctaacc gcttttttgcacaacatggggatcatgtaactcgccttgatcgttgggaaccggagctg aatgaagccataccaaacgacgagcgtgacaccacgatgcctgtagcaatggcaacaacg ttgcgcaaactattaactggcgaactacttactctagcttcccggcaacaattaatagac tggatggaggcggataaagttgcaggaccacttctgcgctcggcccttccggctggctgg tttattgctgataaatctggagccggtgagcgtgggtctcgcggtatcattgcagcactg gggccagatggtaagccctcccgtatcgtagttatctacacgacggggagtcaggcaact atggatgaacgaaatagacagatcgctgagataggtgcctcactgattaagcattggtaa ctgtcagaccaagtttactcatatactttagattgatttaaaacttcattttaattt aaaaggatctaggtgaagatcctttttgataatctcatgaccaaaatcccttaacgtgag ttttcgttccactgagcgtcagaccccgtagaaaagatcaaaggatcttcttgagatcct ttttttctgcgcgtaatctgctgcttgcaaacaaaaaaaccaccgctaccagcggtggtt tgtttgccggatcaagagctaccaactcttttttccgaaggtaactggcttcagcagagcg cagataccaaatactgtccttctagtgtagccgtagttaggccaccacttcaagaactct gtagcaccgcctacatacctcgctctgctaatcctgttaccagtggctgctgccagtggc gataagtcgtgtcttaccgggttggactcaagacgatagttaccggataaggcgcagcgg tcgggctgaacggggggttcgtgcacacagcccagcttggagcgaacgacctacaccgaa ctgagatacctacagcgtgagctatgagaaagcgccacgcttcccgaagggagaaaggcg gacaggtatccggtaagcggcagggtcggaacaggagagcgcacgagggagcttccaggg ggaaacgcctggtatctttatagtcctgtcgggtttcgccacctctgacttgagcgtcga tttttgtgatgctcgtcaggggggcggagcctatggaaaaacgccagcaacgcggccttt ttacggttcctggccttttgctggccttttgctcacatgttctttcctgcgttatccct
```

-continued

```
gattctgtggataaccgtattaccgcctttgagtgagctgataccgctcgccgcagccga
acgaccgagcgcagcgagtcagtgagcgaggaagcggaagagcgcccaatacgcaaaccg
cctctccccgcgcgttggccgattcattaatgcagcagctgcgcgctcgctcgctcactg
aggccgcccgggcaaagcccgggcgtcgggcgacctttggtcgcccggcctcagtgagcg
agcgagcgcgcagagagggagtggccaactccatcactaggggttccttgtagttaatga
ttaacccgccatgctacttatctacgtagccatgctctaggacattgattattgactagt
ggagttccgcgttacataacttacggtaaatggcccgcctggctgaccgcccaacgaccc
ccgcccattgacgtcaataatgacgtatgttcccatagtaacgccaatagggactttcca
ttgacgtcaatgggtggagtatttacggtaaactgcccacttggcagtacatcaagtgta
tcatatgccaagtacgccccctattgacgtcaatgacggtaaatggcccgcctggcatta
tgcccagtacatgaccttatgggactttcctacttggcagtacatctacgtattagtcat
cgctattaccatggtcgaggtgagccccacgttctgcttcactctccccatctcccccc
ctccccaccccaattttgtatttatttattttttaattattttgtgcagcgatgggggg
ggggggggggggcgcgcgccaggcgggggggcggggcgaggggggggcggggcgagg
cggagaggtgcggcggcagccaatcagagcggcgcgctccgaaagtttccttttatggcg
aggcggcggcggcggccctataaaaagcgaagcgcgcgggggggagtcgctgcgcg
ctgccttcgcccgtgcccgctccgccgccgcctcgcgccgcccgccccggctctgact
gaccgcgttactaaaacaggtaagtccggcctccgcgccgggttttggcgcctcccgcgg
gcgccccctcctcacggcgagcgctgccacgtcagacgaagggcgcagcgagcgtcctg
atccttccgcccggacgctcaggacagcggcccgctgctcataagactcggccttagaac
cccagtatcagcagaaggacattttaggacgggacttgggtgactctagggcactggttt
tctttccagagagcggaacaggcgaggaaaagtagtcccttctcggcgattctgcggagg
gatctccgtggggcggtgaacgccgatgatgcctctactaaccatgttcatgttttcttt
tttttctacaggtcctgggtgacgaacagggtaccgccaccatggccaccggctctcgc
acaagcctgctgctggctttcggactgctgtgcctgccttggctccaggagggctccgcc
gctagcatcgataccgtcgctatgtgctggaggcttgctgaaggctgtatgctgtctgac
agtgatgtcatcctttcgttttggcctctgactgacgaaaggatgatcactgtcagacag
gacacaaggcctgttactagcactcacatggaacaaatggcctctagcctggaggcttgc
tgaaggctgtatgctgatttaggtcagatggaaactcgcgttttggcctctgactgacgc
gagtttccctgacctaaatcaggacacaaggcctgttactagcactcacatggaacaaat
ggcctctagcctggaggcttgctgaaggctgtatgctgagtgtatgcttaacgtggactt
cgttttggcctctgactgacgaagtccacgaagcatacactcaggacacaaggcctgtta
ctagcactcacatggaacaaatggcctctctagaat 3'
```

SEQ ID NO: 13 = SEQ ID NO: 1 + SEQ ID NO: 5

```
5' aatcaacctctggattacaaaatttgtgaaagattgactggtattcttaactatgtt
gctccttttacgctatgtggatacgctgctttaatgcctttgtatcatgctattgcttcc
cgtatggctttcattttctcctccttgtataaatcctggttgctgtctcttttatgaggag
ttgtggcccgttgtcaggcaacgtggcgtggtgtgcactgtgtttgctgacgcaacccccc
actggttggggcattgccaccacctgtcagctccttttcgggactttcgctttcccctc
cctattgccacggcggaactcatcgccgcctgccttgcccgctgctggacaggggctcgg
ctgttgggcactgacaattccgtggtgttgtcggggaaatcatcgtccttttccttggctg
```

-continued ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctcccctttgggccgcctccccgcctaagctt atcgataccgtcgagatctaacttgtttattgcagcttataatggttacaaataaagcaa tagcatcacaaatttcacaaataaagcattttttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccggggggcctcagtgagcgagcgagcgcgcagctggcgtaatagcga agaggcccgcaccgatcgcccttcccaacagttgcgcagcctgaatggcgaatggcgatt ccgttgcaatggctggcggtaatattgttctggatattaccagcaaggccgatagtttga gttcttctactcaggcaagtgatgttattactaatcaaagaagtattgcgacaacggtta atttgcgtgatggacagactcttttactcggtggcctcactgattataaaaacacttctc aggattctggcgtaccgttcctgtctaaaatcccttttaatcggcctcctgtttagctccc gctctgattctaacgaggaaagcacgttatacgtgctcgtcaaagcaaccatagtacgcg ccctgtagcggcgcattaagcgcggcgggtgtggtggttacgcgcagcgtgaccgctaca cttgccagcgccctagcgcccgctcctttcgctttcttcccttcctttctcgccacgttc gccggctttccccgtcaagctctaaatcgggggctccctttagggttccgatttagtgct ttacggcacctcgaccccaaaaaacttgattagggtgatggttcacgtagtgggccatcg ccctgatagacggttttttcgccctttgacgttggagtccacgttctttaatagtggactc ttgttccaaactggaacaacactcaaccctatctcggtctattcttttgatttataaggg attttgccgatttcggcctattggttaaaaaatgagctgatttaacaaaaatttaacgcg aattttaacaaaatattaacgtttacaatttaaatatttgcttatacaatcttcctgttt ttggggcttttctgattatcaaccggggtacatatgattgacatgctagttttacgatta ccgttcatcgattctcttgtttgctccagactctcaggcaatgacctgatagcctttgta gagacctctcaaaaatagctaccctctccggcatgaatttatcagctagaacggttgaat atcatattgatggtgatttgactgtctccggccttctcacccgtttgaatctttaccta cacattactcaggcattgcatttaaaatatatgagggttctaaaaatttttatccttgcg ttgaaataaaggcttctcccgcaaaagtattacagggtcataatgtttttggtacaaccg atttagctttatgctctgaggctttattgcttaattttgctaattctttgccttgcctgt atgatttattggatgttggaattcctgatgcggtattttctccttacgcatctgtgcggt atttcacaccgcatatggtgcactctcagtacaatctgctctgatgccgcatagttaagc cagccccgacacccgccaacacccgctgacgcgccctgacgggcttgtctgctcccggca tccgcttacagacaagctgtgaccgtctccgggagctgcatgtgtcagaggttttcaccg tcatcaccgaaacgcgcgagacgaaagggcctcgtgatacgcctatttttataggttaat gtcatgataataatggtttcttagacgtcaggtggcacttttcggggaaatgtgcgcgga acccctatttgtttatttttctaaatacattcaaatatgtatccgctcatgagacaataa ccctgataaatgcttcaataatattgaaaaaggaagagtatgagtattcaacatttccgt gtcgcccttattccctttttttgcggcattttgccttcctgttttgctcacccagaaacg ctggtgaaagtaaaagatgctgaagatcagttgggtgcacgagtgggttacatcgaactg gatctcaacagcggtaagatccttgagagttttcgccccgaagaacgttttccaatgatg -continued

```
agcacttttaaagttctgctatgtggcgcggtattatcccgtattgacgccgggcaagag caactcggtcgccgcatacactattctcagaatgacttggttgagtactcaccagtcaca gaaaagcatcttacggatggcatgacagtaagagaattatgcagtgctgccataaccatg agtgataacactgcggccaacttacttctgacaacgatcggaggaccgaaggagctaacc gcttttttgcacaacatgggggatcatgtaactcgccttgatcgttgggaaccggagctg aatgaagccataccaaacgacgagcgtgacaccacgatgcctgtagcaatggcaacaacg ttgcgcaaactattaactggcgaactacttactctagcttcccggcaacaattaatagac tggatggaggcggataaagttgcaggaccacttctgcgctcggcccttccggctggctgg tttattgctgataaatctggagccggtgagcgtgggtctcgcggtatcattgcagcactg gggccagatggtaagccctcccgtatcgtagttatctacacgacggggagtcaggcaact atggatgaacgaaatagacagatcgctgagataggtgcctcactgattaagcattggtaa ctgtcagaccaagtttactcatatatactttagattgatttaaaacttcattttttaattt aaaaggatctaggtgaagatcctttttgataatctcatgaccaaaatcccttaacgtgag ttttcgttccactgagcgtcagaccccgtagaaaagatcaaaggatcttcttgagatcct tttttctgcgcgtaatctgctgcttgcaaacaaaaaaaccaccgctaccagcggtggtt tgtttgccggatcaagagctaccaactctttttccgaaggtaactggcttcagcagagcg cagataccaaatactgtccttctagtgtagccgtagttaggccaccacttcaagaactct gtagcaccgcctacatacctcgctctgctaatcctgttaccagtggctgctgccagtggc gataagtcgtgtcttaccgggttggactcaagacgatagttaccggataaggcgcagcgg tcgggctgaacggggggttcgtgcacacagcccagcttggagcgaacgacctacaccgaa ctgagatacctacagcgtgagctatgagaaagcgccacgcttcccgaagggagaaaggcg gacaggtatccggtaagcggcagggtcggaacaggagagcgcacgagggagcttccaggg ggaaacgcctggtatctttatagtcctgtcgggtttcgccacctctgacttgagcgtcga tttttgtgatgctcgtcaggggggcggagcctatggaaaaacgccagcaacgcggccttt ttacggttcctggccttttgctggccttttgctcacatgttctttcctgcgttatcccct gattctgtggataaccgtattaccgcctttgagtgagctgataccgctcgccgcagccga acgaccgagcgcagcgagtcagtgagcgaggaagcggaagagcgcccaatacgcaaaccg cctctccccgcgcgttggccgattcattaatgcagcagctgcgcgctcgctcgctcactg aggccgcccgggcaaagcccgggcgtcgggcgaccctttggtcgcccggcctcagtgagcg agcgagcgcgcagagagggagtggccaactccatcactagggggttccttgtagttaatga ttaacccgccatgctacttatctacgtagccatgctctaggacattgattattgactagt ggagttccgcgttacataacttacggtaaatggcccgcctggctgaccgcccaacgaccc ccgcccattgacgtcaataatgacgtatgttcccatagtaacgccaatagggactttcca ttgacgtcaatggggagtatttacggtaaactgcccacttggcagtacatcaagtgtat catatgccaagtacgccccctattgacgtcaatgacggtaaatggcccgcctggcattat gcccagtacatgaccttatgggactttcctacttggcagtacatctacgtattagtcatc gctattaccatggtcgaggtgagccccacgttctgcttcactctccccatctcccccccc tccccacccccaatttgtatttatttatttttttaattatttttgtgcagcgatggggcg ggggggggggggcgcgcgccaggcggggggggcgggcgaggggggggcggggcgagg cggagaggtgcggcggcagccaatcagagcggcgcgctccgaaagtttccttttatggcg
```

-continued aggcggcggcggcggcggccctataaaaagcgaagcgcgcgggggggagtcgctgcgcg ctgccttcgccccgtgcccgctccgccgccgcctcgcgccgcccgccccggctctgact gaccgcgttactaaaacaggtaagtccggcctccgcgccgggttttggcgcctcccgcgg gcgccccctcctcacggcgagcgctgccacgtcagacgaagggcgcagcgagcgtcctg atccttccgcccggacgctcaggacagcggcccgctgctcataagactcggccttagaac cccagtatcagcagaaggacatttttaggacgggacttgggtgactctagggcactggttt tctttccagagagcggaacaggcgaggaaaagtagtcccttctcggcgattctgcggagg gatctccgtggggcggtgaacgccgatgatgcctctactaaccatgttcatgtttctttt tttttctacaggtcctgggtgacgaacagggtaccgccaccatggccaccggctctcgc acaagcctgctgctggctttcggactgctgtgcctgccttggctccaggagggctccgcc gctagcatcgataccgtcgctatgtgctggaggcttgctgaaggctgtatgctgatactt cagcctgaatcgtgaccgttttggcctctgactgacggtcacgattggctgaagtatcag gacacaaggcctgttactagcactcacatggaacaaatggcctctagcctggaggcttgc tgaaggctgtatgctgacttcactcatattgttccactcgttttggcctctgactgacga gtggaacaatgagtgaagtcaggacacaaggcctgttactagcactcacatggaacaaat ggcctctagcctggaggcttgctgaaggctgtatgctgtatattctacaaatcaccaggg cgttttggcctctgactgacgccctggtgatgtagaatatacaggacacaaggcctgtta ctagcactcacatggaacaaatggcctctctagaat 3'

SEQ ID NO: 14 = SEQ ID NO: 1 + SEQ ID NO: 6
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctcttttatgaggag ttgtggcccgttgtcaggcaacgtggcgtggtgtgcactgtgtttgctgacgcaaccccc actggttggggcattgccaccacctgtcagctcctttccgggactttcgctttccccctc cctattgccacggcggaactcatcgccgcctgccttgcccgctgctggacagggctcgg ctgttgggcactgacaattccgtggtgttgtcggggaaatcatcgtccttttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctccctttgggccgcctccccgcctaagctt atcgataccgtcgagatctaacttgtttattgcagcttataatggttacaaataaagcaa tagcatcacaaatttcacaaataaagcatttttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactctttttactcggtggcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc -continued

```
gccctgtagcggcgcattaagcgcggcgggtgtggtggttacgcgcagcgtgaccgctac acttgccagcgcccagcgcccgctcctttcgctttcttcccttcctttctcgccacgtt cgccggctttccccgtcaagctctaaatcgggggctccctttagggttccgatttagtgc tttacggcacctcgaccccaaaaaacttgatta gggtgatggttcacgtagtgggccatc gccctgatagacggttttt cgccctttgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttgggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggcctttctcacccgtttgaatctttacct acacattactcaggcattgcatttaaaatatatgagggttctaaaaattttatccttgc gttgaaataaaggcttctcccgcaaaagtattacagggtcataatgttttggtacaacc gatttagctttatgctctgaggctttattgcttaattttgctaattctttgccttgcctg tatgatttattggatgttggaattcctgatgcggtattttctccttacgcatctgtgcgg tatttcacaccgcatatggtgcactctcagtacaatctgctctgatgccgcatagttaag ccagccccgacaccgccaacaccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctatttttataggttaa tgtcatgataataatggtttcttagacgtcaggtggcacttttcggggaaatgtgcgcgg aaccc ctatttgtttatttttctaaatacattcaaatatgtatccgctcatgagacaata accctgataaatgcttcaataatattgaaaaaggaagagtatgagtattcaacatttccg tgtcgcccttattcccttttttgcggcattttgccttcctgttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatatactttagattgatttaaaacttcatttttaatt taaaaggatctaggtgaagatcctttttgataatctcatgaccaaaatcccttaacgtga gttttcgttccactgagcgtcagacccc gtagaaaagatcaaaggatcttcttgagatcc ttttttttctgcgcgtaatctgctgcttgcaaacaaaaaaaccaccgctaccagcggtggt
```

-continued ttgtttgccggatcaagagctaccaactcttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg atttttgtgatgctcgtcagggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgacctttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctccccccc cctccccacccccaattttgtatttatttattttttaattattttgtgcagcgatggggg ggggggggggggggcgcgcgccaggcggggggggcggggcgaggggcggggggggcgag gcggagaggtgcggcggcagccaatcagagcggcgcgctccgaaagtttccttttatggc gaggcggcggcggcggccctataaaaagcgaagcgcgcgggggggagtcgctgcgc gctgccttcgccccgtgccccgctccgccgccgcctcgccgccccgccccggctctgac tgaccgcgttactaaaacaggtaagtccggcctccgcgccgggttttggcgcctcccgcg ggcgccccctcctcacggcgagcgctgccacgtcagacgaagggcgcagcgagcgtcct gatccttccgcccggacgctcaggacagcggcccgctgctcataagactcggccttagaa ccccagtatcagcagaaggacattttaggacgggacttgggtgactctagggcactggtt ttctttccagagagcggaacaggcgaggaaaagtagtcccttctcggcgattctgcggag ggatctccgtggggcggtaacgccgatgatgcctctactaaccatgttcatgttttctt tttttttctacaggtcctgggtgacgaacagggtaccgccaccatggccaccggctctcg cacaagcctgctgctggctttcggactgctgtgcctgccttggctccaggagggctccgc cgctagcatcgataccgtcgctatgtgctggaggcttgctgaaggctgtatgctgtataa gtccagtgagaagaaggcgttttggcctctgactgacgccttcttctctggacttataca ggacacaaggcctgttactagcactcacatggaacaaatggcctctagcctggaggcttg ctgaaggctgtatgctgctatcatcaaatgagctgctgcgttttggcctctgactgacgc agcagctcttgatgatagtcaggacacaaggcctgttactagcactcacatggaacaaat -continued ggcctctagcctggaggcttgctgaaggctgtatgctgaagactgctggaaattctatgg ctgttttggcctctgactgacgaccatagaatccagcagtctcaggacacaaggcctgtt actagcactcacatggaacaaatggcctctctagaat 3'

SEQ ID NO: 15 = SEQ ID NO: 1 + SEQ ID NO: 7
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaacccccc actggttggggcattgccaccacctgtcagctccttttccgggacttttcgctttccccctc cctattgccacggcggaactcatcgccgcctgccttgcccgctgctggacaggggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctcccctttgggccgcctccccgcctaagctt atcgataccgtcgagatctaacttgtttattgcagcttataatggttacaaataaagcaa tagcatcacaaatttcacaaataaagcattttttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctccttttcgctttcttcccttcctttctcgccacgtt cgccggctttccccgtcaagctctaaatcgggggctccctttagggttccgatttagtgc tttacggcacctcgaccccaaaaaacttgattagggtgatggttcacgtagtgggccatc gccctgatagacggtttttcgccctttgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttggggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggcctttctcacccgtttgaatctttacct acacattactcaggcattgcatttaaaatatatgagggttctaaaaattttttatccttgc gttgaaataaaggcttctcccgcaaaagtattacagggtcataatgttttttggtacaacc gatttagctttatgctctgaggctttattgcttaattttgctaattctttgccttgcctg -continued

```
tatgatttattggatgttggaattcctgatgcggtattttctccttacgcatctgtgcgg tatttcacaccgcatatggtgcactctcagtacaatctgctctgatgccgcatagttaag ccagccccgacacccgccaacacccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctattttataggttaa tgtcatgataataatggtttcttagacgtcaggtggcacttttcggggaaatgtgcgcgg aacccctatttgtttattttttctaaatacattcaaatatgtatccgctcatgagacaata accctgataaatgcttcaataatattgaaaaaggaagagtatgagtattcaacatttccg tgtcgcccttattccctttttttgcggcattttgccttcctgttttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatatactttagattgatttaaaacttcatttttaatt taaaaggatctaggtgaagatcctttttgataatctcatgaccaaaatcccttaacgtga gttttcgttccactgagcgtcagaccccgtagaaaagatcaaaggatcttcttgagatcc ttttttctgcgcgtaatctgctgcttgcaaacaaaaaaaccaccgctaccagcggtggt ttgtttgccggatcaagagctaccaactcttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg atttttgtgatgctcgtcaggggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgacctttggtcgcccggcctcagtgagc gagcgagcgcgcagagagggagtggccaactccatcactagggggttccttgtagttaatg
```

-continued

```
attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctccccc cctccccaccccaatttttgtatttatttattttttaattattttgtgcagcgatggggg ggggggggggggggcgcgcgccaggcggggcggggcggggcgaggggggggcggggcga ggcggagaggtgcggcggcagccaatcagagcggcgcgctccgaaagtttccttttatgg cgaggcggcggcggcggcggccctataaaaagcgaagcgcgcggggggggagtcgctgcg cgctgccttcgccccgtgcccgctccgccgccgcctcgcgccgcccgcccggctctga ctgaccgcgttactaaaacaggtaagtccggcctccgcgccgggttttggcgcctcccgc gggcgccccctcctcacggcgagcgctgccacgtcagacgaagggcgcagcgagcgtcc tgatccttccgcccggacgctcaggacagcggcccgctgctcataagactcggccttaga acccagtatcagcagaaggacattttaggacgggacttgggtgactctagggcactggt tttctttccagagagcggaacaggcgaggaaaagtagtcccttctcggcgattctgcgga gggatctccgtggggcggtgaacgccgatgatgcctctactaaccatgttcatgttttct tttttttctacaggtcctgggtgacgaacagggtaccgccaccatggccaccggctctc gcacaagcctgctgctggcttttcggactgctgtgcctgccttggctccaggagggctccg ccgctagcatcgataccgtcgctatgtgctggaggcttgctgaaggctgtatgctgatta gcactggtgatttccggctgttttggcctctgactgacgaccggaaatccagtgctaatc aggacacaaggcctgttactagcactcacatggaacaaatggcctctagcctggaggctt gctgaaggctgtatgctgattgagtttcgcattcttgttgccgttttggcctctgactga cggcaacaagagcgaaactcaacaggacacaaggcctgttactagcactcacatggaaca aatggcctctagcctggaggcttgctgaaggctgtatgctgattgatcaggcaaacatag tcccgttttggcctctgactgacgggactatgtgcctgatcaatcaggacacaaggcctg ttactagcactcacatggaacaaatggcctctctagaat 3'
```

SEQ ID NO: 16 = SEQ ID NO: 1 + SEQ ID NO: 8

```
5' aatcaacctctggattacaaaatttgtgaaagattgactggtattcttaactatgtt gctccttttacgctatgtggatacgctgctttaatgcctttgtatcatgctattgcttcc cgtatggctttcatttctcctccttgtataaatcctggttgctgtctcttatgaggag ttgtggcccgttgtcaggcaacgtggcgtggtgtgcactgtgtttgctgacgcaaccccc actggttggggcattgccaccacctgtcagctccttccgggactttcgctttccccctc cctattgccacggcggaactcatcgccgcctgccttgcccgctgctggacagggctcgg ctgttgggcactgacaattccgtggtgttgtcggggaaatcatcgtccttttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctccctttgggccgcctccccgcctaagctt atcgataccgtcgagatctaacttgtttattgcagcttataatggttacaaataaagcaa tagcatcacaaatttcacaaataaagcatttttttcactgcattctagttgtggtttgtc
```

```
caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggggcctcagtgagcgagcgagcgcgcagctggcgtaatagcga agaggcccgcaccgatcgcccttcccaacagttgcgcagcctgaatggcgaatggcgatt ccgttgcaatggctggcggtaatattgttctggatattaccagcaaggccgatagtttga gttcttctactcaggcaagtgatgttattactaatcaaagaagtattgcgacaacggtta atttgcgtgatggacagactcttttactcggtggcctcactgattataaaaacacttctc aggattctggcgtaccgttcctgtctaaaatcccttaatcggcctcctgtttagctccc gctctgattctaacgaggaaagcacgttatacgtgctcgtcaaagcaaccatagtacgcg ccctgtagcggcgcattaagcgcggcgggtgtggtggttacgcgcagcgtgaccgctaca cttgccagcgccctagcgcccgctcctttcgctttcttcccttcctttctcgccacgttc gccggctttccccgtcaagctctaaatcgggggctccctttagggttccgatttagtgct ttacggcacctcgaccccaaaaaacttgattagggtgatggttcacgtagtgggccatcg ccctgatagacggttttcgccctttgacgttggagtccacgttctttaatagtggactc ttgttccaaactggaacaacactcaaccctatctcggtctattcttttgatttataaggg attttgccgatttcggcctattggttaaaaaatgagctgatttaacaaaaatttaacgcg aattttaacaaaatattaacgtttacaatttaaatatttgcttatacaatcttcctgttt ttggggcttttctgattatcaaccggggtacatatgattgacatgctagttttacgatta ccgttcatcgattctcttgtttgctccagactctcaggcaatgacctgatagcctttgta gagacctctcaaaaatagctaccctctccggcatgaatttatcagctagaacggttgaat atcatattgatggtgatttgactgtctccggcctttctcacccgtttgaatctttaccta cacattactcaggcattgcatttaaaatatatgagggttctaaaaattttttatccttgcg ttgaaataaaggcttctcccgcaaaagtattacagggtcataatgtttttggtacaaccg atttagctttatgctctgaggctttattgcttaattttgctaattctttgccttgcctgt atgatttattggatgttggaattcctgatgcggtattttctccttacgcatctgtgcggt atttcacaccgcatatggtgcactctcagtacaatctgctctgatgccgcatagttaagc cagccccgacacccgccaacacccgctgacgcgccctgacgggcttgtctgctcccggca tccgcttacagacaagctgtgaccgtctccgggagctgcatgtgtcagaggttttcaccg tcatcaccgaaacgcgcgagacgaaagggcctcgtgatacgcctatttttataggttaat gtcatgataataatggtttcttagacgtcaggtggcacttttcggggaaatgtgcgcgga acccctatttgtttatttttctaaatacattcaaatatgtatccgctcatgagacaataa ccctgataaatgcttcaataatattgaaaaaggaagagtatgagtattcaacatttccgt gtcgcccttattcccttttttgcggcattttgccttcctgttttttgctcacccagaaacg ctggtgaaagtaaaagatgctgaagatcagttgggtgcacgagtgggttacatcgaactg gatctcaacagcggtaagatccttgagagttttcgccccgaagaacgttttccaatgatg agcacttttaaagttctgctatgtggcgcggtattatcccgtattgacgccgggcaagag caactcggtcgccgcatacactattctcagaatgacttggttgagtactcaccagtcaca gaaaagcatcttacggatggcatgacagtaagagaattatgcagtgctgccataaccatg agtgataacactgcggccaacttacttctgacaacgatcggaggaccgaaggagctaacc
```

-continued

```
gcttttttgcacaacatgggggatcatgtaactcgccttgatcgttgggaaccggagctg aatgaagccataccaaacgacgagcgtgacaccacgatgcctgtagcaatggcaacaacg ttgcgcaaactattaactggcgaactacttactctagcttcccggcaacaattaatagac tggatggaggcggataaagttgcaggaccacttctgcgctcggcccttccggctggctgg tttattgctgataaatctggagccggtgagcgtgggtctcgcggtatcattgcagcactg gggccagatggtaagccctcccgtatcgtagttatctacacgacggggagtcaggcaact atggatgaacgaaatagacagatcgctgagataggtgcctcactgattaagcattggtaa ctgtcagaccaagtttactcatatatactttagattgatttaaaacttcattttaattt aaaaggatctaggtgaagatcctttttgataatctcatgaccaaaatcccttaacgtgag ttttcgttccactgagcgtcagaccccgtagaaaagatcaaaggatcttcttgagatcct tttttctgcgcgtaatctgctgcttgcaaacaaaaaaaccaccgctaccagcggtggtt tgtttgccggatcaagagctaccaactctttttccgaaggtaactggcttcagcagagcg cagataccaaatactgtccttctagtgtagccgtagttaggccaccacttcaagaactct gtagcaccgcctacatacctcgctctgctaatcctgttaccagtggctgctgccagtggc gataagtcgtgtcttaccgggttggactcaagacgatagttaccggataaggcgcagcgg tcgggctgaacggggggttcgtgcacacagcccagcttggagcgaacgacctacaccgaa ctgagatacctacagcgtgagctatgagaaagcgccacgcttcccgaagggagaaaggcg gacaggtatccggtaagcggcagggtcggaacaggagagcgcacgagggagcttccaggg ggaaacgcctggtatctttatagtcctgtcgggtttcgccacctctgacttgagcgtcga tttttgtgatgctcgtcagggggggagcctatggaaaaacgccagcaacgcggccttttt tacggttcctggccttttgctggccttttgctcacatgttctttcctgcgttatcccctg attctgtggataaccgtattaccgcctttgagtgagctgataccgctcgccgcagccgaa cgaccgagcgcagcgagtcagtgagcgaggaagcggaagagcgcccaatacgcaaaccgc ctctccccgcgcgttggccgattcattaatgcagcagctgcgcgctcgctcgctcactga ggccgcccgggcaaagcccgggcgtcgggcgaccttggtcgcccggcctcagtgagcga gcgagcgcgcagagagggagtggccaactccatcactaggggttccttgtagttaatgat taacccgccatgctacttatctacgtagccatgctctaggacattgattattgactagtg gagttccgcgttacataacttacggtaaatggcccgcctggctgaccgcccaacgacccc cgcccattgacgtcaataatgacgtatgttcccatagtaacgccaatagggactttccat tgacgtcaatgggtggagtatttacggtaaactgcccacttggcagtacatcaagtgtat catatgccaagtacgccccctattgacgtcaatgacggtaaatggcccgcctggcattat gcccagtacatgaccttatgggactttcctacttggcagtacatctacgtattagtcatc gctattaccatggtcgaggtgagccccacgttctgcttcactctccccatctccccccc tccccaccccaattttgtatttatttattttttaattattttttgtgcagcgatggggggg ggggggggggggcgcgcgccaggcggggcgggggggcgaggggggggcggggcgaggc ggagaggtgcggcggcagccaatcagagcggcgcgctccgaaagtttccttttatggcga ggcggcggcggcggccctataaaaagcgaagcgcgcggcggggggagtcgctgcgcgc tgccttcgccccgtgccccgctccgccgccgcctcgccgcccgccccggctctgactg accgcgttactaaaacaggtaagtccggcctccgcgccgggttttggcgcctcccgcggg cgccccctcctcacgcgcgagcgctgccacgtcagacgaagggcgcagcgagcgtcctga tccttccgcccggacgctcaggacagcggcccgctgctcataagactcggccttagaacc
```

-continued ccagtatcagcagaaggacatttaggacgggacttgggtgactctagggcactggtttt ctttccagagagcggaacaggcgaggaaaagtagtcccttctcggcgattctgcggaggg atctccgtggggcggtgaacgccgatgatgcctctactaaccatgttcatgttttcttt ttttctacaggtcctgggtgacgaacagggtaccgccaccatggccaccggctctcgca caagcctgctgctggctttcggactgctgtgcctgccttggctccaggagggctccgccg ctagcatcgataccgtcgctatgtgctggaggcttgctgaaggctgtatgctgtctgatc gtggtgttatttgggcgttttggcctctgactgacgcccaaataaccacgatcagacagg acacaaggcctgttactagcactcacatggaacaaatggcctctagcctggaggcttgct gaaggctgtatgctgttgagtttcgcattcttgttgccgttttggcctctgactgacggc aacaagagcgaaactcaacaggacacaaggcctgttactagcactcacatggaacaaatg gcctctagcctggaggcttgctgaaggctgtatgctgtatcctcttataactcagcctcc gttttggcctctgactgacggaggctgagataagaggatacaggacacaaggcctgttac tagcactcacatggaacaaatggcctctctagaat 3'

SEQ ID NO: 17 = SEQ ID NO: 1 + SEQ ID NO: 9
5' aatcaacctctggattacaaaatttgtgaaagattgactggtattcttaactatgtt gctccttttacgctatgtggatacgctgctttaatgcctttgtatcatgctattgcttcc cgtatgctttcattttctcctccttgtataaatcctggttgctgtctctttatgaggag ttgtggcccgttgtcaggcaacgtggcgtggtgtgcactgtgtttgctgacgcaacccc actggttggggcattgccaccacctgtcagctccttttcgggactttcgctttcccctc cctattgccacggcggaactcatcgccgcctgccttgcccgctgctggacaggggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctcccctttgggccgcctccccgcctaagctt atcgataccgtcgagatctaacttgtttattgcagcttataatggttacaaataaagcaa tagcatcacaaatttcacaaataaagcatttttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgctttcttcccttcctttctcgccacgtt cgccggctttccccgtcaagctctaaatcggggggctccctttagggttccgatttagtgc tttacggcacctcgaccccaaaaaacttgattagggtgatggttcacgtagtgggccatc gccctgatagacggtttttcgccctttgacgttggagtccacgttctttaatagtggact

```
cttgttccaaactggaacaacactcaaccctatctcggtctattcttttgatttataagg
gattttgccgatttcggcctattggtaaaaaatgagctgatttaacaaaaatttaacgc
gaattttaacaaaatattaacgtttacaatttaaatatttgcttatacaatcttcctgtt
tttgggcttttctgattatcaaccggggtacatatgattgacatgctagttttacgatt
accgttcatcgattctcttgtttgctccagactctcaggcaatgacctgatagcctttgt
agagacctctcaaaaatagctaccctctccggcatgaatttatcagctagaacggttgaa
tatcatattgatggtgatttgactgtctccggcctttctcacccgtttgaatctttacct
acacattactcaggcattgcatttaaaatatatgagggttctaaaaattttatccttgc
gttgaaataaaggcttctcccgcaaaagtattacagggtcataatgtttttggtacaacc
gatttagctttatgctctgaggctttattgcttaattttgctaattctttgccttgcctg
tatgatttattggatgttggaattcctgatgcggtattttctccttacgcatctgtgcgg
tatttcacaccgcatatggtgcactctcagtacaatctgctctgatgccgcatagttaag
ccagccccgacacccgccaacacccgctgacgcgccctgacgggcttgtctgctcccggc
atccgcttacagacaagctgtgaccgtctccgggagctgcatgtgtcagaggttttcacc
gtcatcaccgaaacgcgcgagacgaaagggcctcgtgatacgcctattttttataggttaa
tgtcatgataataatggtttcttagacgtcaggtggcacttttcggggaaatgtgcgcgg
aaccctatttgtttattttctaaatacattcaaatatgtatccgctcatgagacaata
accctgataaatgcttcaataatattgaaaaaggaagagtatgagtattcaacatttccg
tgtcgcccttattcccttttttgcggcattttgccttcctgttttttgctcacccagaaac
gctggtgaaagtaaaagatgctgaagatcagttgggtgcacgagtgggttacatcgaact
ggatctcaacagcggtaagatccttgagagttttcgccccgaagaacgttttccaatgat
gagcacttttaaagttctgctatgtggcgcggtattatcccgtattgacgccgggcaaga
gcaactcggtcgccgcatacactattctcagaatgacttggttgagtactcaccagtcac
agaaaagcatcttacggatggcatgacagtaagagaattatgcagtgctgccataaccat
gagtgataacactgcggccaacttacttctgacaacgatcggaggaccgaaggagctaac
cgcttttttgcacaacatgggggatcatgtaactcgccttgatcgttgggaaccggagct
gaatgaagccataccaaacgacgagcgtgacaccacgatgcctgtagcaatggcaacaac
gttgcgcaaactattaactggcgaactacttactctagcttcccggcaacaattaataga
ctggatggaggcggataaagttgcaggaccacttctgcgctcggcccttccggctggctg
gtttattgctgataaatctggagccggtgagcgtgggtctcgcggtatcattgcagcact
ggggccagatggtaagccctcccgtatcgtagttatctacacgacggggagtcaggcaac
tatggatgaacgaaatagacagatcgctgagataggtgcctcactgattaagcattggta
actgtcagaccaagtttactcatatatactttagattgatttaaaacttcatttttaatt
taaaaggatctaggtgaagatcctttttgataatctcatgaccaaaatcccttaacgtga
gttttcgttccactgagcgtcagacccccgtagaaaagatcaaaggatcttcttgagatcc
ttttttttctgcgcgtaatctgctgcttgcaaacaaaaaaaccaccgctaccagcggtggt
ttgtttgccggatcaagagctaccaactctttttccgaaggtaactggcttcagcagagc
gcagataccaaatactgtccttctagtgtagccgtagttaggccaccacttcaagaactc
tgtagcaccgcctacatacctcgctctgctaatcctgttaccagtggctgctgccagtgg
cgataagtcgtgtcttaccgggttggactcaagacgatagttaccggataaggcgcagcg
```

-continued

```
gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg attttttgtgatgctcgtcagggggggagcctatggaaaaacgccagcaacgcggccttt ttacggttcctggccttttgctggccttttgctcacatgttctttcctgcgttatcccct gattctgtggataaccgtattaccgcctttgagtgagctgataccgctcgccgcagccga acgaccgagcgcagcgagtcagtgagcgaggaagcggaagagcgcccaatacgcaaaccg cctctccccgcgcgttggccgattcattaatgcagcagctgcgcgctcgctcgctcactg aggccgcccgggcaaagcccgggcgtcgggcgaccttggtcgcccggcctcagtgagcg agcgagcgcgcagagagggagtggccaactccatcactaggggttccttgtagttaatga ttaacccgccatgctacttatctacgtagccatgctctaggacattgattattgactagt ggagttccgcgttacataacttacggtaaatggcccgcctggctgaccgcccaacgaccc ccgcccattgacgtcaataatgacgtatgttcccatagtaacgccaatagggactttcca ttgacgtcaatgggtggagtatttacggtaaactgcccacttggcagtacatcaagtgta tcatatgccaagtacgccccctattgacgtcaatgacggtaaatggcccgcctggcatta tgcccagtacatgaccttatgggactttcctacttggcagtacatctacgtattagtcat cgctattaccatggtcgaggtgagccccacgttctgcttcactctccccatctcccccc ctccccaccccaattttgtatttatttattttttaattattttgtgcagcgatggggggg ggggggggggggcgcgcgccaggcggggcggggggggcgagggggggggcggggcgagg cggagaggtgcggcggcagccaatcagagcggcgcgctccgaaagtttccttttatggcg aggcggcggcggcggcccctataaaaagcgaagcgcgcggggggggagtcgctgcgcg ctgccttcgccccgtgccccgctccgccgccgcctcgcgccgcccgccccggctctgact gaccgcgttactaaaacaggtaagtccggcctccgcgccgggttttggcgcctcccgcgg gcgcccccctcctcacggcgagcgctgccacgtcagacgaagggcgcagcgagcgtcctg atccttccgcccggacgctcaggacagcggcccgctgctcataagactcggccttagaac cccagtatcagcagaaggacatttaggacgggacttgggtgactctagggcactggttt tctttccagagagcggaacaggcgaggaaaagtagtcccttctcggcgattctgcggagg gatctccgtggggcggtgaacgccgatgatgcctctactaaccatgttcatgttttcttt tttttttctacaggtcctgggtgacgaacagggtaccgccaccatggccaccggctctcgc acaagcctgctgctggctttcggactgctgtgcctgcctttggctccaggagggctccgcc gctagcatcgataccgtcgctatgtgctggaggcttgctgaaggctgtatgctgtcgtac tgacttgtaggtatgccgttttggcctctgactgacggcatacctaagtcagtacgtcag gacacaaggcctgttactagcactcacatggaacaaatggcctctagcctggaggcttgc tgaaggctgtatgctgactcctaatcaatagcttccaccgttttggcctctgactgacgg tggaagcttgattaggagtcaggacacaaggcctgttactagcactcacatggaacaaat ggcctctagcctggaggcttgctgaaggctgtatgctgaatatgcctttaagctttgctg cgttttggcctctgactgacgcagcaaagcaaaggcatattcaggacacaaggcctgtta ctagcactcacatggaacaaatggcctctctagaat 3'
```

As will be appreciated by those skilled in the art, because the recombinant plasmid is a circular vector, the one or more sequences of the miRNA expression cassettes may be connected at the 3' end of SEQ ID NO. 1, as shown in SEQ ID NO. 10-17 or at the 5' end of SEQ ID NO. 1.

As will be appreciated by those skilled in the art, a perfect match of nucleotides with each of the miRNA expression cassette sequences is not necessary in order to have the desired result of decreased bioavailability of the target biomolecule as a result of the target cell producing the miRNA sequence that will bind to and degrade the mRNA of the target biomolecule. In some embodiments of the present disclosure, about 80% to about 100% nucleotide sequence matching with each of the miRNA expression cassettes causes the desired result. In some embodiments of the present disclosure, about 85% to about 100% nucleotide sequence matching with each of the miRNA expression cassettes causes the desired result. In some embodiments of the present disclosure, about 90% to about 100% nucleotide sequence matching with each of the miRNA expression cassettes causes the desired result. In some embodiments of the present disclosure, about 95% to about 100% nucleotide sequence matching with each of the miRNA expression cassettes causes the desired result.

Example 1—Expression Cassette

Expression cassettes for expressing miRNA were synthesized. The synthesized miRNA expression cassettes were cloned into the pAVA-00200 plasmid backbone containing the CASI promoter, multiple cloning site (MCS), Woodchuck Hepatitis Virus post-transcriptional regulatory element (WPRE), and Simian virus 40 (SV40) polyadenylation (polyA) sequence, all flanked by the AAV2 inverted terminal repeats (ITR). pAVA-00200 was cut with the restriction enzymes KpnI and XbaI in the MCS and separated on a 1% agarose gel. The band of interest was excised and purified using a gel extraction kit. Each miRNA expression cassette was amplified by polymerase chain reaction (PCR) using Taq polymerase and the PCR products were gel purified and the bands on interest were also excised and purified using a gel extraction kit. These PCR products contained the miRNA expression cassettes in addition to 15 base pair 5' and 3' overhangs that aligned with the ends of the linearized pAVA-00200 backbone. Using in-fusion cloning, the amplified miRNA expression cassettes are integrated with the pAVA-00200 backbone via homologous recombination. The resulting RP contained the following: 5' ITR. CASI promoter, miRNA expression cassette. WPRE. SV40 polyA and ITR 3'.

The invention claimed is:

1. A composition that comprises a recombinant plasmid (RP) comprising a sequence of nucleotides that is SEQ ID NO: 9.

2. The composition of claim 1, wherein the RP is encased encapsulated in a protein coat, a lipid vesicle, or any combination thereof.

3. A composition that comprises a recombinant plasmid (RP) comprising a sequence of nucleotides that is SEQ ID NO: 17.

4. The composition of claim 3, wherein the RP is encapsulated in a protein coat, a lipid vesicle, or any combination thereof.

* * * * *